US010760416B2

United States Patent
Weng et al.

(10) Patent No.: US 10,760,416 B2
(45) Date of Patent: Sep. 1, 2020

(54) METHOD OF PERFORMING WELLSITE FRACTURE OPERATIONS WITH STATISTICAL UNCERTAINTIES

(71) Applicant: SCHLUMBERGER TECHNOLOGY CORPORATION, Sugar Land, TX (US)

(72) Inventors: Xiaowei Weng, Fulshear, TX (US); Charles-Edouard Cohen, Rio de Janeiro (BR)

(73) Assignee: Schlumberger Technology Corporation, Sugar Land, TX (US)

(*) Notice: Subject to any disclaimer, the term of this patent is extended or adjusted under 35 U.S.C. 154(b) by 446 days.

(21) Appl. No.: 15/546,860

(22) PCT Filed: Dec. 15, 2015

(86) PCT No.: PCT/US2015/065717
§ 371 (c)(1),
(2) Date: Jul. 27, 2017

(87) PCT Pub. No.: WO2016/122792
PCT Pub. Date: Aug. 4, 2016

(65) Prior Publication Data
US 2018/0016895 A1  Jan. 18, 2018

Related U.S. Application Data

(60) Provisional application No. 62/108,841, filed on Jan. 28, 2015.

(51) Int. Cl.
*E21B 49/00* (2006.01)
*E21B 41/00* (2006.01)
(Continued)

(52) U.S. Cl.
CPC .......... *E21B 49/00* (2013.01); *E21B 41/0092* (2013.01); *E21B 43/26* (2013.01);
(Continued)

(58) Field of Classification Search
CPC .......... E21B 49/00; E21B 49/02; E21B 43/26; E21B 41/0092; E21B 49/08; E21B 47/14;
(Continued)

(56) References Cited

U.S. PATENT DOCUMENTS 6,101,447 A   8/2000  Poe, Jr.
7,363,162 B2  4/2008  Thambynayagam et al.
(Continued)

FOREIGN PATENT DOCUMENTS

WO   2013016733 A1   1/2013
WO   2013055930 A1   4/2013

OTHER PUBLICATIONS

Essedine, S.M., et al., "Uncertainty quantification of THMC processes in a dynamically stimulated fracture network," American Rock Mechanics Association, pp. 1-12 (Year: 2013).*
(Continued)

*Primary Examiner* — Rehana Perveen
*Assistant Examiner* — Steven W Crabb
(74) *Attorney, Agent, or Firm* — Cathy Hewitt

(57) ABSTRACT

A method of performing a fracture operation at a wellsite is provided. The wellsite has a fracture network therein with natural fractures. The method involves stimulating the wellsite by injecting an injection fluid with proppant into the fracture network, obtaining wellsite data comprising natural fracture parameters of the natural fractures and obtaining a mechanical earth model of the subterranean formation, defining the natural fractures based on the wellsite data by generating one or more realizations of the natural fracture data based on a statistical distribution of natural fracture
(Continued)

parameters, meters, generating a statistical distribution of predicted fluid production by generating a hydraulic fracture growth pattern for the fracture network over time based on each defined realization and predicting fluid production from the formation based on the defined realizations, selecting a reference production from the generated statistical distribution, and optimizing production and uncertainty by adjusting the stimulating operations based on the selecting.

23 Claims, 43 Drawing Sheets

(51) Int. Cl.
E21B 43/26 (2006.01)
E21B 49/02 (2006.01)
G01V 1/28 (2006.01)
G01V 1/30 (2006.01)
G01V 99/00 (2009.01)
G01V 1/50 (2006.01)
G01V 1/42 (2006.01)
G01V 11/00 (2006.01)
E21B 47/00 (2012.01)
E21B 47/12 (2012.01)
E21B 47/14 (2006.01)
E21B 49/08 (2006.01)

(52) U.S. Cl.
CPC .............. E21B 49/02 (2013.01); G01V 1/288 (2013.01); G01V 1/306 (2013.01); G01V 99/005 (2013.01); E21B 47/0002 (2013.01); E21B 47/122 (2013.01); E21B 47/14 (2013.01); E21B 49/08 (2013.01); G01V 1/42 (2013.01); G01V 1/50 (2013.01); G01V 11/00 (2013.01); G01V 2210/6224 (2013.01); G01V 2210/6244 (2013.01); G01V 2210/644 (2013.01); G01V 2210/646 (2013.01); G01V 2210/66 (2013.01)

(58) Field of Classification Search
CPC . E21B 47/122; E21B 47/0002; G01V 99/005; G01V 1/306; G01V 1/288; G01V 11/00; G01V 2210/6244; G01V 1/42; G01V 2210/6224; G01V 1/50; G01V 2210/644; G01V 2210/66; G01V 2210/646
See application file for complete search history.

(56) References Cited

U.S. PATENT DOCUMENTS

| | | | |
|---|---|---|---|
| 7,788,074 | B2 | 8/2010 | Scheidt et al. |
| 8,886,502 | B2 | 11/2014 | Walters et al. |
| 2008/0133186 | A1 | 6/2008 | Li et al. |
| 2008/0183451 | A1 | 7/2008 | Weng et al. |
| 2009/0095469 | A1 | 4/2009 | Dozier |
| 2009/0292516 | A1* | 11/2009 | Searles .................. E21B 43/00 703/10 |
| 2010/0138196 | A1 | 6/2010 | Hui et al. |
| 2010/0250215 | A1 | 9/2010 | Kennon et al. |
| 2011/0120702 | A1 | 5/2011 | Craig |
| 2012/0179444 | A1 | 7/2012 | Ganguly et al. |
| 2012/0310613 | A1 | 12/2012 | Moos et al. |
| 2014/0305638 | A1 | 10/2014 | Kresse et al. |
| 2014/0358510 | A1 | 12/2014 | Sarkar et al. |
| 2014/0372089 | A1 | 12/2014 | Weng et al. |

OTHER PUBLICATIONS

Weng et al., "Modeling of Hydraulic Fracutre Propagation in a Naturally Fractured Formation", SPE 140253, SPE Hydraulic Fracturing Conference and Exhibition, The Woodlands, tX, Jan. 24-26, 2011, 18 pages.
Kresse et al., "Numerical Modeling of Hydraulic Fracturin gin Naturally Fractured Formations", ARMA 11-363, 45th US Rock Mechanics/Geomechanics Symposium, San Francisco, CA, Jun. 26-29, 2011.
Renshaw et al., "An Experimentally Verified Criterion for Propagation across Unbounded Frictional Interfaces in Brittle, Linear Elastic Materials", Int. J. Rock Mech. Min. Sci. & Geomech. Abstr., vol. 32, pp. 237-249, 1995.
Gu et al., "Criterion for Fractures Crossing Frictional Interfaces at Nonorthogonal Angles", ARMA 10-198, 44th US Rock Symposium, Salt Lake City, Utah, Jun. 27-30, 2010, 6 pages.
Gu et al., "Hydraulic Fracture Crossing Natural Fracture at Non-Orthogonal Angles: A Criterion and Its Validation and Applications", SPE 139984, SPE Hydraulic Fracturing Conference and Exhibition, The Woodlands, TX, Jan. 24-26, 2011, pp. 20-26.
Warpinski et al., "Influence of Geologic Discontinuities on Hydraulic Fracutre Propagation", JPT, Feb. 1987, pp. 209-220.
Warpinski et al., "Altered-Stress Fracturing", SPE JPT, Sep. 1989, pp. 990-997.
Fisher et al., "Optimizing horizontal completion techniques in the Barnett Shale using microseismic fracture mapping", SPE 90051, SPE Annual Technical Conference and Exhibition, Houston, Sep. 26-29, 2004, 11 pages.
Britt et al., "Horizontal Well Completion, Stimulation Optimization, and Risk Mitigation", SPE 125526, 2009 SPE Eastern Regional Meeting, Charleston, Sep. 23-25, 2009, 17 pages.
Cheng et al., "Boundary Element Analysis of the Stress Distribution around Multiple Fractures: Implications for the Sapcing of Perforation Clusters of Hydraulically Fracutred Horizontal Wells", SPE 125769, 2009 SPE Eastern Regional Meeting, Charleston, Sep. 23-25, 2009, 15 pages.
Meyer et al., "A Discrete Fracture Network Model for Hydraulically Induced Fractures: Theory, Parametric and Case Studies", Paper SPE 140514, SPE Hydraulic Fracturing Conference and Exhibition, The Woodlands, TX, Jan. 24-26, 2011, 36 pages.
Roussel et al., "Optimizing Fracture Spacing and Sequencing in Horizontal-Well Fracturing", SPEPE, May 2011, pp. 173-184.
Olson, "Multi-Fracture Propagation Modeling: Application sto Hydraulic fracturing in Shales and Tight Sands", ARMA 08-327, 42nd US Rock Mechanics Symposium and 2nd US-Canada Rock Mechanics Symposium, San Francisco, CA, Jun. 29-Jul. 2, 2008, 8 pages.
Yew et al., "On Perforating and Fracturing of Deviated Cased Wellbores", SPE 26514, SPE 68th Annual Technical Conference and Exhibition, Houston, TX, Oct. 3-6, 1993, 12 pages.
Weng, Fracture Initiation and Propagation from Deviated Wellbores, SPE 26597, SPE 68th Annual Technical Conference and Exhibition, Houston, TX, Oct. 3-6, 1993, 16 pages.
Nolte, "Fracturing Pressure Analysis for nonideal behavior", SPE 20704, JPT, Feb. 1991, pp. 210-218.
Crouch et al., "Boundary Element Methods in Solid Mechanics", Geoge Allen & Unwin Ltd., London, Fisher, 1983, pp. 93-96.
Zhang et al., "Deflection and Propagation of Fluid-Driven Fractures at Frictional Bedding Interfaces: A Numerical Investigation", Journal of Structural Geology, vol. 29, pp. 396-410, 2007.
Cipolla et al., "Integrating Microseismic Mapping and complex Fracture Modeling to Characterized Fracture Complexity", SPE 140185, SPE Hydraulic Fracturing Conference and Exhibition, The Woodlands, TX, Jan. 24-26, 2011, 22 pages.
Daniels et al., "Contacting More of the Barnett Shale Through an Integration of Real-Time Microseismic Monitoring, Petrophysics, and Hydraulic Fracture Design", SPE 110562, 2007 SPE Annual Technical Conference and Exhibition, Anaheim, CA, Oct. 12-14, 2007, 12 pages.
Rich et al., "Unconventional Geophysics for Unconventional Plays", SPE 131779, Unconventional Gas Conference, Pettsburgh, PA, Feb. 23-25, 2010, 7 pages.

(56) References Cited

OTHER PUBLICATIONS

Koutsabelous et al., "3D Reservoir Geomechanics Modeling in Oil/Gas Field Production", SPE 126095, 2009 SPE Saudi Arabia Section Technical Symposium and Exhibition, May 9-11, 2009, 14 pages.

Jeffrey et al., "Measuring hydraulic fracture growth in naturally fractured rock", SPE 124919, SPE Annual Technical Conference and Exhibition, New Orleans, LA, Oct. 4-7, 2009, 19 pages.

Thiercelin et al., "Stress field in the vicinity of a natural fault activated by the propagation of an induced hydraulic fracture", Proceedings of the 1st Canada-US Rock Mechanics Symposium, vol. 2, pp. 1617-1624, 2007.

Kresse et al., "Effect of flow rate and viscosity on complex fracture development in UFM model", International Conference for Effective and Sustainable Hydraulic Fracturing, Brisbane, Australia, May 20-22, 2013, pp. 183-210.

Cohen et al., "Analysis on the impact of fracturing treatment design and reservoir properties on production from shale gas reservoirs", IPTC 16400, International Petroleum Technology Conference, Beijing, China, Mar. 26-28, 2013, 36 pages.

Hatzignatiou et al., "Probabilistic evaluation of horizontal wells in stochastic naturally fractured gas reservoirs", CIM 65459, SPE/ Petroleum Society of CIM International Conference on Horizontal Well Technology, Calgary, Alberta, CA, Nov. 6-8, 2000, 17 pages.

Cohen et al., "Production forecast after hydraulic fracturing in naturally fractured reservoir: coupling a complex fracturing simulator and a semi-analytical production model", SPE 152541, SPE Hydraulic Fracturing Technology Conference and Exhibition, The Woodlands, TX, Feb. 6-8, 2012, 19 pages.

International Search Report and Written Opinion issued in International Patent Appl. No. PCT/US2015/065717 dated Apr. 1, 2016; 15 pages.

* cited by examiner

FIG.1.1

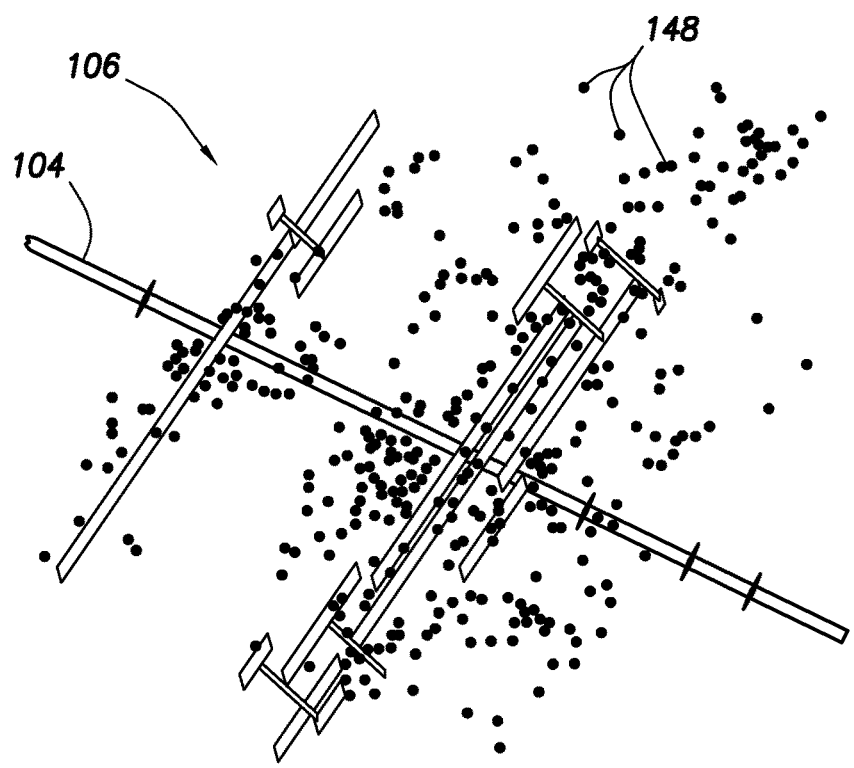
FIG.1.2
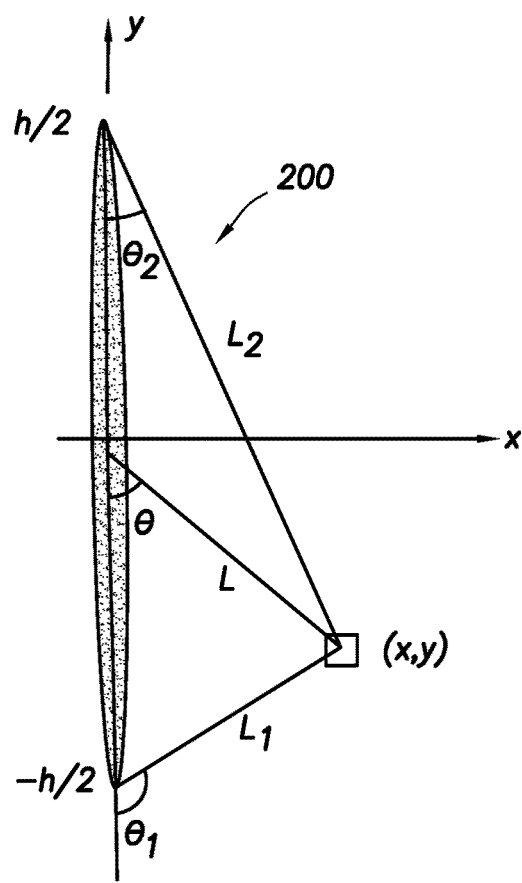
FIG.2

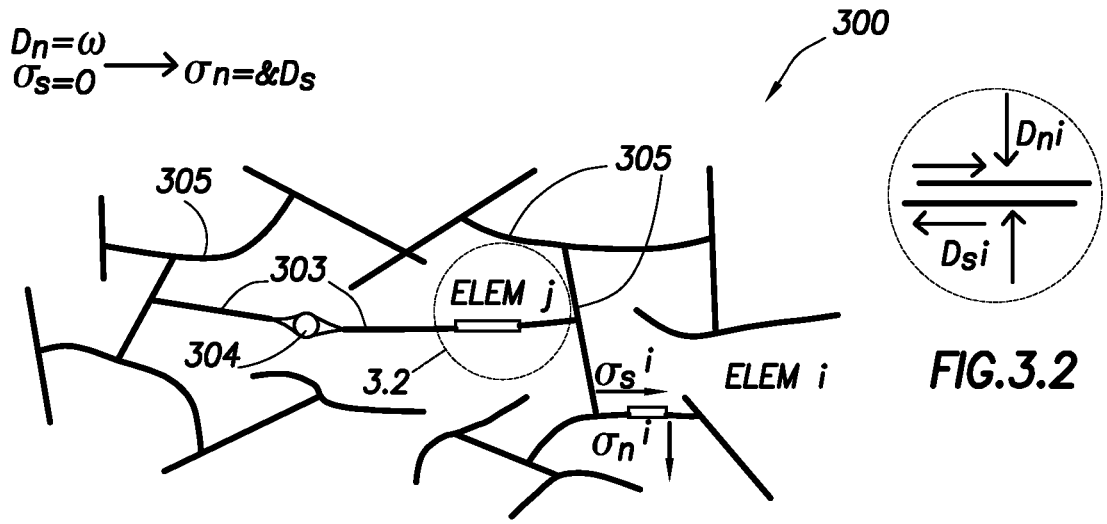
FIG.3.1
FIG.3.2
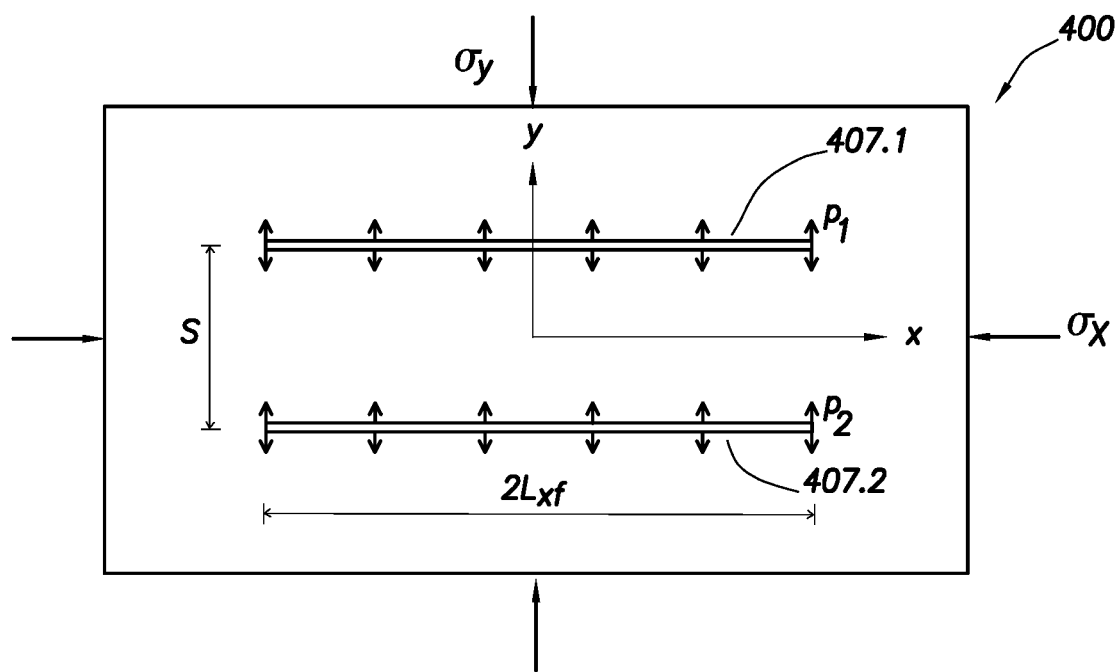
FIG.4

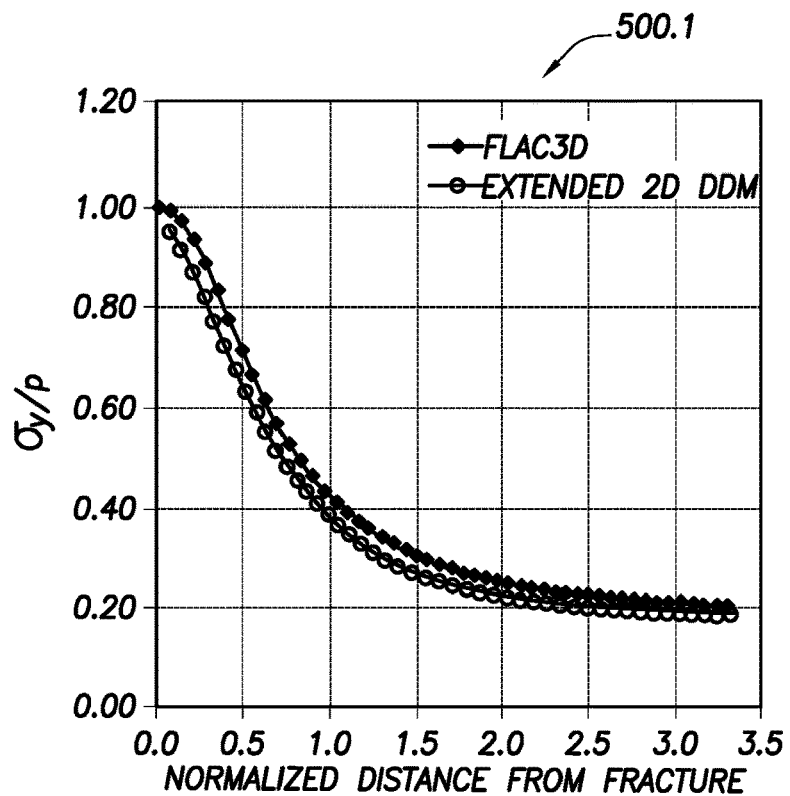
FIG.5.1
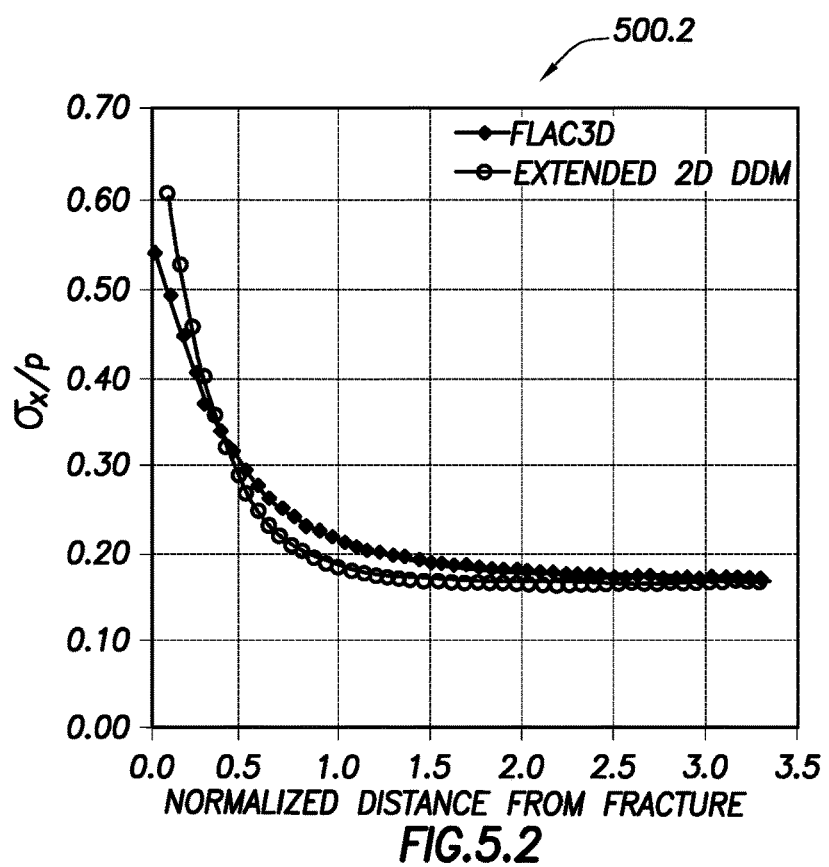
FIG.5.2

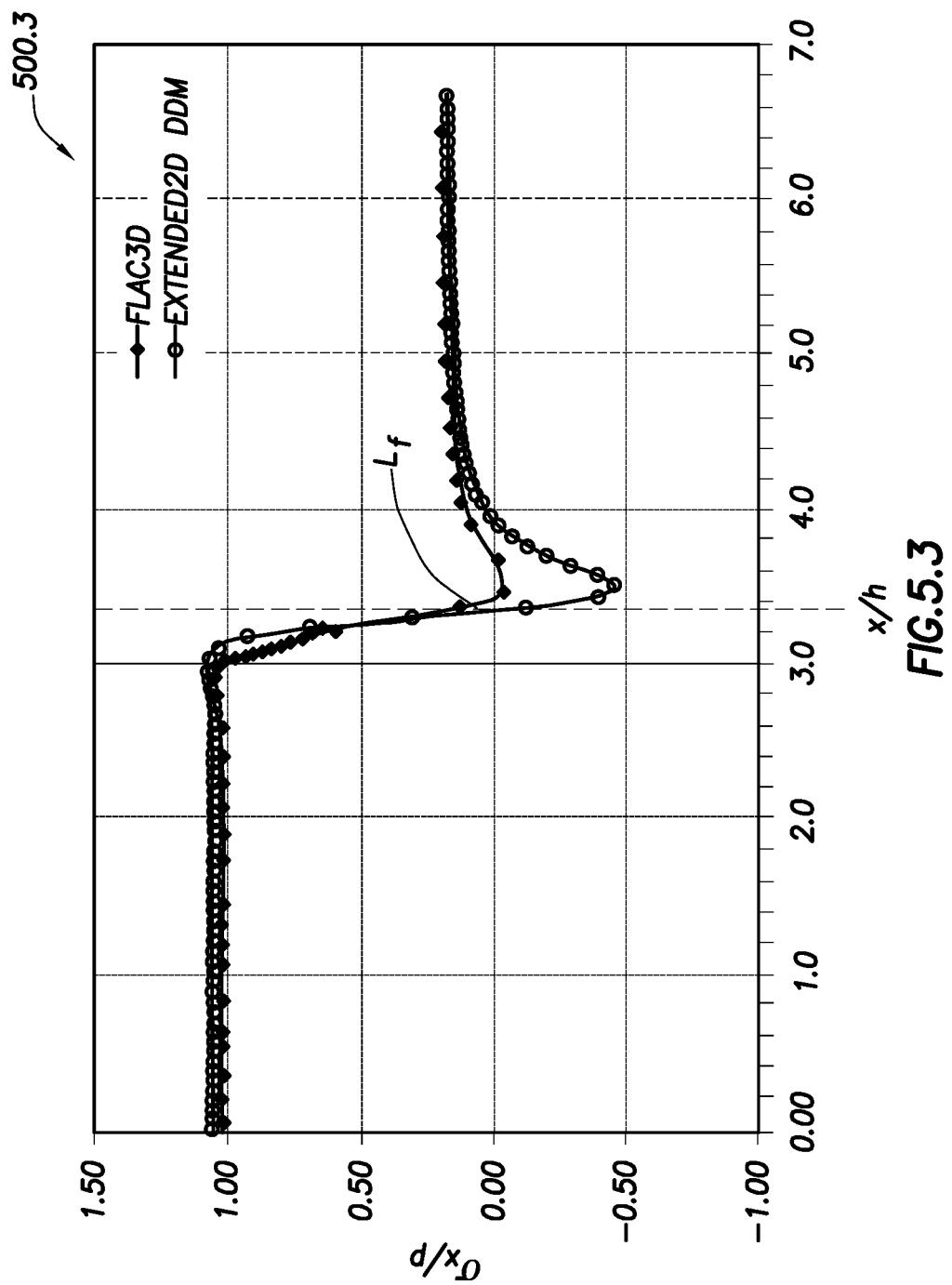
FIG.5.3

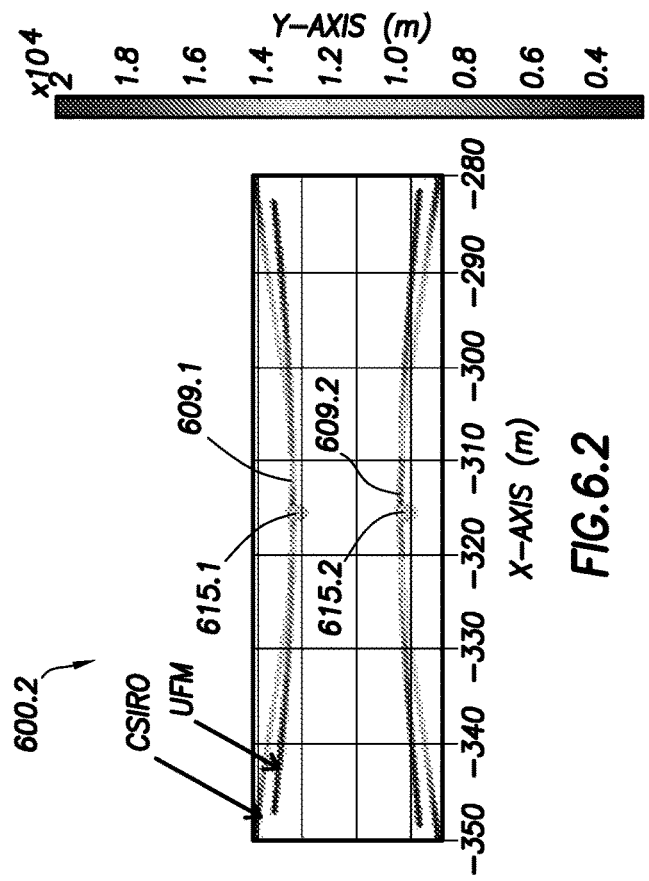
FIG.6.2
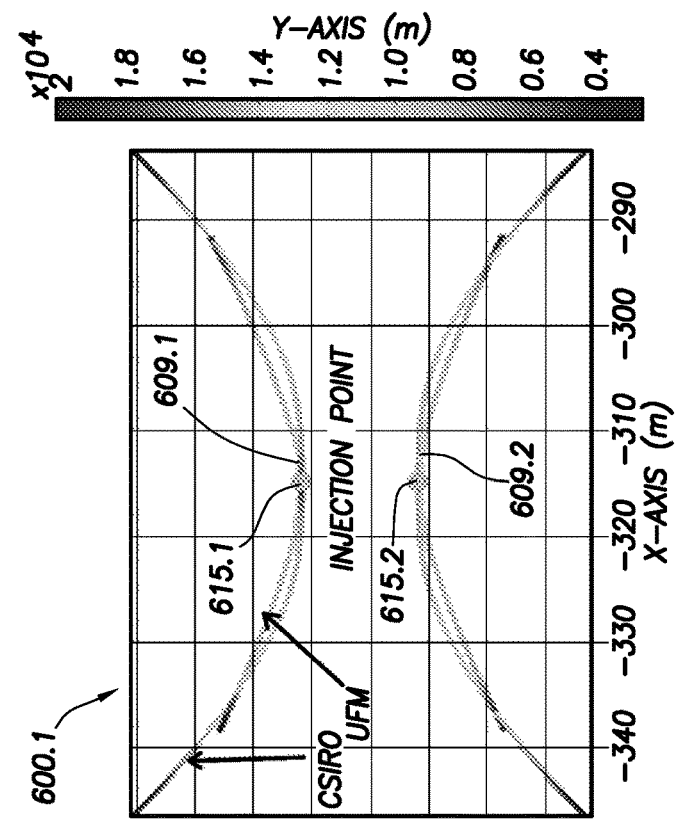
FIG.6.1

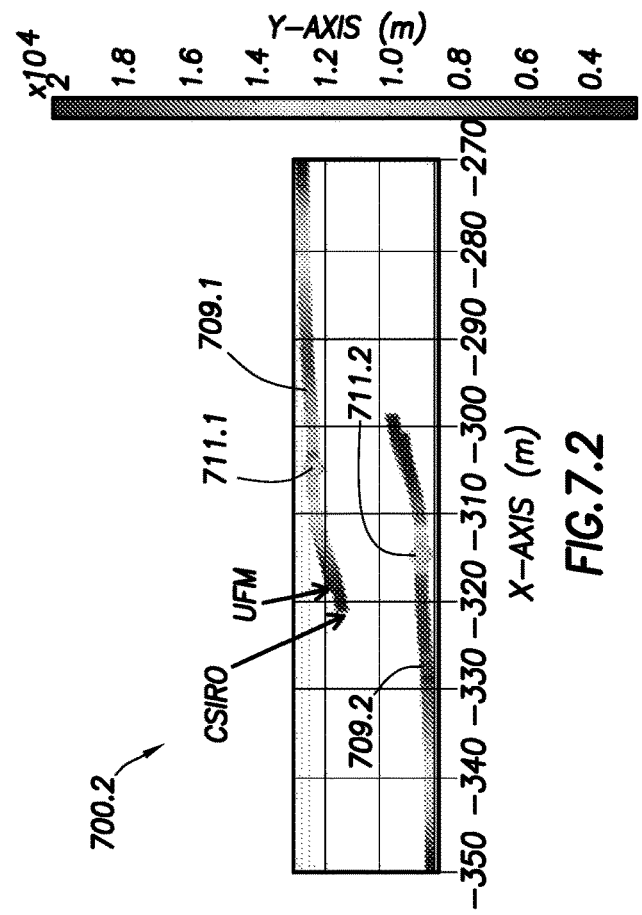
FIG.7.2
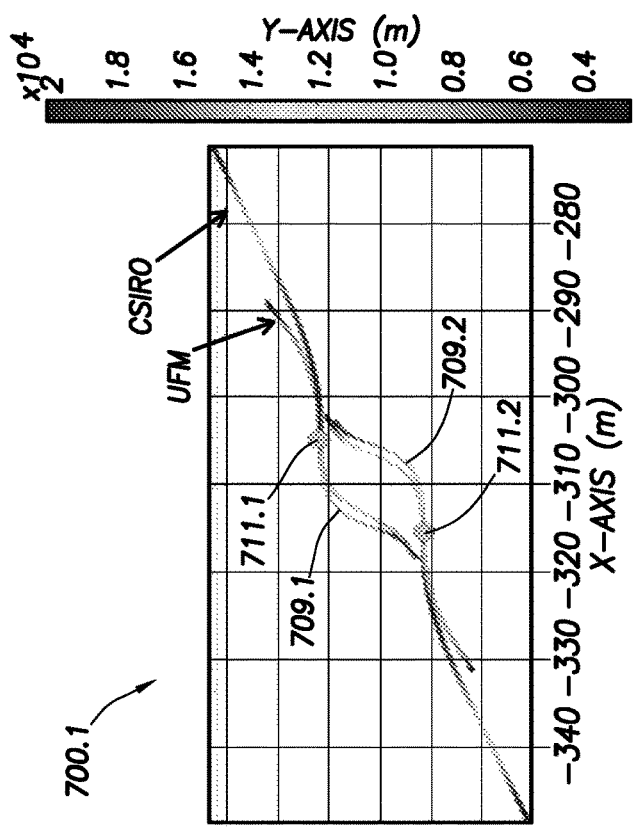
FIG.7.1

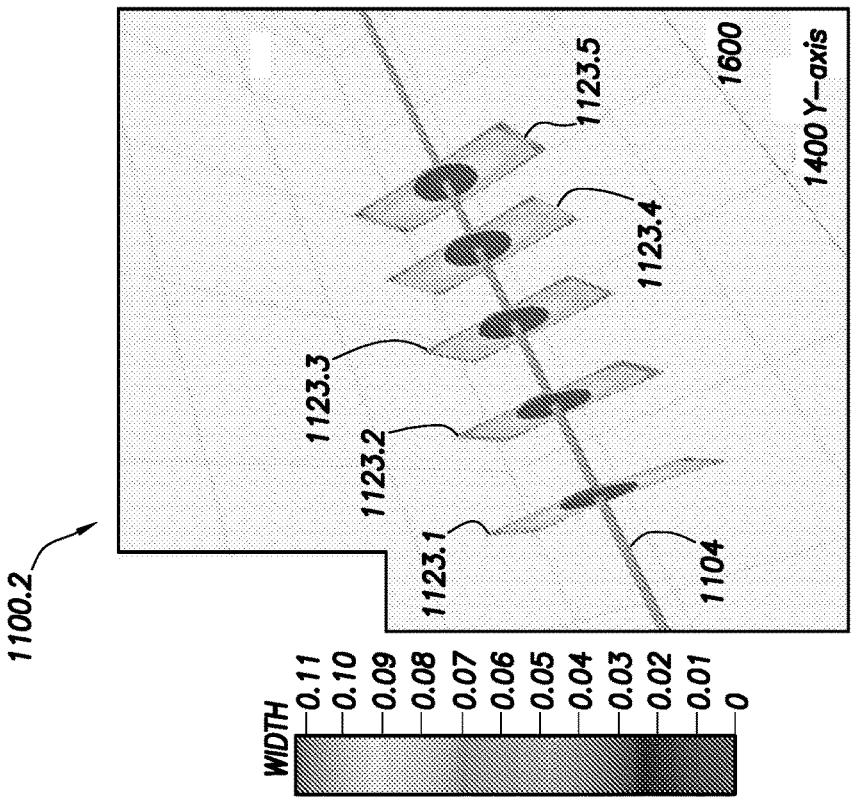
*FIG.11.2*
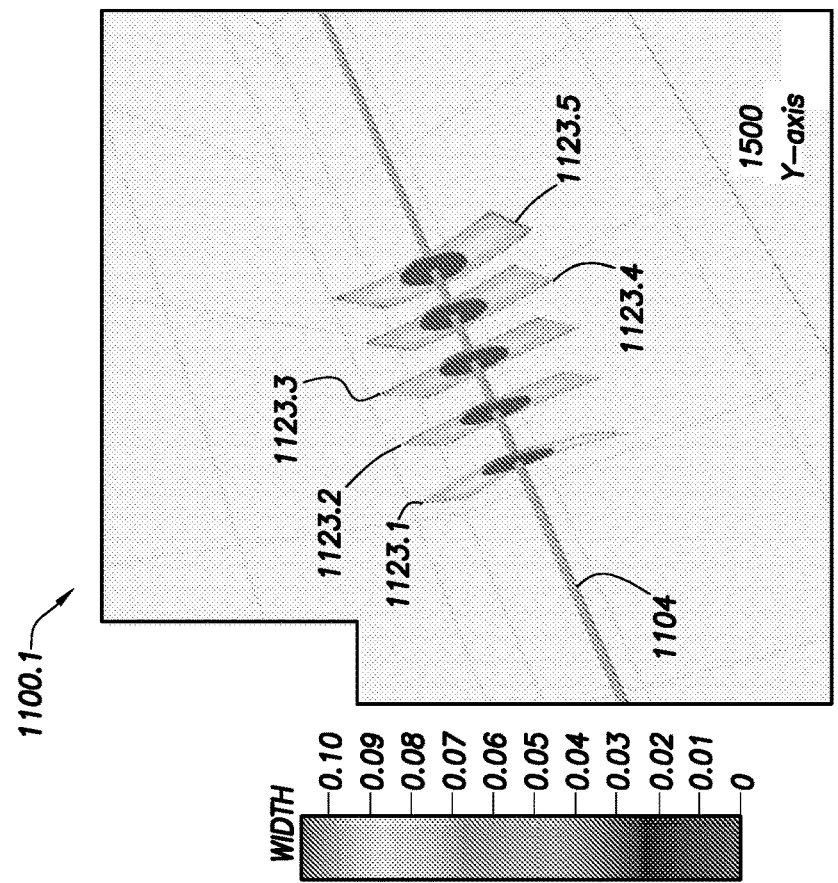
*FIG.11.1*

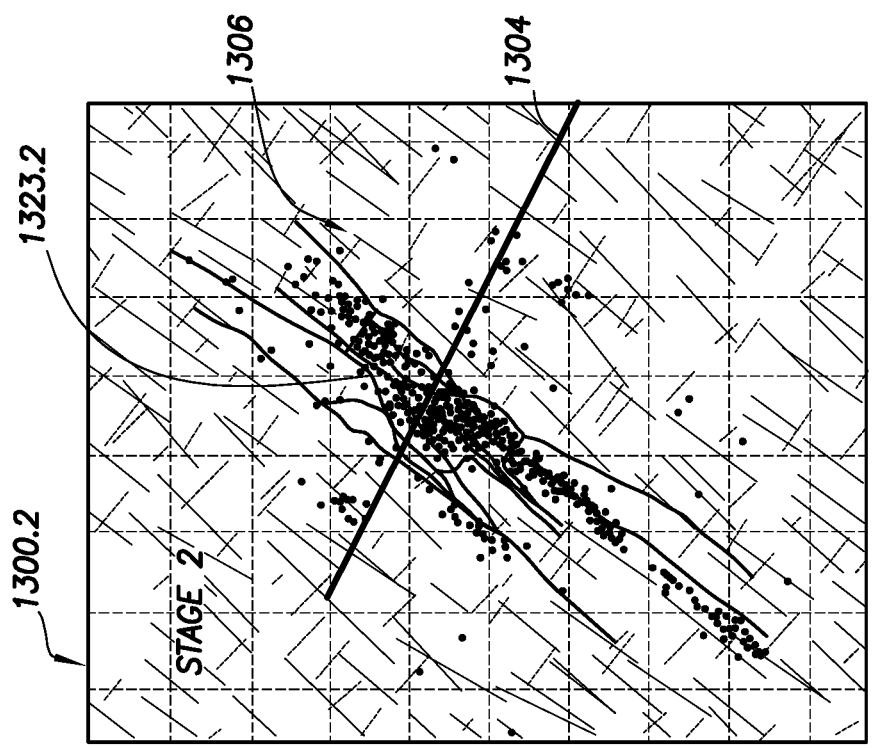
FIG.13.2
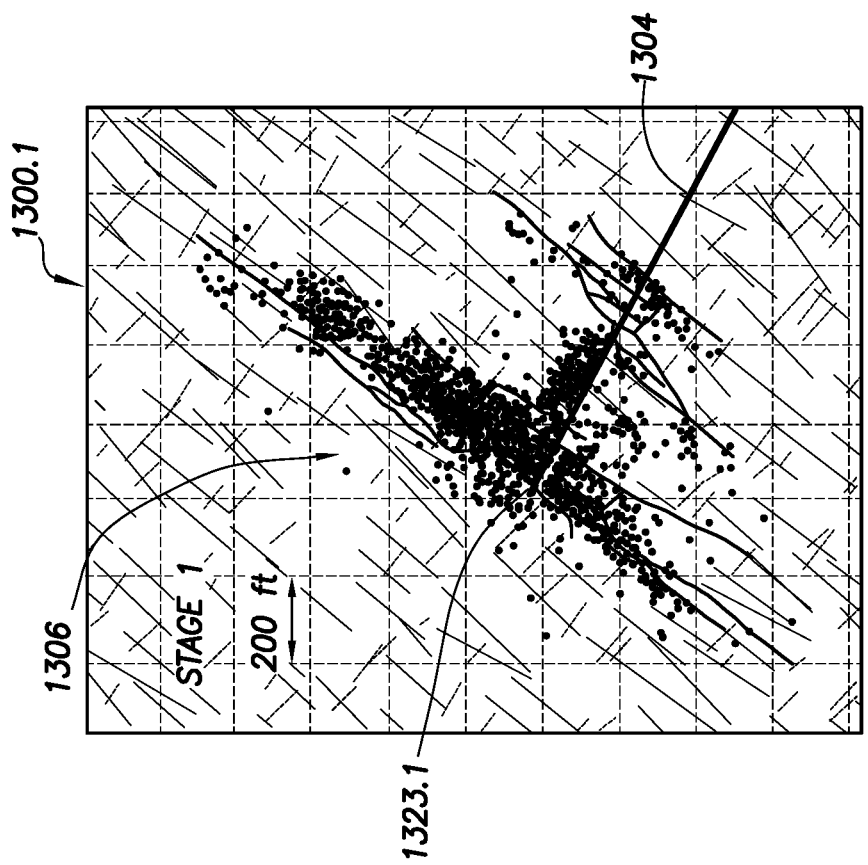
FIG.13.1

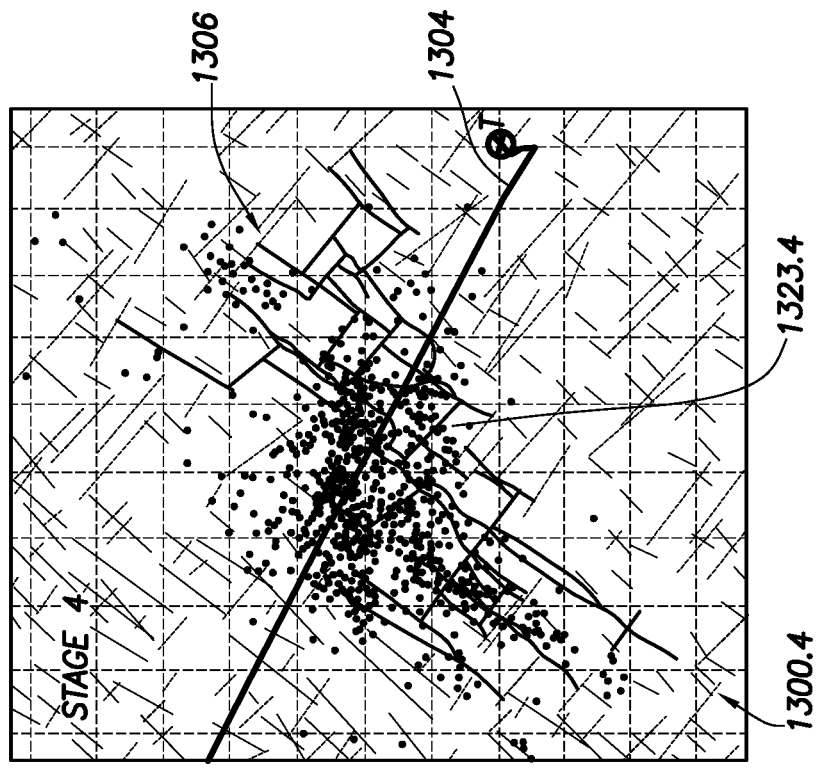
FIG.13.4
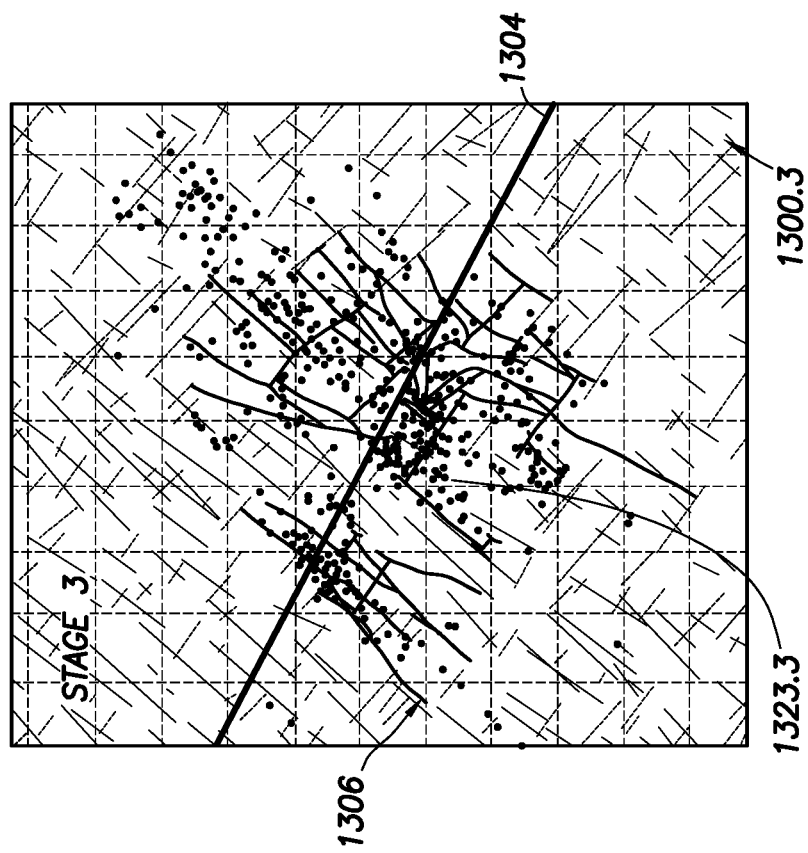
FIG.13.3

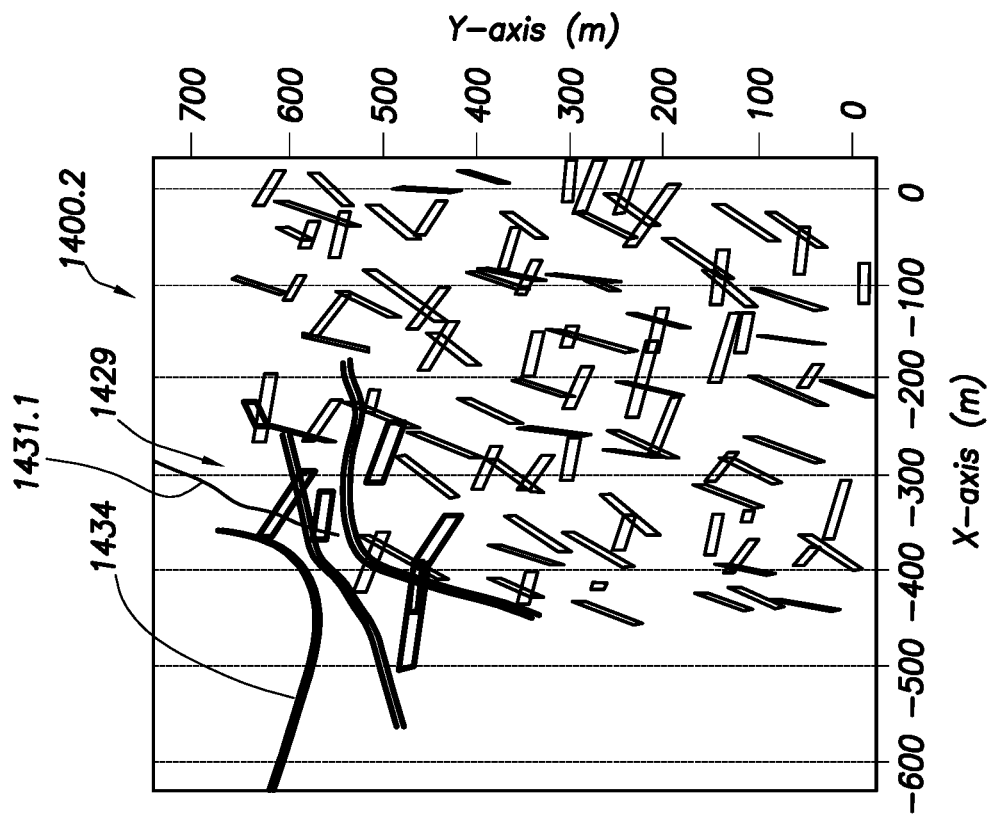
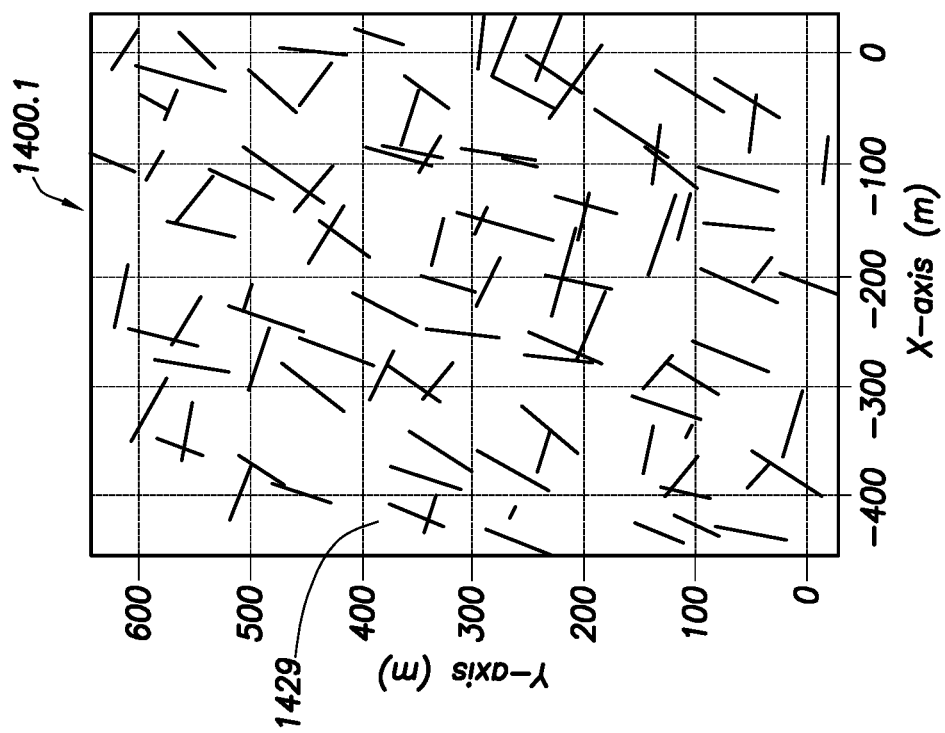

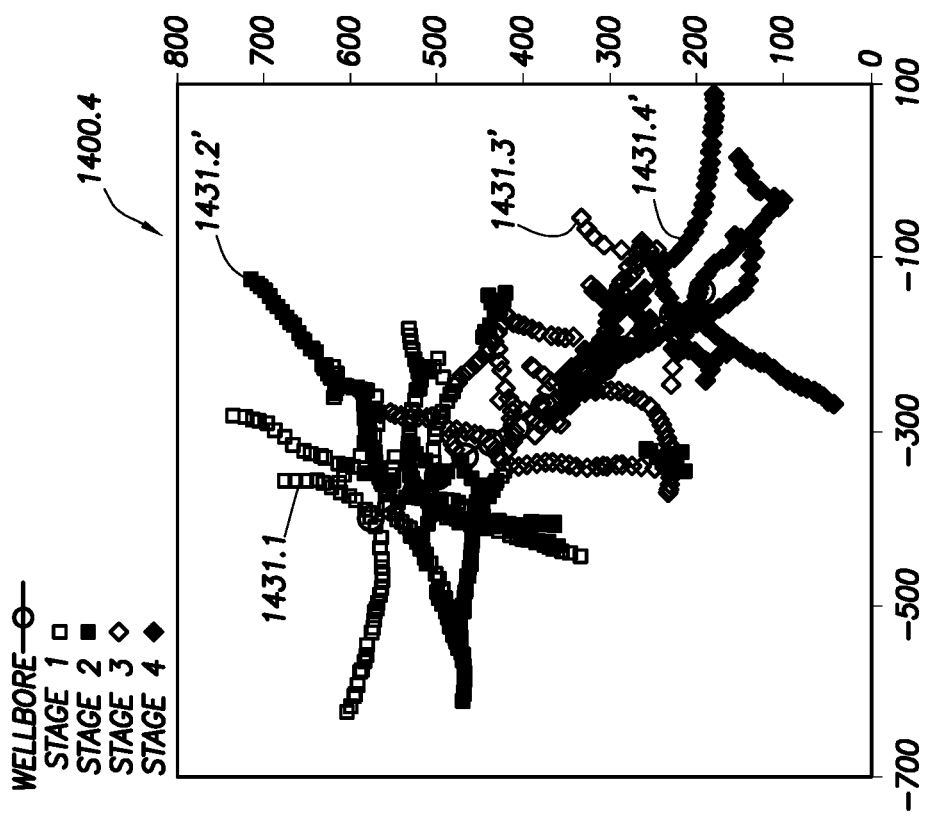
FIG.14.4
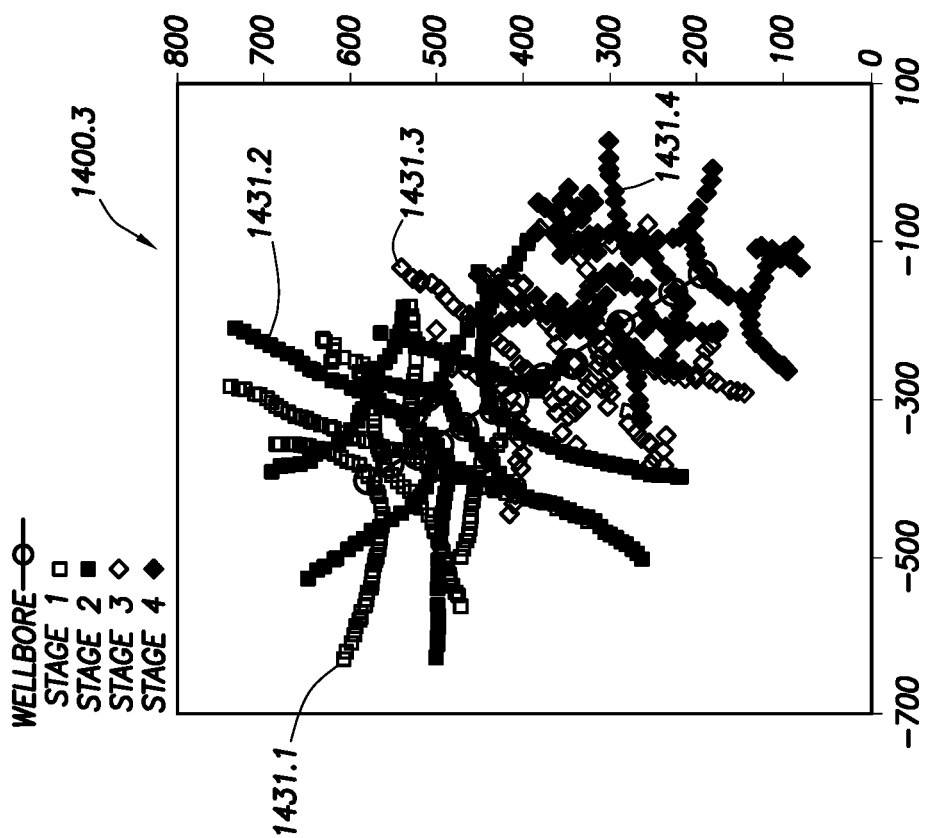
FIG.14.3

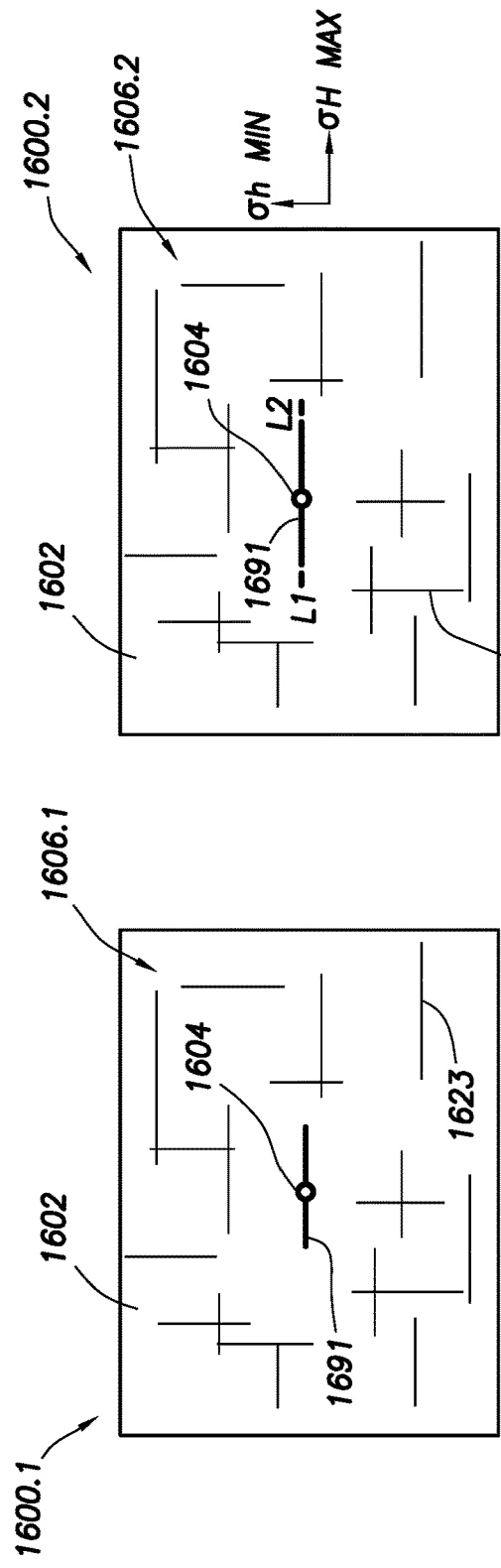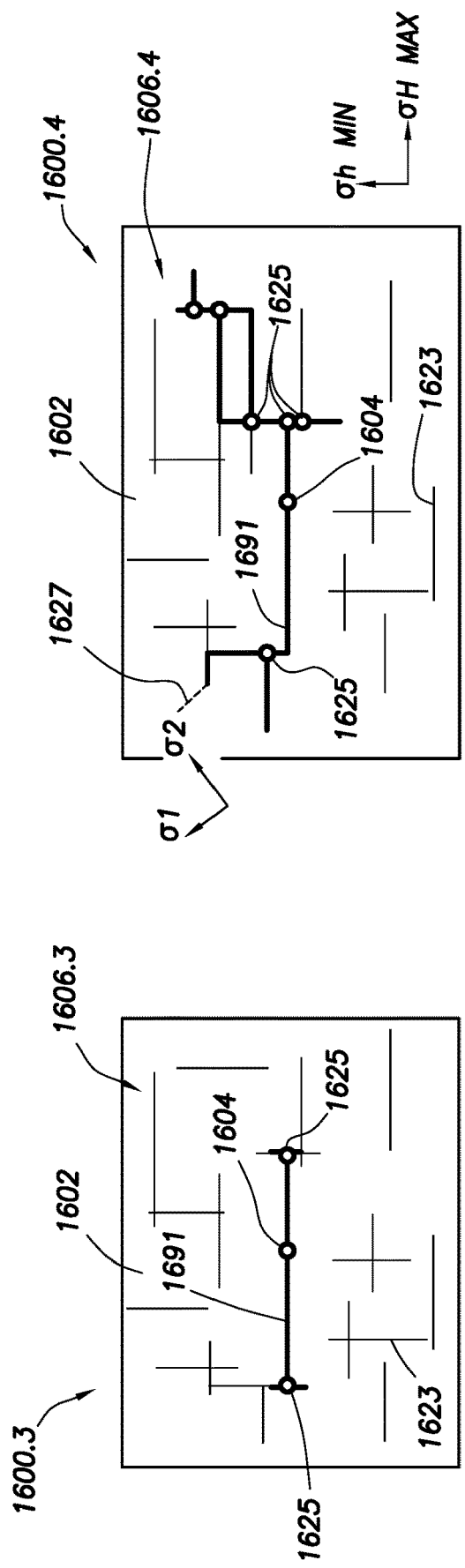

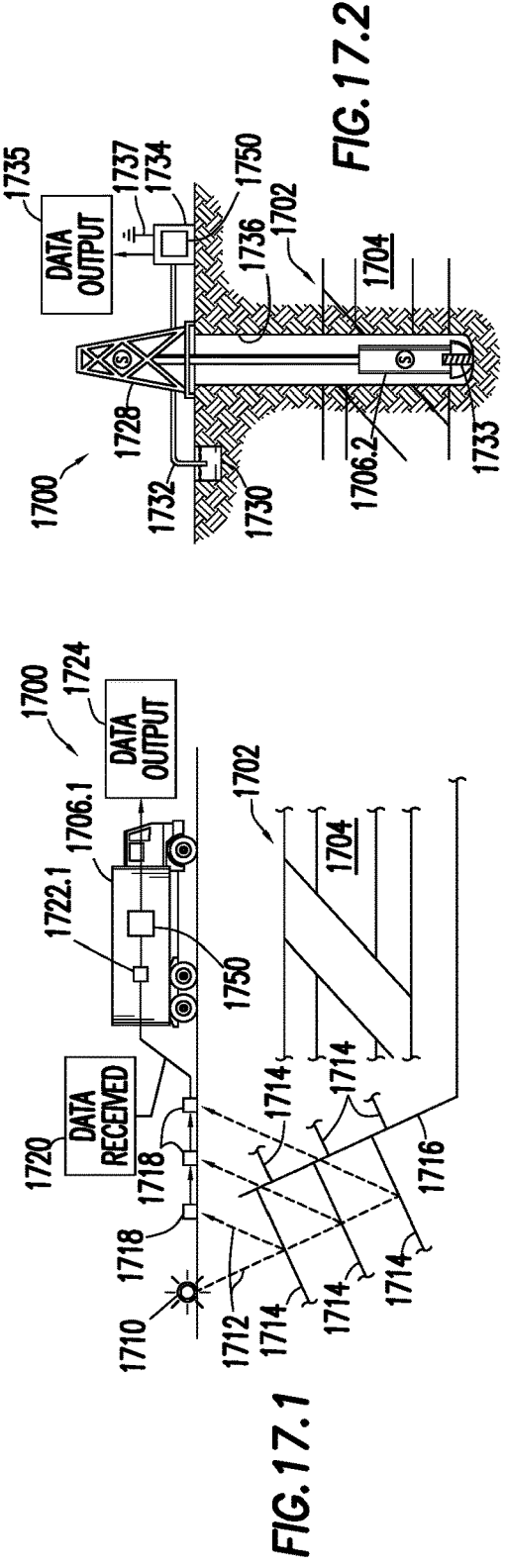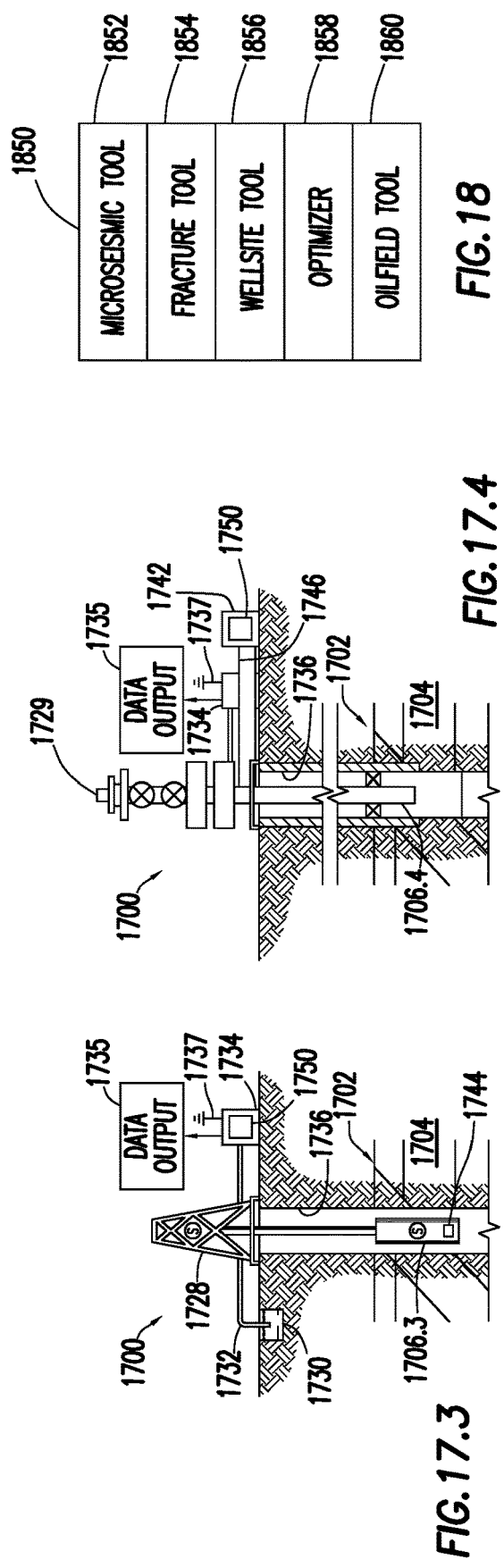

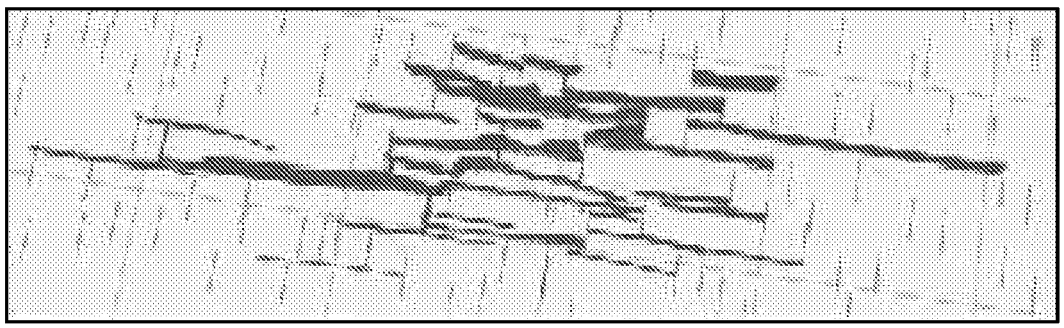
FIG.23.1
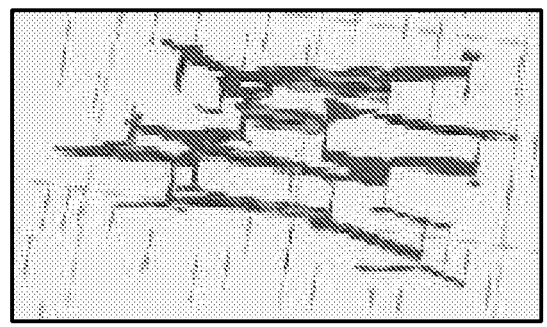
FIG.23.2
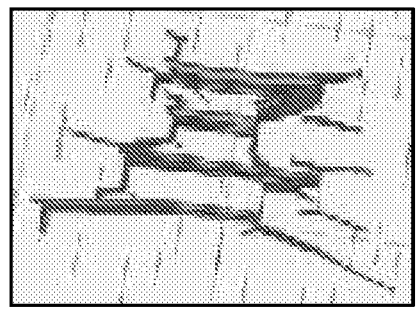
FIG.23.3

*FIG.25.1*
*FIG.25.2*
*FIG.25.3*
*FIG.24.1*
*FIG.24.2*
*FIG.24.3*

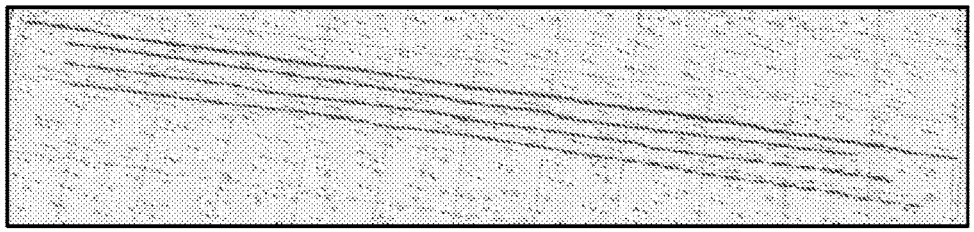
ANGLE=10°
FIG.26.1
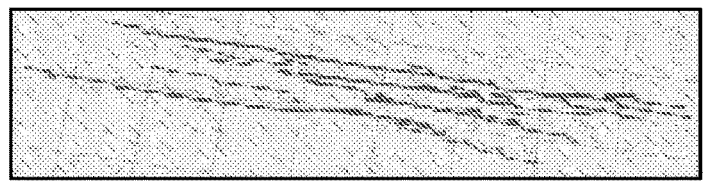
ANGLE=30°
FIG.26.2
ANGLE=45°
FIG.26.3
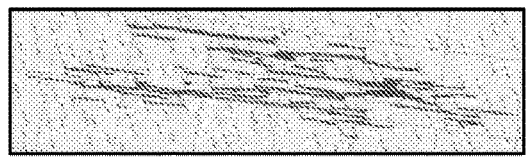
ANGLE=60°
FIG.26.4
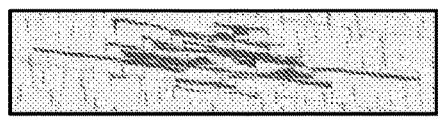
ANGLE=75°
FIG.26.5
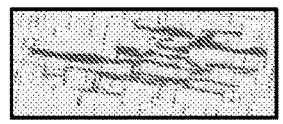
ANGLE=90°
FIG.26.6

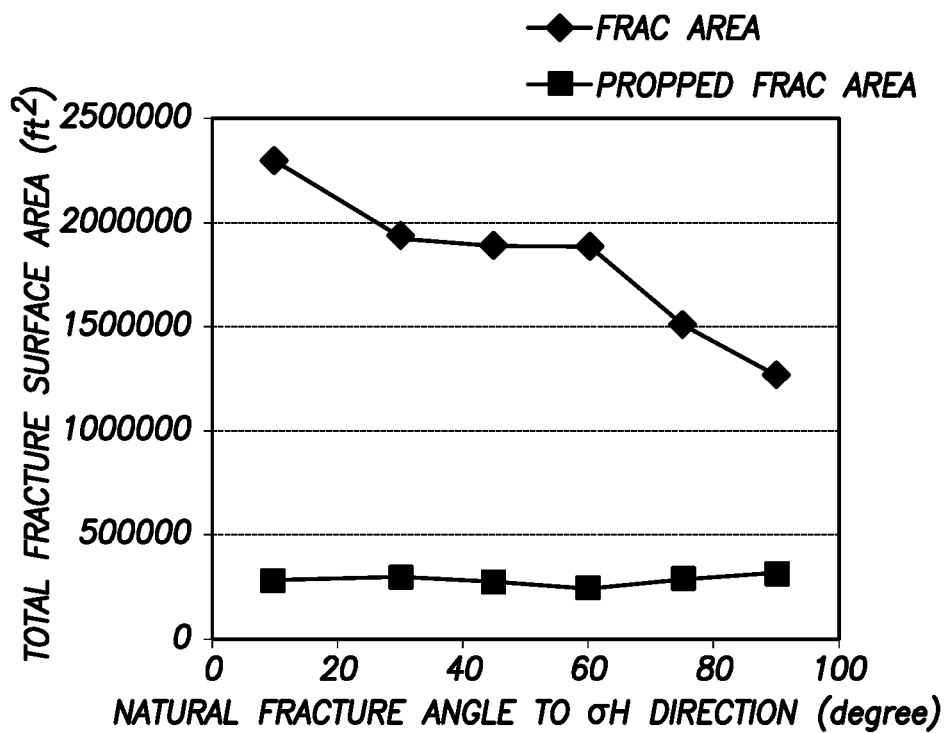
FIG.27.1
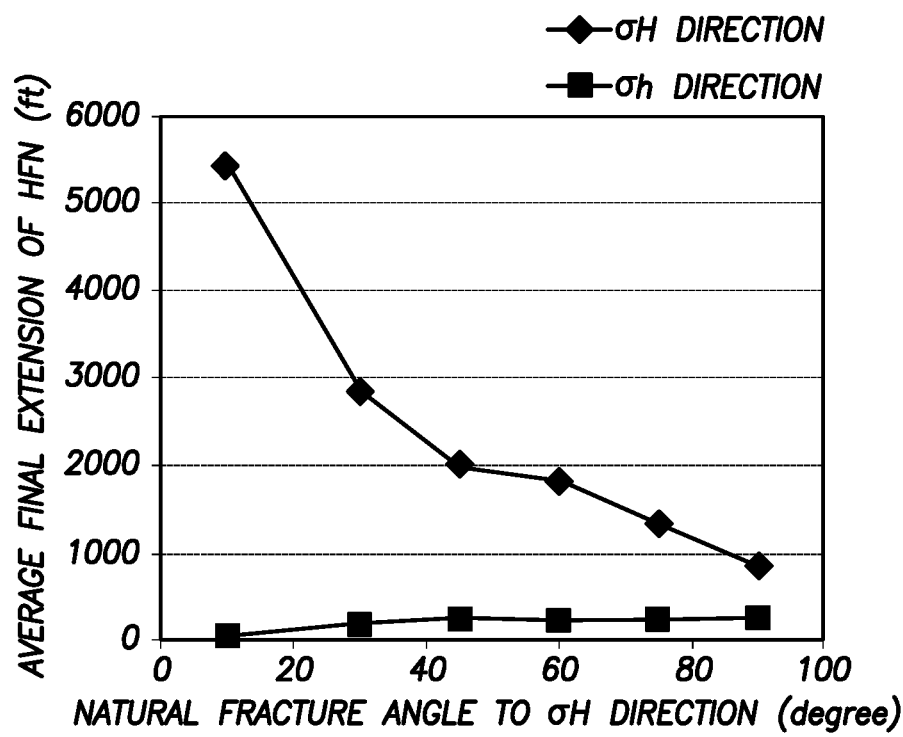
FIG.27.2

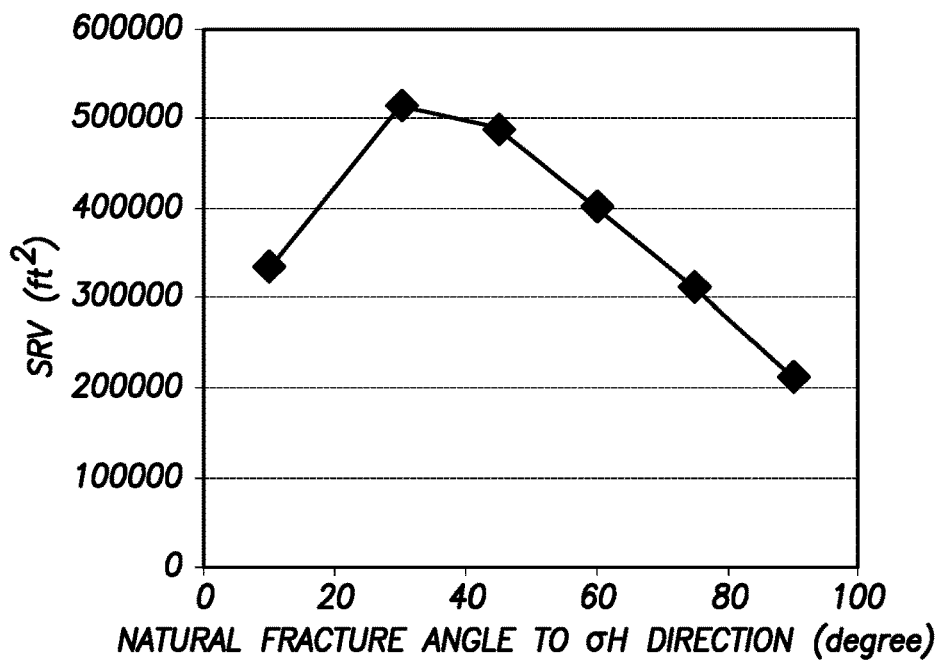
FIG.27.3
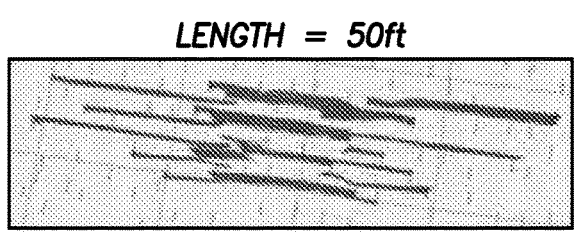
FIG.28.1
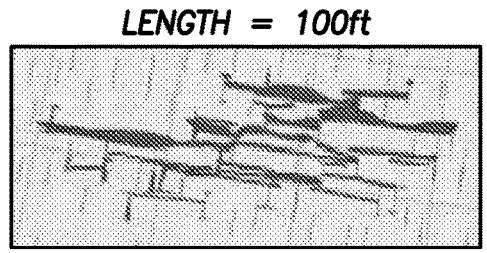
FIG.28.2
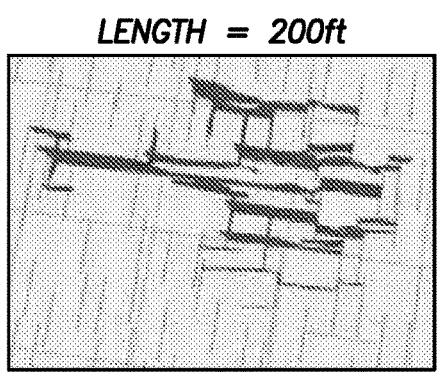
FIG.28.3
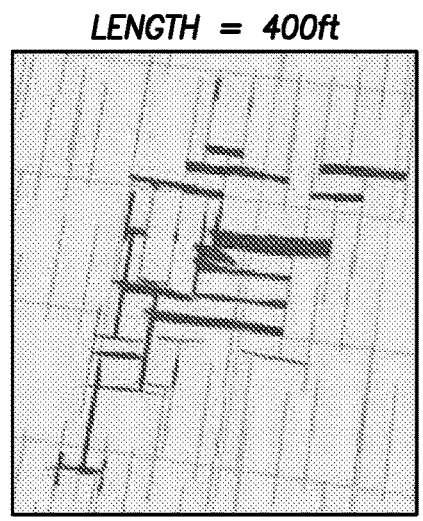
FIG.28.4

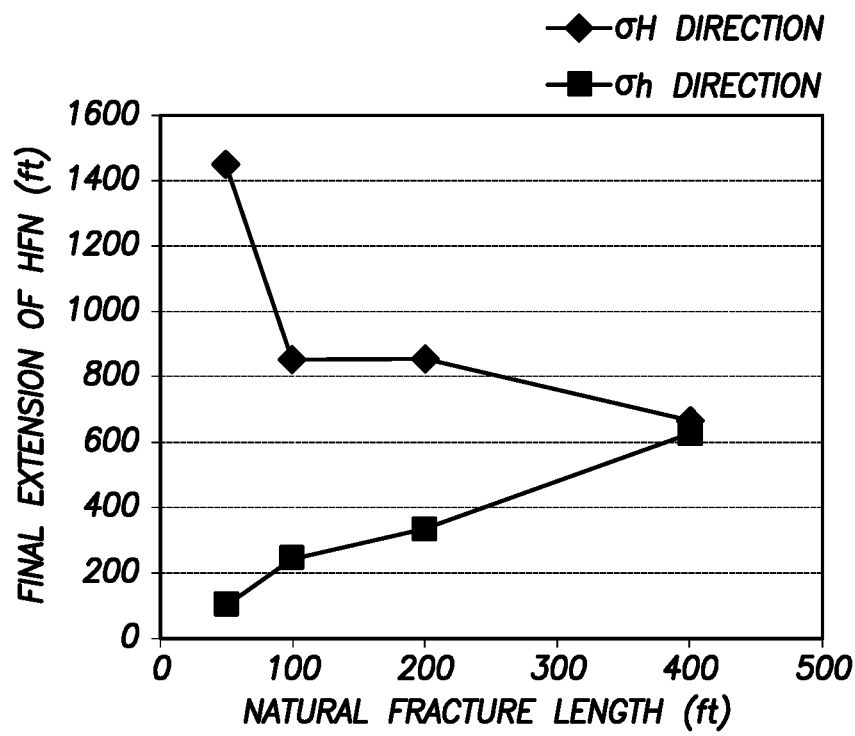
FIG.29.1
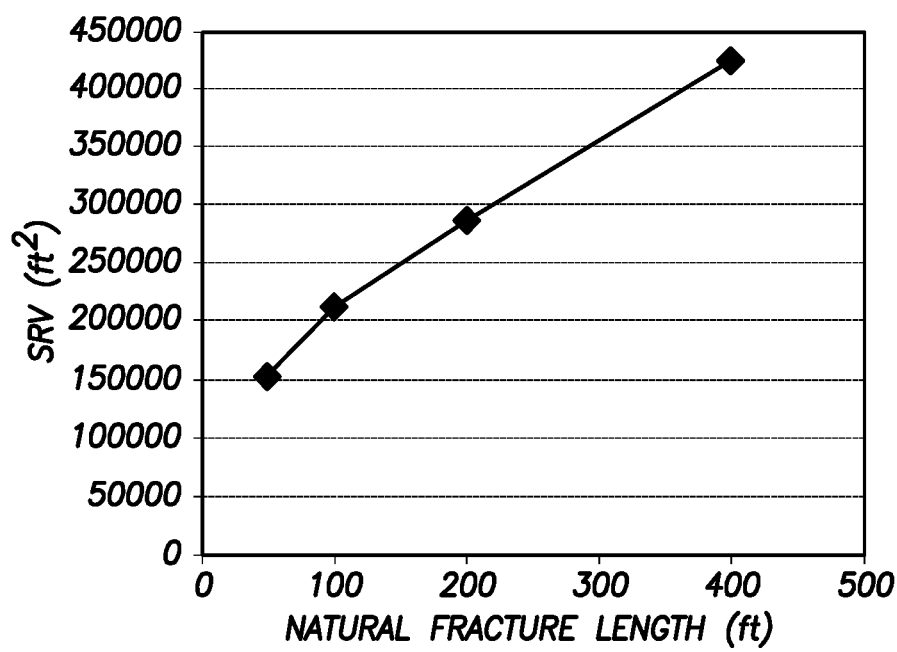
FIG.29.2

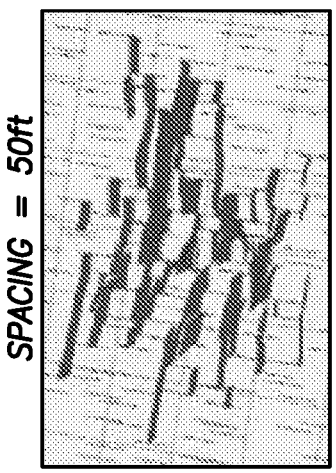
*FIG.30.2* SPACING = 50ft
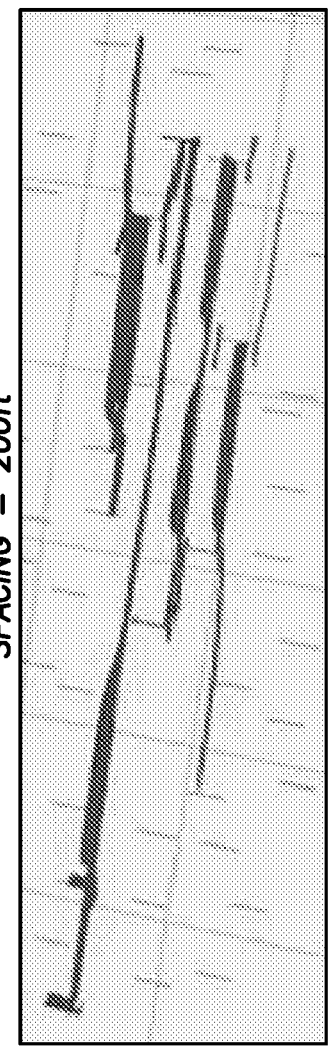
*FIG.30.4* SPACING = 200ft
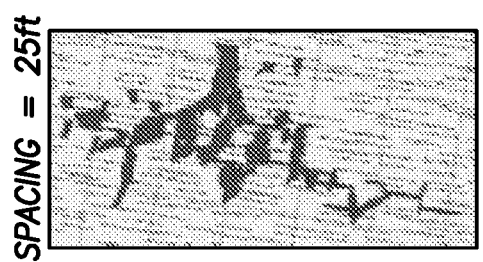
*FIG.30.1* SPACING = 25ft
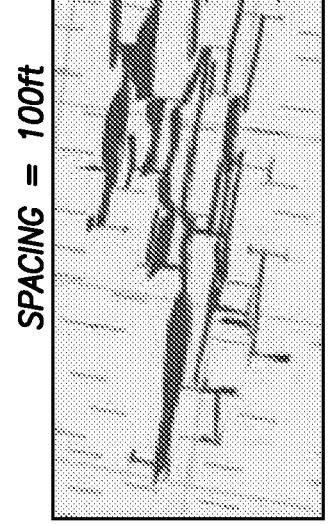
*FIG.30.3* SPACING = 100ft

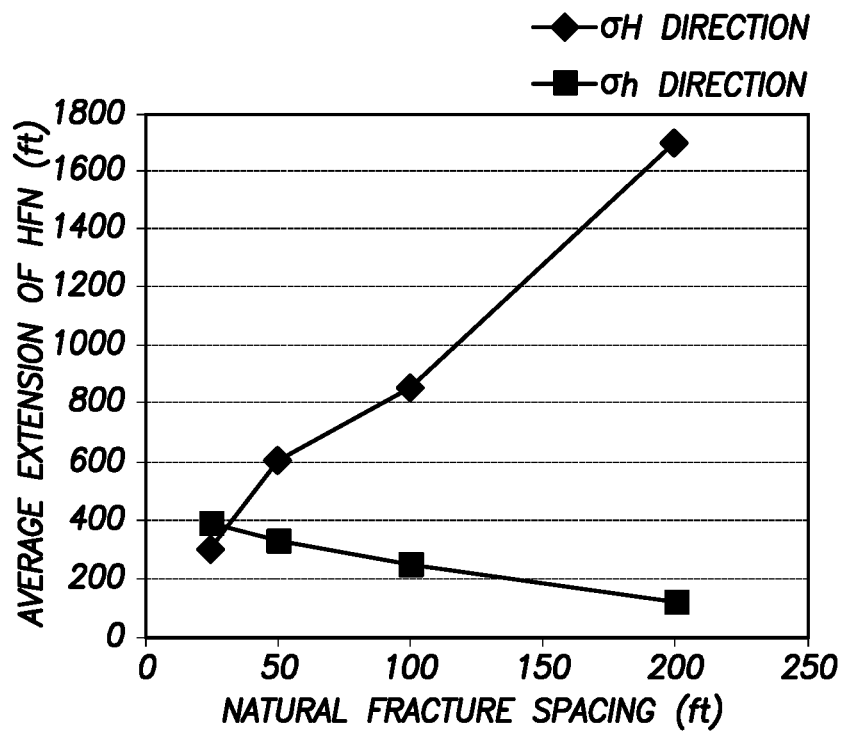
FIG.31.1
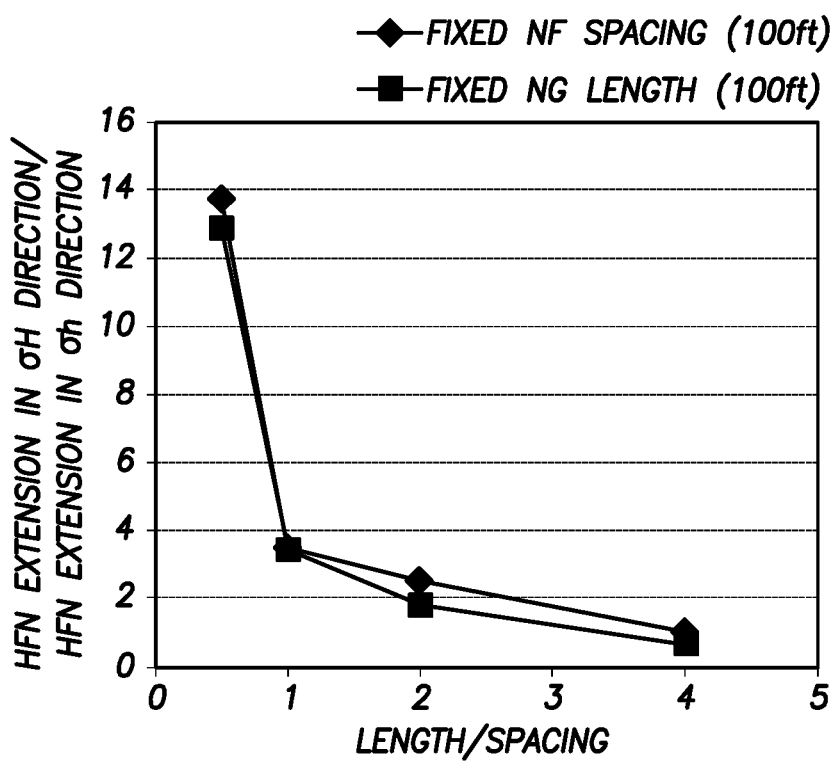
FIG.31.2

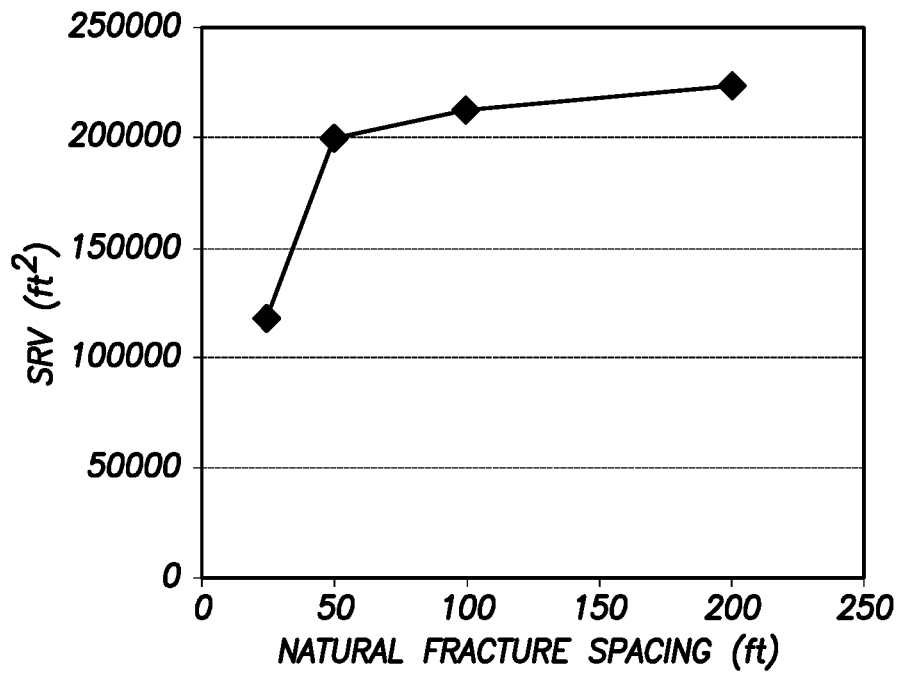
FIG.31.3
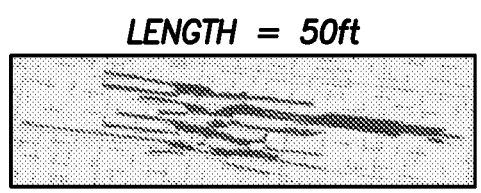
FIG.32.1
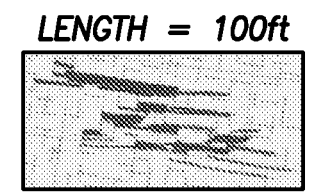
FIG.32.2
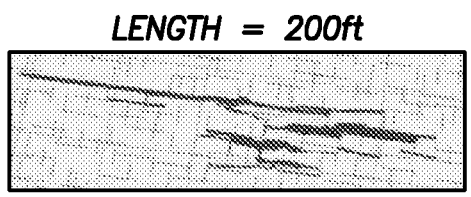
FIG.32.3
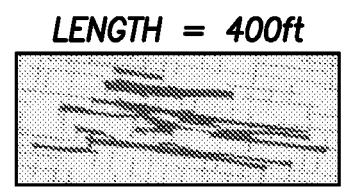
FIG.32.4

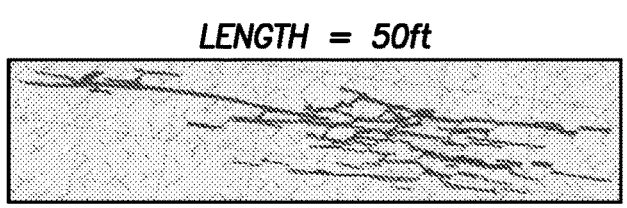
FIG.33.1
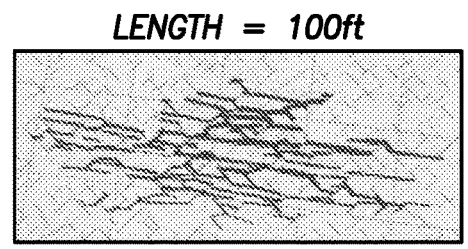
FIG.33.2
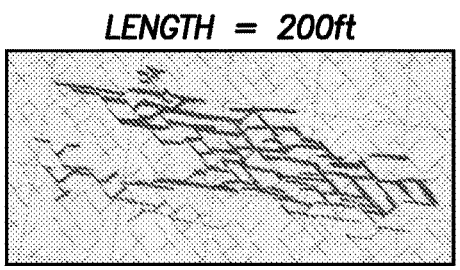
FIG.33.3
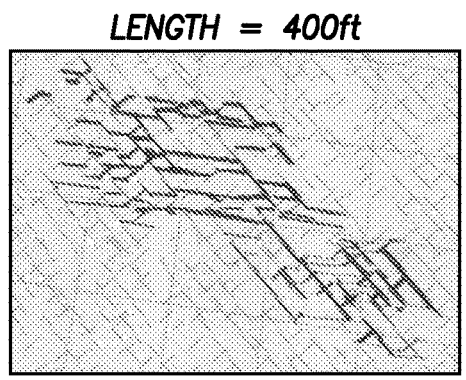
FIG.33.4
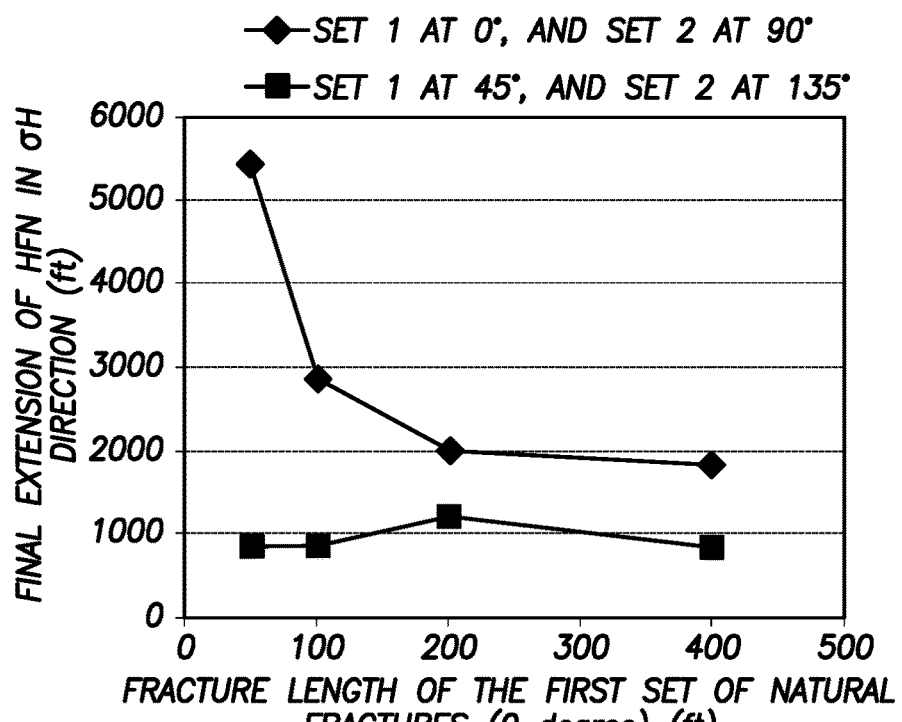
FIG.34

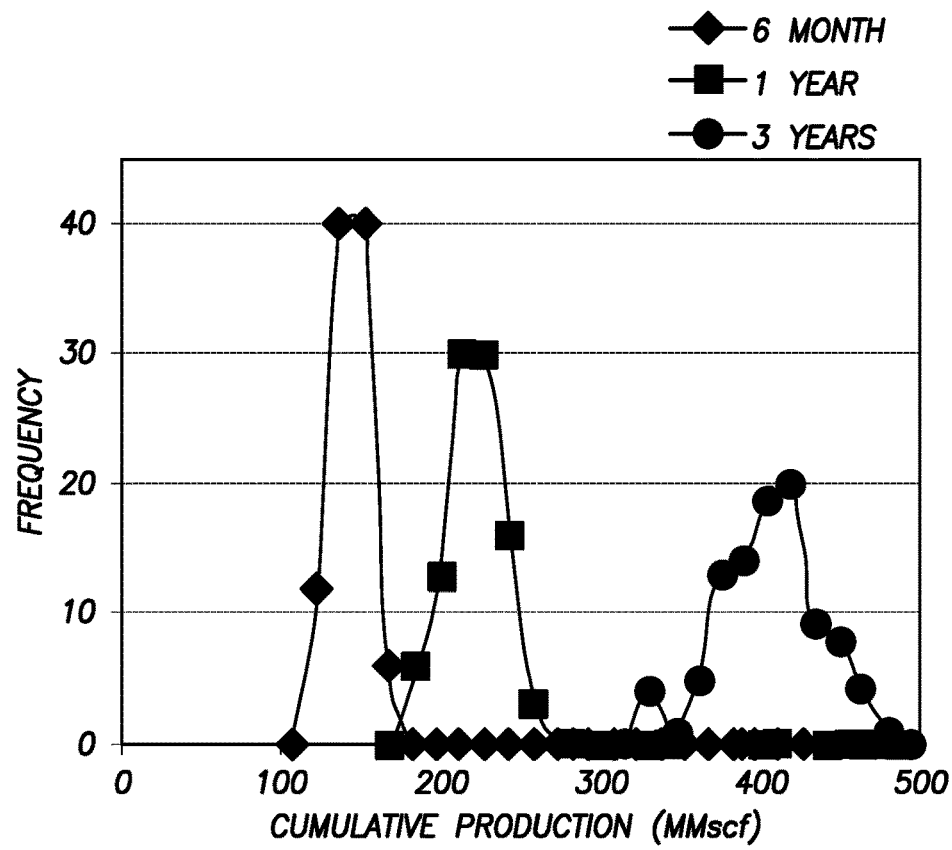
FIG.37.1
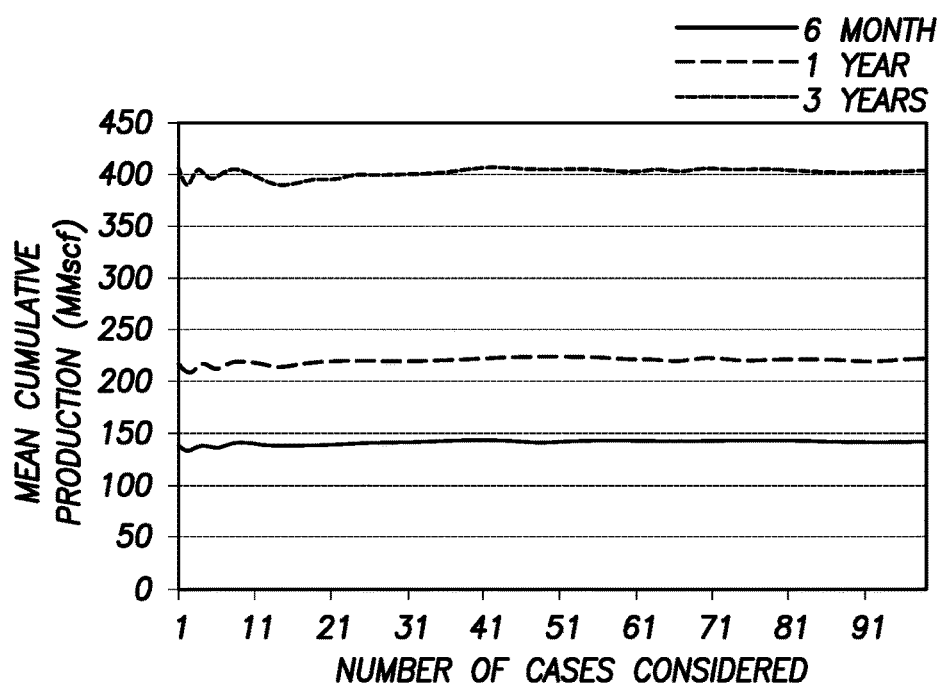
FIG.37.2

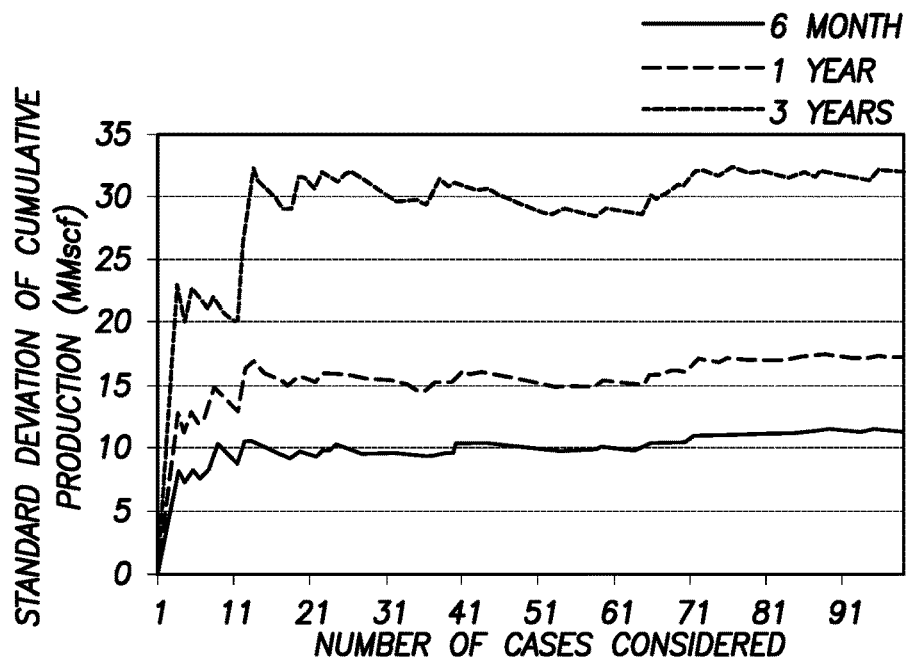
FIG.37.3
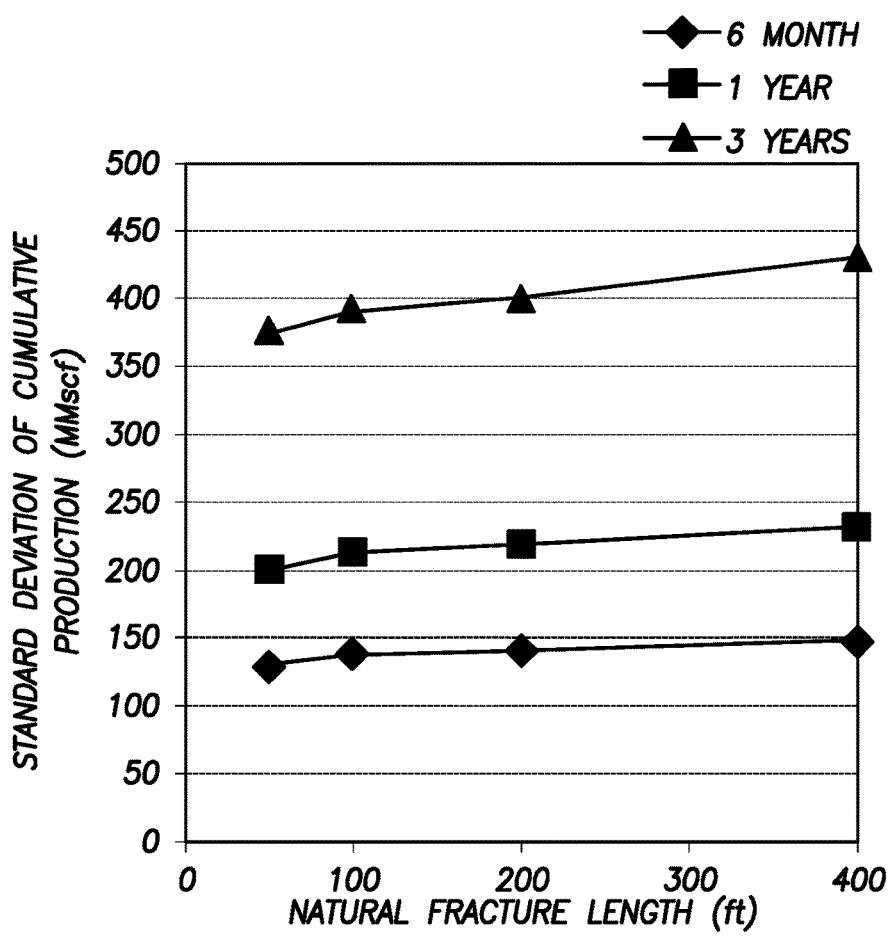
FIG.38.1

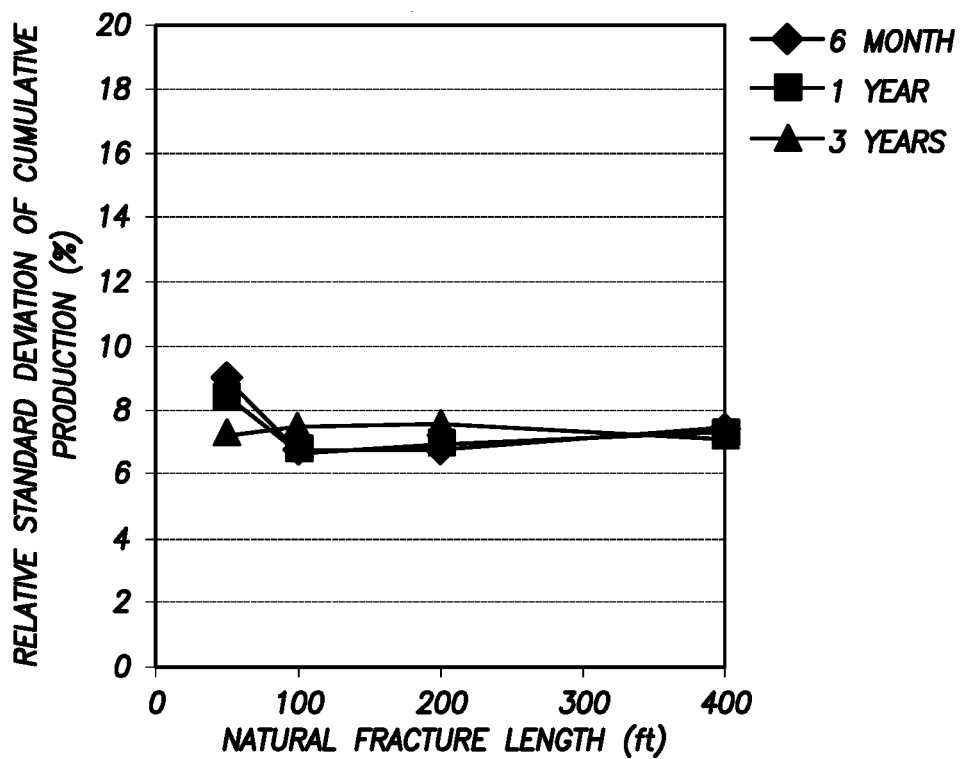
FIG.38.2
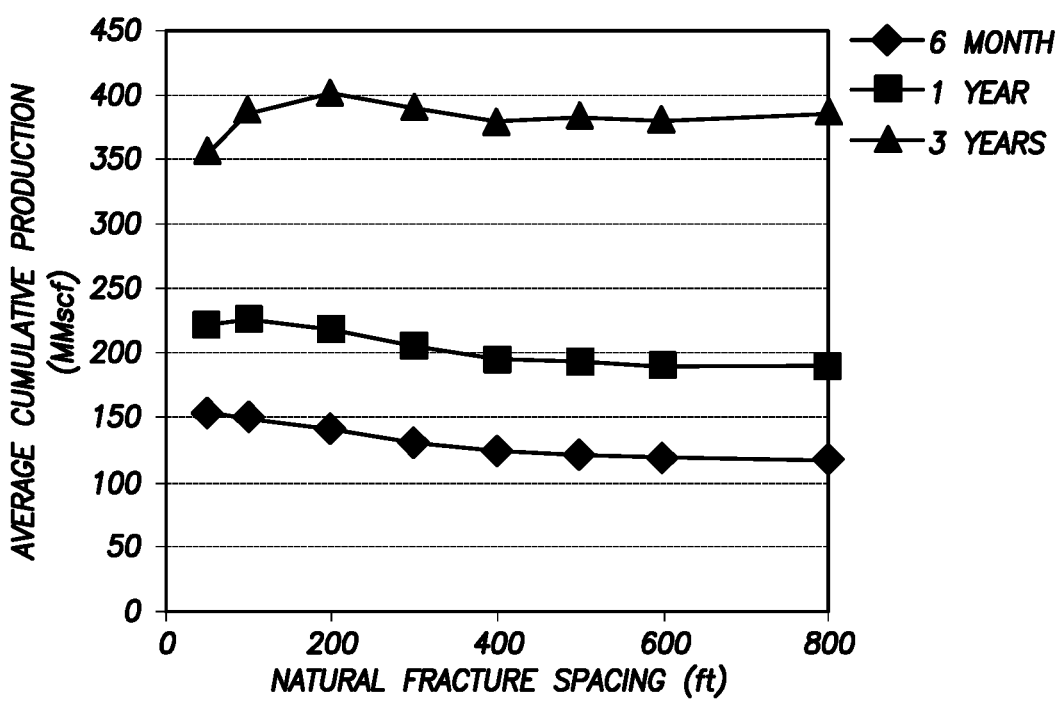
FIG.39

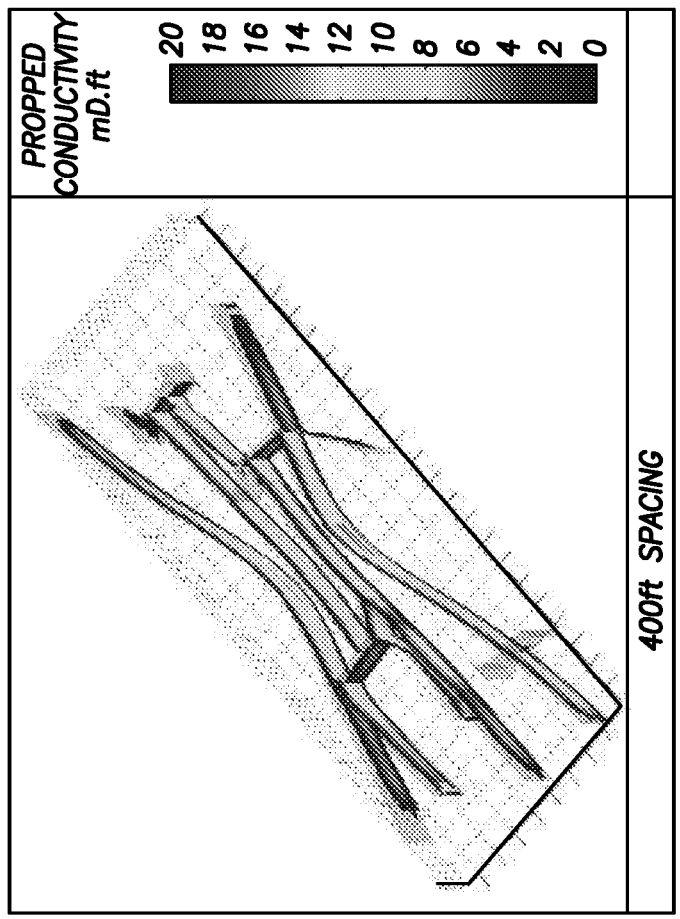
FIG.40.2
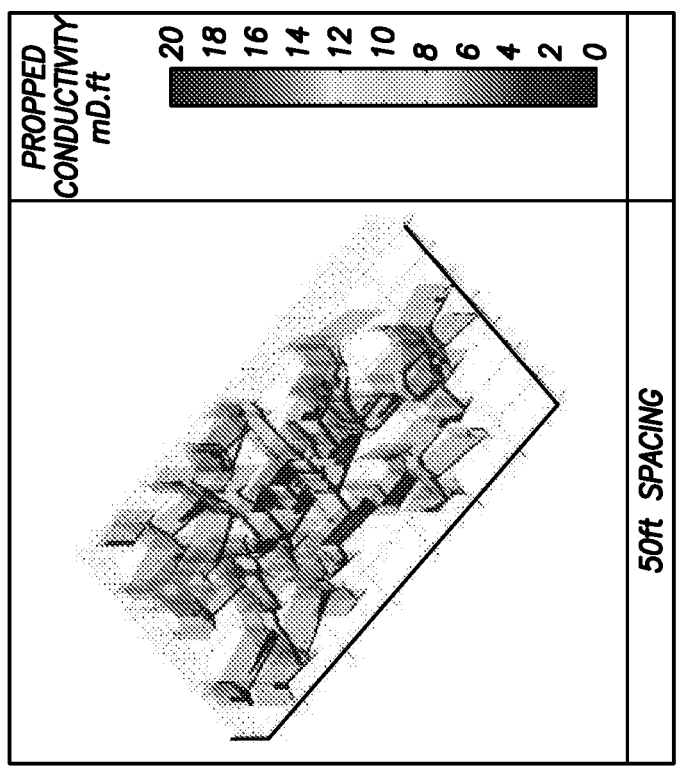
FIG.40.1

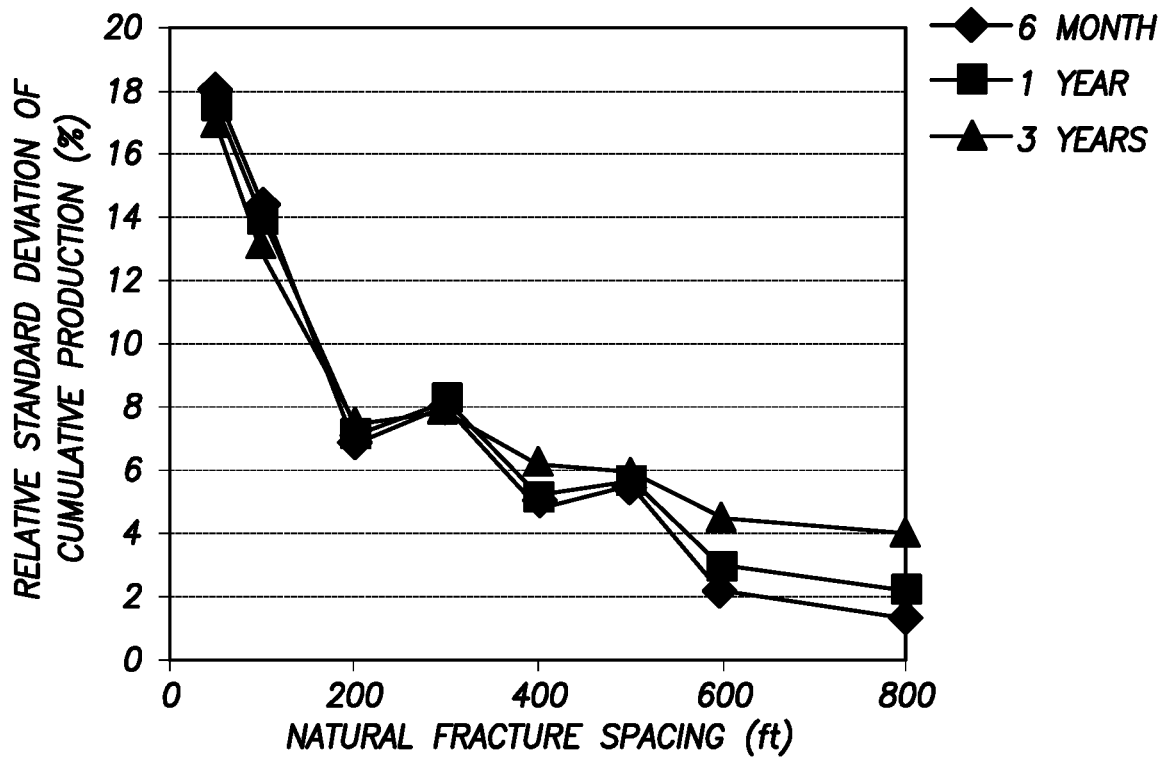
FIG.41.1
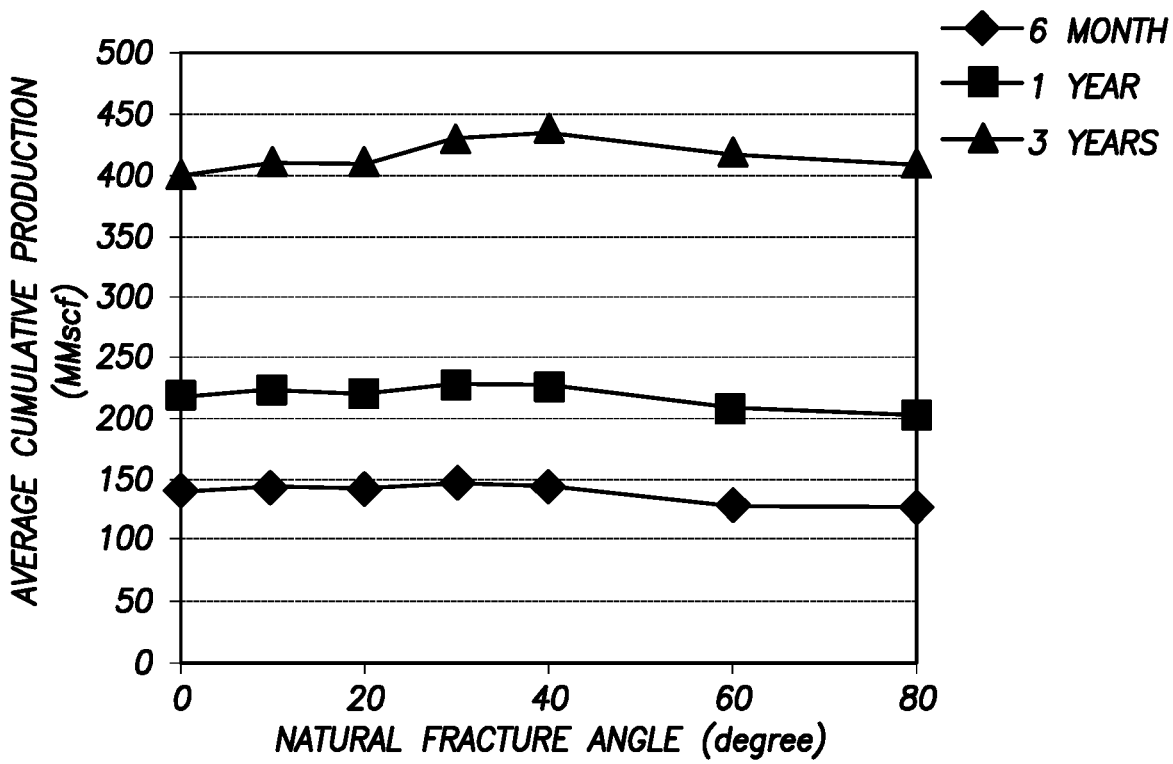
FIG.41.2

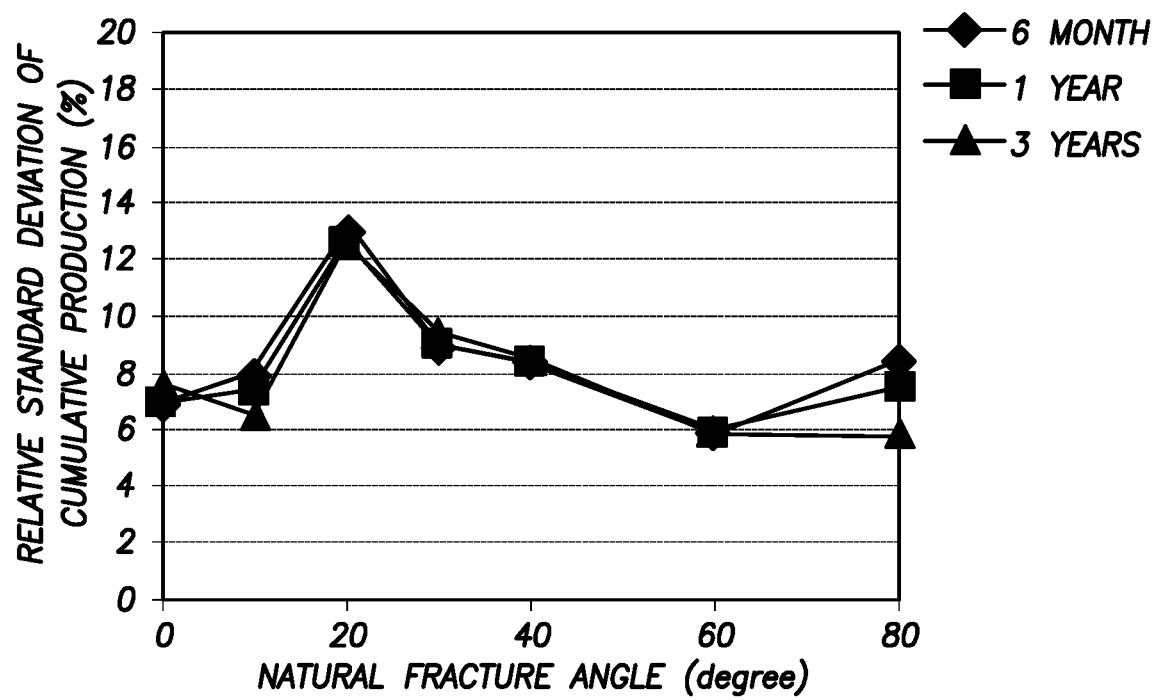
FIG.41.3
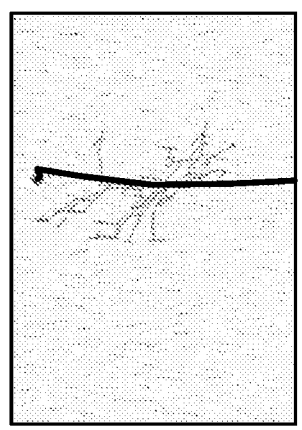
FIG.42.1
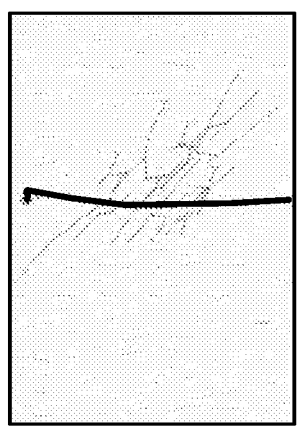
FIG.42.2
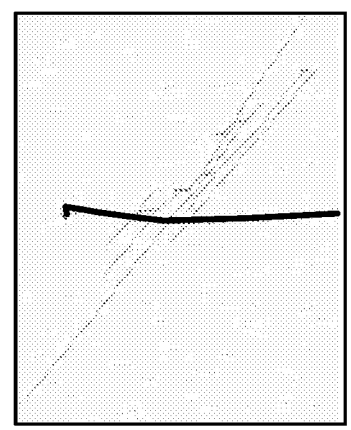
FIG.42.3

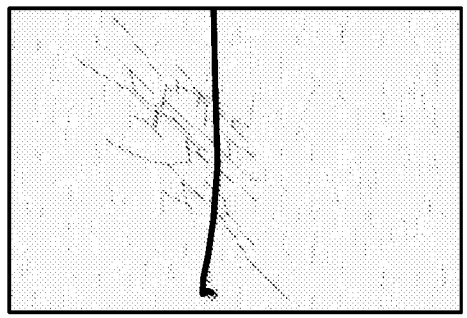
FIG. 43.1
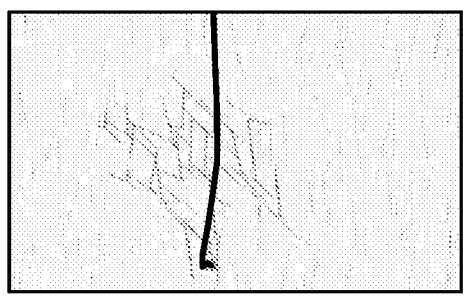
FIG. 43.2
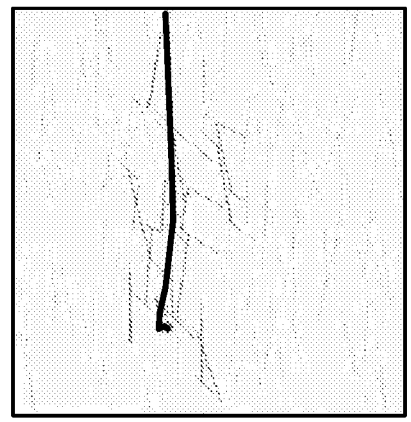
FIG. 43.3
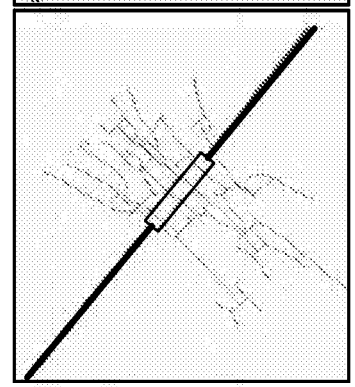
FIG. 44.1
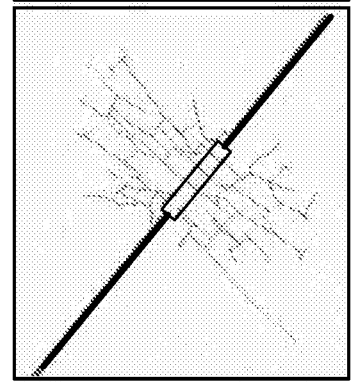
FIG. 44.2
FIG. 44.3

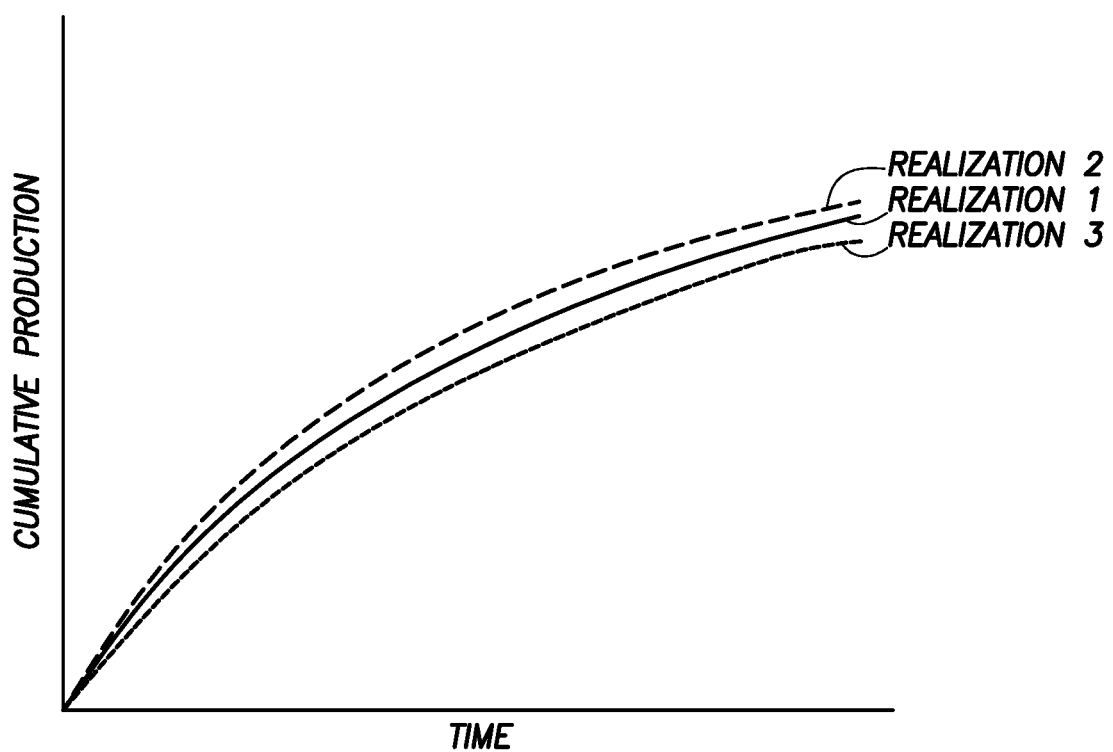
FIG.45.1
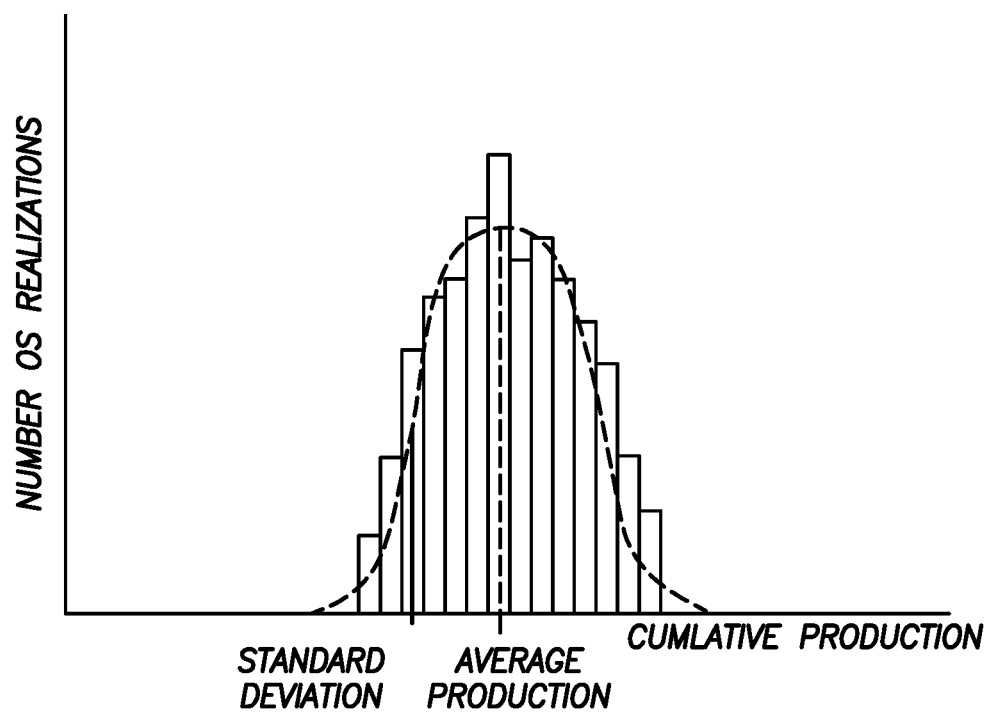
FIG.45.2

METHOD OF PERFORMING WELLSITE FRACTURE OPERATIONS WITH STATISTICAL UNCERTAINTIES

CROSS-REFERENCE TO RELATED APPLICATIONS

This application claims the benefit of U.S. Provisional Application No. 62/108,841 filed on Jan. 28, 2015, the entire contents of which is hereby incorporated by reference herein.

BACKGROUND

The present disclosure relates generally to techniques for performing wellsite operations. More particularly, this disclosure is directed to techniques for performing fracture operations, such as perforating, injecting, fracturing, stimulating, monitoring, investigating, and/or characterizing a subterranean formation to facilitate production of fluids therefrom.

In order to facilitate the recovery of hydrocarbons from oil and gas wells, the subterranean formations surrounding such wells can be hydraulically fractured. Hydraulic fracturing may be used to create cracks in subsurface formations to allow oil or gas to move toward the well. A formation is fractured by introducing a specially engineered fluid (referred to as "fracturing fluid" or "fracturing slurry" herein) at high pressure and high flow rates into the formation through one or more wellbores. Hydraulic fractures may extend away from the wellbore hundreds of feet in two opposing directions according to the natural stresses within the formation. Under certain circumstances, they may form a complex fracture network.

Current hydraulic fracture monitoring methods and systems may map where the fractures occur and the extent of the fractures. Some methods and systems of microseismic monitoring may process seismic event locations by mapping seismic arrival times and polarization information into three-dimensional space through the use of modeled travel times and/or ray paths. These methods and systems can be used to infer hydraulic fracture propagation over time.

Patterns of hydraulic fractures created by the fracturing stimulation may be complex and may form a fracture network as indicated by a distribution of associated microseismic events. Complex hydraulic fracture networks have been developed to represent the created hydraulic fractures. Hydraulic fracture networks may be modeled to predict fracturing, production, and/or other oilfield operations. Examples of fracture models are provided in U.S. Pat. Nos. 6,101,447, 7,363,162, 7,788,074, 20080133186, 20100138196, and 20100250215.

SUMMARY

In at least one aspect, the present disclosure relates to methods of performing a fracture operation at a wellsite. The wellsite is positioned about a subterranean formation having a wellbore therethrough and a fracture network therein. The fracture network has natural fractures therein. The wellsite may be stimulated by injection of an injection fluid with proppant into the fracture network. The method involves obtaining wellsite data comprising natural fracture parameters of the natural fractures and obtaining a mechanical earth model of the subterranean formation and generating a hydraulic fracture growth pattern for the fracture network over time. The generating involves extending hydraulic fractures from the wellbore and into the fracture network of the subterranean formation to form a hydraulic fracture network including the natural fractures and the hydraulic fractures, determining hydraulic fracture parameters of the hydraulic fractures after the extending, determining transport parameters for the proppant passing through the hydraulic fracture network, and determining fracture dimensions of the hydraulic fractures from the determined hydraulic fracture parameters, the determined transport parameters and the mechanical earth model. The method also involves performing stress shadowing on the hydraulic fractures to determine stress interference between the hydraulic fractures and repeating the generating based on the determined stress interference.

If the hydraulic fracture encounters a natural fracture, the method may also involve determining the crossing behavior between the hydraulic fractures and an encountered fracture based on the determined stress interference, and the repeating may involve repeating the generating based on the determined stress interference and the crossing behavior. The method may also involve stimulating the wellsite by injection of an injection fluid with proppant into the fracture network.

The method may also involve, if the hydraulic fracture encounters a natural fracture, determining the crossing behavior at the encountered natural fracture, and wherein the repeating comprises repeating the generating based on the determined stress interference and the crossing behavior. The fracture growth pattern may be altered or unaltered by the crossing behavior. A fracture pressure of the hydraulic fracture network may be greater than a stress acting on the encountered fracture, and the fracture growth pattern may propagate along the encountered fracture. The fracture growth pattern may continue to propagate along the encountered fracture until an end of the natural fracture is reached. The fracture growth pattern may change direction at the end of the natural fracture, and the fracture growth pattern may extend in a direction normal to a minimum stress at the end of the natural fracture. The fracture growth pattern may propagate normal to a local principal stress according to the stress shadowing.

The stress shadowing may involve performing displacement discontinuity for each of the hydraulic fractures. The stress shadowing may involve performing stress shadowing about multiple wellbores of a wellsite and repeating the generating using the stress shadowing performed on the multiple wellbores. The stress shadowing may involve performing stress shadowing at multiple stimulation stages in the wellbore.

The method may also involve validating the fracture growth pattern. The validating may involve comparing the fracture growth pattern with at least one simulation of stimulation of the fracture network.

The extending may involve extending the hydraulic fractures along a fracture growth pattern based on the natural fracture parameters and a minimum stress and a maximum stress on the subterranean formation. The determining fracture dimensions may include one of evaluating seismic measurements, ant tracking, sonic measurements, geological measurements and combinations thereof. The wellsite data may include at least one of geological, petrophysical, geomechanical, log measurements, completion, historical and combinations thereof. The natural fracture parameters may be generated by one of observing borehole imaging logs, estimating fracture dimensions from wellbore measurements, obtaining microseismic images, and combinations thereof.

In yet another aspect, the disclosure relates to a method of performing a fracture operation at a wellsite. The wellsite is positioned about a subterranean formation having a wellbore therethrough and a fracture network therein. The fracture network includes natural fractures. The method involves stimulating the wellsite by injecting of an injection fluid with proppant into the fracture network; obtaining wellsite data comprising natural fracture parameters of the natural fractures and obtaining a mechanical earth model of the subterranean formation; defining the natural fractures based on the wellsite data by generating one or more realizations of the natural fracture data based on a statistical distribution of the natural fracture parameters; generating a statistical distribution of predicted fluid production by generating a hydraulic fracture growth pattern for the fracture network over time based on each defined realization and predicting fluid production from the formation based on the defined realizations; selecting a reference production from the generated statistical distribution; and optimizing production and uncertainty by adjusting the stimulating operations based on the selecting.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the system and method for generating a hydraulic fracture growth pattern are described with reference to the following figures. The same numbers are used throughout the figures to reference like features and components.

FIG. 1.2 is a schematic illustration of a hydraulic fracture site with microseismic events depicted thereon;

FIG. 2 is a schematic illustration of a 2D fracture;

FIG. 3.1 is a schematic illustration of a stress shadow effect and FIG. 3.2 is a blown up view of region 3.2 of FIG. 3.1;

FIG. 4 is a schematic illustration comparing 2D DDM and Flac3D for two parallel straight fractures;

FIGS. 5.1-5.3 are graphs illustrating 2D DDM and Flac3D of extended fractures for stresses in various positions;

FIGS. 6.1-6.2 are graphs depicting propagation paths for two initially parallel fractures in isotropic and anisotropic stress fields, respectively;

FIGS. 7.1-7.2 are graphs depicting propagation paths for two initially offset fractures in isotropic and anisotropic stress fields, respectively;

FIGS. 11.1-11.2 are schematic diagrams depicting fracture geometry for a high perforation friction case and a large fracture spacing case, respectively;

FIGS. 13.1-13.4 are schematic diagrams illustrating a simulated fracture network compared to the microseismic measurements for stages 1-4, respectively;

FIGS. 14.1-14.4 are schematic diagrams depicting a distributed fracture network at various stages;

FIGS. 16.1-16.4 are schematic illustrations depicting fracture growth about a wellbore during a fracture operation;

FIGS. 17.1-17.4 illustrate simplified, schematic views of an oilfield having subterranean formations containing reservoirs therein in accordance with implementations of various technologies and techniques described herein;

FIG. 18 is a schematic diagraph illustrating a stimulation tool;

FIGS. 23.1-23.3 are contour plots depicting a hydraulic fracture network footprint for natural fractures with friction coefficient of 0.1 for pumped slickwater (SW), liner gel (LG), and cross-linked gel (XL), respectively;

FIGS. 24.1-24.3 are contour plots depict a hydraulic fracture network footprint for natural fractures with friction coefficient of 0.5 for pumped SW, LG, and XL, respectively;

FIGS. 25.1-25.3 are contour plots depicting a hydraulic fracture network footprint for natural fractures with friction coefficient of 0.9 for pumped SW, LG, and XL, respectively;

FIGS. 26.1-26.6 are contour plots of a hydraulic fracture network at angles 10, 30, 45, 60, 75, and 90 degrees, respectively;

FIGS. 27.1, 27.2, and 27.3 are graphs plotting propped fracture area, total fracture surface area and average final extension of HFN, respectively, versus natural fracture angle to sigma h direction;

FIGS. 28.1-28.4 are contour plots of a hydraulic fracture network with the length of the natural fractures at 60 ft, 100 ft, 200 ft, and 400 ft, respectively;

FIGS. 29.1-29.2 are graphs plotting final extension of HFN in sigma h and sigma H directions versus natural fracture length;

FIGS. 30.1-30.4 are contour plots showing a HFN with spacing of the natural fractures at 25, 50, 100, and 200 feet, respectively;

FIGS. 31.1-31.3 are graph showing various views of extension of HFN relating to spacing;

FIGS. 32.1-32.4 are contour plots of hydraulic fracture networks for two sets of natural fractures, with the first set at 50, 100, 200, and 400 feet at a given angle, respectively;

FIGS. 33.1-33.4 are contour plots of hydraulic fracture networks for two sets of natural fractures, with the first set at 50, 100, 200, and 400 feet at another angle, respectively;

FIG. 34 is a graph plotting final extension of HFN (y-axis) versus fracture length of the first set of natural fractures (x-axis) for fracture sets at various angles;

FIGS. 37.1-37.3 are graphs depicting distribution, mean, and standard deviation, respectively, of cumulative production over time;

FIGS. 38.1-38.2 are graphs depicting average and relative standard deviation of cumulative production of natural fracture lengths over time;

FIG. 39 is a graph depicting average cumulative production versus natural fracture spacing over time;

FIGS. 40.1 and 40.2 are contour plots illustrating SRV and the density of hydraulic fracture networks with natural fracture spacing of 50 and 400 ft, respectively;

FIGS. 41.1-41.3 are graphs illustrating various views of cumulative production verses fracture spacing or angle over time;

FIGS. 42.1-44.3 are contour plots illustrating a hydraulic fracture network; and FIGS. 45.1-45.2 are graphs depicting well production performance curves and a distribution of the computed cumulative production, respectively.

DETAILED DESCRIPTION

The description that follows includes exemplary apparatuses, methods, techniques, and instruction sequences that embody techniques of the inventive subject matter. However, it is understood that the described embodiments may be practiced without these specific details.

I. Fracture Operations
Oilfield Operations

Figure 1:
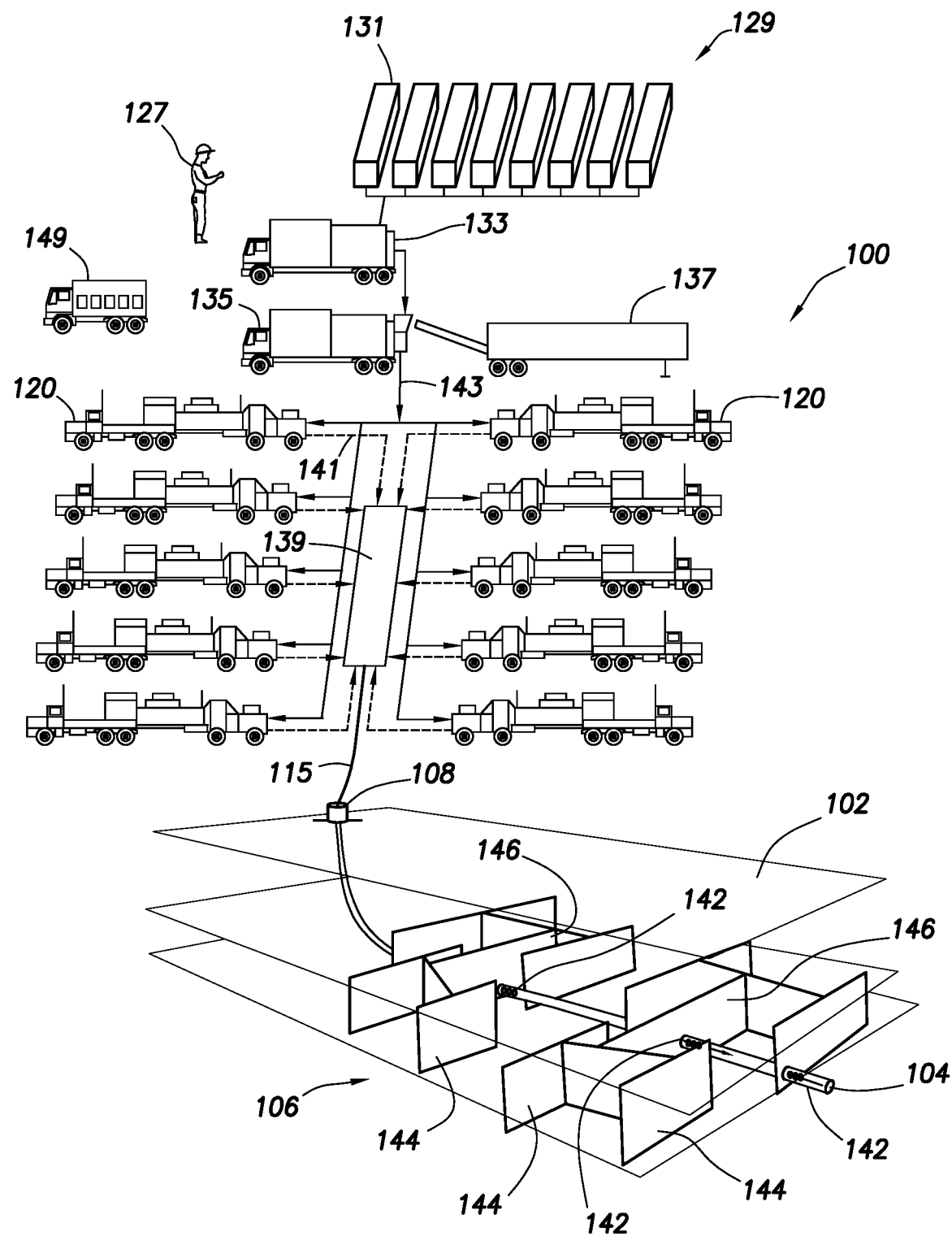
FIG. 1.1 is a schematic illustration of a hydraulic fracturing site depicting a fracture operation.

FIGS. 1.1-1.2 and 17.1-20 depict various oilfield operations that may be performed at a wellsite. FIGS. 1.1 and 1.2 depict fracture propagation about a wellsite 100. The wellsite 100 has a wellbore 104 extending from a wellhead 108 at a surface location and through a subterranean formation 102 therebelow. A fracture network 106 extends about the wellbore 104. A pump system 129 is positioned about the wellhead 108 for passing fluid through tubing 142.

The pump system 129 is depicted as being operated by a field operator 127 for recording maintenance and operational data and/or performing maintenance in accordance with a prescribed maintenance plan. The pumping system 129 pumps fluid from the surface to the wellbore 104 during the fracture operation.

The pump system 129 includes a plurality of water tanks 131, which feed water to a gel hydration unit 133. The gel hydration unit 133 combines water from the tanks 131 with a gelling agent to form a gel. The gel is then sent to a blender 135 where it is mixed with a proppant from a proppant transport 137 to form a fracturing fluid. The gelling agent may be used to increase the viscosity of the fracturing fluid, and to allow the proppant to be suspended in the fracturing fluid. It may also act as a friction reducing agent to allow higher pump rates with less frictional pressure.

The fracturing fluid is then pumped from the blender 135 to the treatment trucks 120 with plunger pumps as shown by solid lines 143. Each treatment truck 120 receives the fracturing fluid at a low pressure and discharges it to a common manifold 139 (sometimes called a missile trailer or missile) at a high pressure as shown by dashed lines 141. The missile 139 then directs the fracturing fluid from the treatment trucks 120 to the wellbore 104 as shown by solid line 115. One or more treatment trucks 120 may be used to supply fracturing fluid at a desired rate.

Each treatment truck 120 may be normally operated at any rate, such as well under its maximum operating capacity. Operating the treatment trucks 120 under their operating capacity may allow for one to fail and the remaining to be run at a higher speed in order to make up for the absence of the failed pump. A computerized control system 149 may be employed to direct the entire pump system 129 during the fracturing operation.

Various fluids, such as conventional stimulation fluids with proppants, may be used to create fractures. Other fluids, such as viscous gels, "slick water" (which may have a friction reducer (polymer) and water) may also be used to hydraulically fracture shale gas wells. Such "slick water" may be in the form of a thin fluid (e.g., nearly the same viscosity as water) and may be used to create more complex fractures, such as multiple micro-seismic fractures detectable by monitoring.

As also shown in FIGS. 1.1 and 1.2, the fracture network includes fractures located at various positions around the wellbore 104. The various fractures may be natural fractures 144 present before injection of the fluids, or hydraulic fractures 146 generated about the formation 102 during injection. FIG. 1.2 shows a depiction of the fracture network 106 based on microseismic events 148 gathered using conventional means.

FIGS. 17.1-20 show additional oilfield operations that may be performed at a wellsite. The figures various operations for performing hydraulic fracturing and gathering data associated therewith. FIGS. 17.1-17.4 illustrate simplified, schematic views of an oilfield 1700 having subterranean formation 1702 containing reservoir 1704 therein in accordance with implementations of various technologies and techniques described herein.

FIG. 17.1 illustrates a survey operation being performed by a survey tool, such as seismic truck 1706.1, to measure properties of the subterranean formation. The survey operation is a seismic survey operation for producing sound vibrations. In FIG. 17.1, one such sound vibration, sound vibration 1712 generated by source 1710, reflects off horizons 1714 in earth formation 1716. A set of sound vibrations is received by sensors, such as geophone-receivers 1718, situated on the earth's surface. The data received 1720 is provided as input data to a computer 1722.1 of a seismic truck 1706.1, and responsive to the input data, computer 1722.1 generates seismic data output 1724. This seismic data output may be stored, transmitted or further processed as desired, for example, by data reduction. The surface unit 1734 is also depicted as having a microseismic fracture operation system 1750 as will be described further herein.

FIG. 17.2 illustrates a drilling operation being performed by drilling tools 1706.2 suspended by rig 1728 and advanced into subterranean formations 1702 to form wellbore 1736. Mud pit 1730 is used to draw drilling mud into the drilling tools via flow line 1732 for circulating drilling mud down through the drilling tools, then up wellbore 1736 and back to the surface. The drilling mud may be filtered and returned to the mud pit 1730. A circulating system may be used for storing, controlling, or filtering the flowing drilling muds. The drilling tools are advanced into subterranean formations 1702 to reach reservoir 1704. Each well may target one or more reservoirs. The drilling tools 1706.2 are adapted for measuring downhole properties using logging while drilling tools. The logging while drilling tools may also be adapted for taking core sample 1733 as shown.

Computer facilities may be positioned at various locations about the oilfield 1700 (e.g., the surface unit 1734) and/or at remote locations. Surface unit 1734 may be used to communicate with the drilling tools and/or offsite operations, as well as with other surface or downhole sensors. Surface unit 1734 is capable of communicating with the drilling tools to send commands to the drilling tools, and to receive data therefrom. Surface unit 1734 may also collect data generated during the drilling operation and produces data output 1735, which may then be stored or transmitted.

Sensors (S), such as gauges, may be positioned about oilfield 1700 to collect data relating to various oilfield operations as described previously. As shown, sensor (S) is positioned in one or more locations in the drilling tools and/or at rig 1728 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 1706.2 may include a bottom hole assembly (BHA) (not shown) near the drill bit (e.g., within several drill collar lengths from the drill bit). The bottom hole assembly includes capabilities for measuring, processing, and storing information, as well as communicating with surface unit 1734. The bottom hole assembly further includes drill collars for performing various other measurement functions.

The bottom hole assembly may include a communication subassembly that communicates with surface unit 1734. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may to deviate from the drilling plan. Additionally, as drilling or other operations are performed, the subsurface conditions may change. The earth model may also provide adjustment as new information is collected.

The data gathered by sensors (S) may be collected by surface unit 1734 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 1734 may include transceiver 1737 to allow communications between surface unit 1734 and various portions of the oilfield 1700 or other locations. Surface unit 1734 may also be provided with or functionally connected to one or more controllers (not shown) for actuating mechanisms at oilfield 1700. Surface unit 1734 may then send command signals to oilfield 1700 in response to data received. Surface unit 1734 may receive commands via transceiver 1737 or may itself execute commands to the controller. A processor may be provided to analyze the data (locally or remotely), make the decisions and/or actuate the controller. In this manner, oilfield 1700 may be selectively adjusted based on the data collected. This technique may be used to optimize portions of the field operation, such as controlling drilling, weight on bit, pump rates, or other parameters. These adjustments may be made automatically based on computer protocol and/or manually by an operator. In some cases, well plans may be adjusted to select optimum operating conditions, or to avoid problems. The surface unit 1734 is also depicted as having a microseismic fracture operation system 1750 as will be described further herein.

FIG. 17.3 illustrates a wireline operation being performed by wireline tool 1706.3 suspended by rig 1728 and into wellbore 1736 of FIG. 17.2. Wireline tool 1706.3 is adapted for deployment into wellbore 1736 for generating well logs, performing downhole tests and/or collecting samples. Wireline tool 1706.3 may be used to provide another method and apparatus for performing a seismic survey operation. Wireline tool 1706.3 may, for example, have an explosive, radioactive, electrical, or acoustic energy source 1744 that sends and/or receives electrical signals to surrounding subterranean formations 1702 and fluids therein.

Wireline tool 1706.3 may be operatively connected to, for example, geophones 1718 and a computer 1722.1 of a seismic truck 1706.1 of FIG. 17.1. Wireline tool 1706.3 may also provide data to surface unit 1734. Surface unit 1734 may collect data generated during the wireline operation and may produce data output 1735 that may be stored or transmitted. Wireline tool 1706.3 may be positioned at various depths in the wellbore 1736 to provide a surveyor other information relating to the subterranean formation 1702.

Sensors (S), such as gauges, may be positioned about oilfield 1700 to collect data relating to various field operations as described previously. As shown, sensor S is positioned in wireline tool 1706.3 to measure downhole parameters which relate to, for example porosity, permeability, fluid composition and/or other parameters of the field operation.

FIG. 17.4 illustrates a production operation being performed by production tool 1706.4 deployed from a production unit or Christmas tree 1729 and into completed wellbore 1736 for drawing fluid from the downhole reservoirs into surface facilities 1742. The fluid flows from reservoir 1704 through perforations in the casing (not shown) and into production tool 1706.4 in wellbore 1736 and to surface facilities 1742 via gathering network 1746.

Sensors (S), such as gauges, may be positioned about oilfield 1700 to collect data relating to various field operations as described previously. As shown, the sensor (S) may be positioned in production tool 1706.4 or associated equipment, such as Christmas tree 1729, gathering network 1746, surface facility 1742, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 17.2-17.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 17.1-17.4 are intended to provide a brief description of an example of a field usable with oilfield application frameworks. Part, or all, of oilfield 1700 may be on land, water, and/or sea. Also, while a single field measured at a single location is depicted, oilfield applications may be utilized with any combination of one or more oilfields, one or more processing facilities and one or more wellsites.

FIG. 18 depicts the microseismic fracture operation system 1850. As shown, the microseismic fracture operation system 1850 includes a microseismic tool 1852, a fracture tool 1854, a wellsite tool 1856, an optimizer 1858 and an oilfield tool 1860. The microseismic tool 1852 may be used to perform Ant-tracking. The fracture tool 1854 may be used to perform fracture extraction. The wellsite tool 1856 may be used to generate fracture attributes, such as permeabilities. The optimizer 1858 may be used to perform dynamic modeling and adjust the fracture attributes based on the dynamic modeling. The oilfield tool 1860 may be used to obtain wellsite data from, for example, the sensors S from FIGS. 17.1-17.4 and manipulate the data as needed for use by the other tools of the microseismic fracture operation system 1850. Each of these functions is described further herein.

Figure 19:
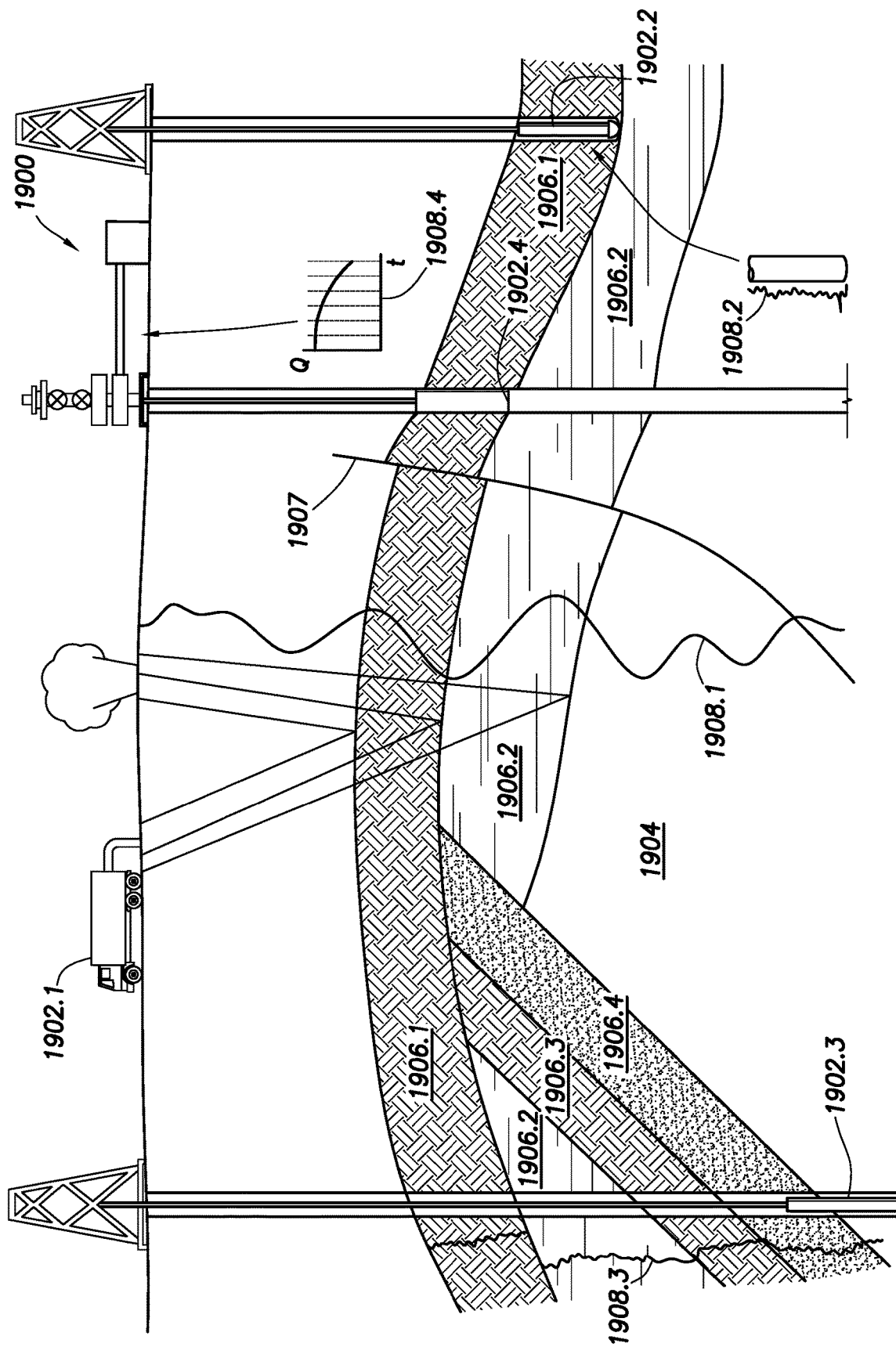
FIG. 19 illustrates a schematic view, partially in cross section, of an oilfield having a plurality of data acquisition tools positioned at various locations along the oilfield for collecting data from the subterranean formations in accordance with implementations of various technologies and techniques described herein.

FIG. 19 illustrates a schematic view, partially in cross section of oilfield 1900 having data acquisition tools 1902.1, 1902.2, 1902.3 and 1902.4 positioned at various locations along oilfield 1900 for collecting data of subterranean formation 1904 in accordance with implementations of various technologies and techniques described herein. Data acquisition tools 1902.1-1902.4 may be the same as data acquisition tools 1706.1-1706.4 of FIGS. 17.1-17.4, respectively, or others not depicted. As shown, data acquisition tools 1902.1-1902.4 generate data plots or measurements 1908.1-1908.4, respectively. These data plots are depicted along oilfield 1900 to demonstrate the data generated by the various operations.

Data plots 1908.1-1908.3 are examples of static data plots that may be generated by data acquisition tools 1902.1-1902.3, respectively, however, it should be understood that data plots 1908.1-1908.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 1908.1 is a seismic two-way response over a period of time. Static plot 1908.2 is core sample data measured from a core sample of the formation 1904. The core sample may be used to provide data, such as a graph of the density, porosity, permeability, or some other physical property of the core sample over the length of the core. Tests for density and viscosity may be performed on the fluids in the core at varying pressures and temperatures. Static data plot 1908.3 is a logging trace that may provide a resistivity or other measurement of the formation at various depths.

A production decline curve or graph 1908.4 is a dynamic data plot of the fluid flow rate over time. The production decline curve may provide the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 1904 has a plurality of geological formations 1906.1-1906.4. As shown, this structure has several formations or layers, including a shale layer 1906.1, a carbonate layer 1906.2, a shale layer 1906.3 and a sand layer 1906.4. A fault 1907 extends through the shale layer 1906.1 and the carbonate layer 1906.2. The static data acquisition tools are adapted to take measurements and detect characteristics of the formations.

While a specific subterranean formation with specific geological structures is depicted, it will be appreciated that oilfield 1800 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 1900, it will be appreciated that one or more types of measurement may be taken at one or more locations across one or more fields or other locations for comparison and/or analysis.

The data collected from various sources, such as the data acquisition tools of FIG. 19, may then be processed and/or evaluated. The seismic data displayed in static data plot 1908.1 from data acquisition tool 1902.1 is used by a geophysicist to determine characteristics of the subterranean formations and features. The core data shown in static plot 1908.2 and/or log data from well log 1908.3 may be used by a geologist to determine various characteristics of the subterranean formation. The production data from graph 1908.4 may be used by the reservoir engineer to determine fluid flow reservoir characteristics. The data analyzed by the geologist, geophysicist and the reservoir engineer may be analyzed using modeling techniques.

Figure 20:
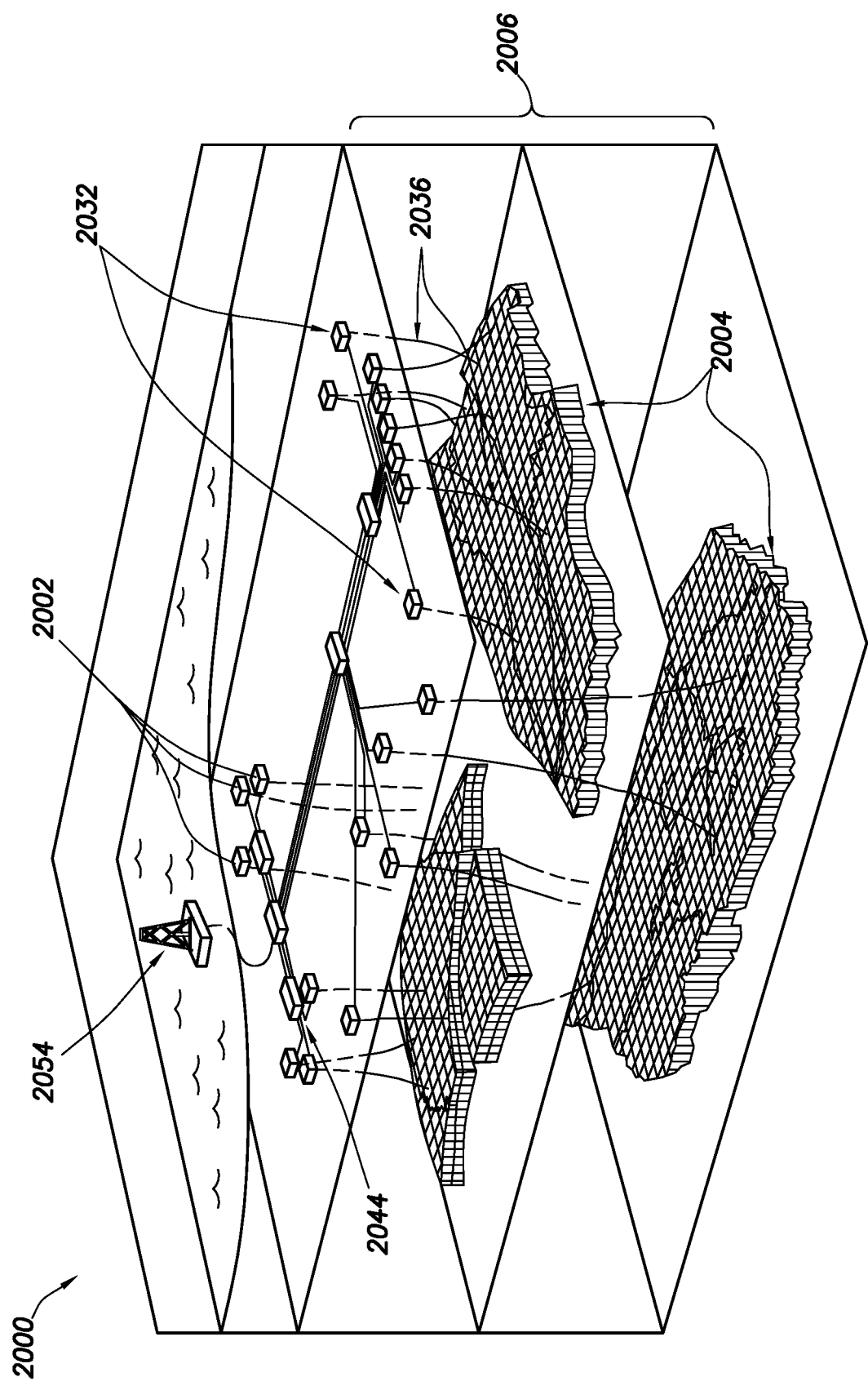
FIG. 20 illustrates a production system for performing one or more oilfield operations in accordance with implementations of various technologies and techniques described herein.

FIG. 20 illustrates an oilfield 2000 for performing production operations in accordance with implementations of various technologies and techniques described herein. As shown, the oilfield has a plurality of wellsites 2002 operatively connected to central processing facility 2054. The oilfield configuration of FIG. 20 is not intended to limit the scope of the oilfield application system. Part (or all) of the oilfield may be on land and/or sea. Also, while a single oilfield with a single processing facility and a plurality of wellsites is depicted, any combination of one or more oilfields, one or more processing facilities and one or more wellsites may be present.

Each wellsite 2002 has equipment that forms wellbore 2036 into the earth. The wellbores extend through subterranean formations 2006 including reservoirs 2004. These reservoirs 2004 contain fluids, such as hydrocarbons. The wellsites draw fluid from the reservoirs and pass them to the processing facilities via surface networks 2044. The surface networks 2044 have tubing and control mechanisms for controlling the flow of fluids from the wellsite to processing facility 2054.

UFM Model Description

Models have been developed to understand subsurface fracture networks. The models may consider various factors and/or data, and may not be constrained by accounting for either the amount of pumped fluid or mechanical interactions between fractures and injected fluid and among the fractures. Constrained models may be provided to give a fundamental understanding of involved mechanisms, but may be complex in mathematical description and/or require computer processing resources and time in order to provide accurate simulations of hydraulic fracture propagation. A constrained model may be configured to perform simulations to consider factors, such as interaction between fractures, over time and under desired conditions.

An unconventional fracture model (UFM) (or complex model) may be used to simulate complex fracture network propagation in a formation with pre-existing natural fractures. Multiple fracture branches can propagate simultaneously and may intersect/cross each other. Each open fracture may exert additional stresses on the surrounding rock and adjacent fractures, which may be referred to as "stress shadow" effect. The stress shadow can cause a restriction of fracture parameters (e.g., width), which may lead to, for example, a greater risk of proppant screenout. The stress shadow can also alter the fracture propagation path and affect fracture network patterns. The stress shadow may affect the modeling of the fracture interaction in a complex fracture model.

A method for computing the stress shadow in a complex hydraulic fracture network is presented. The method may be performed based on an enhanced 2D Displacement Discontinuity Method (2D DDM) with correction for finite fracture height or a 3D Displacement Discontinuity Method (3D DDM). The computed stress field from 2D DDM may be compared to 3D numerical simulation (3D DDM or flac3D) to determine an approximation for the 3D fracture problem. This stress shadow calculation may be incorporated in the UFM. The results for simple cases of two fractures shows the fractures can either attract or repel each other depending, for example, on their initial relative positions, and the results may be compared with an independent 2D non-planar hydraulic fracture model.

Additional examples of both planar and complex fractures propagating from multiple perforation clusters are presented, showing that fracture interaction may control the fracture dimension and propagation pattern. In a formation with small stress anisotropy, fracture interaction can lead to dramatic divergence of the fractures as they may tend to repel each other. However, even when stress anisotropy is large and fracture turning due to fracture interaction is limited, stress shadowing may have a strong effect on fracture width, which may affect the injection rate distribution into multiple perforation clusters, and hence overall fracture network geometry and proppant placement.

Multi-stage stimulation may be the norm for unconventional reservoir development. However, an obstacle to optimizing completions in shale reservoirs may involve a lack of hydraulic fracture models that can properly simulate complex fracture propagation often observed in these formations. A complex fracture network model (or UFM), has been developed (see, e.g., Weng, X., Kresse, O., Wu, R., and Gu, H., *Modeling of Hydraulic Fracture Propagation in a Naturally Fractured Formation. Paper SPE* 140253 *presented at the SPE Hydraulic Fracturing Conference and Exhibition*, Woodlands, Tex., USA, Jan. 24-26 (2011) (hereafter "Weng 2011"); Kresse, O., Cohen, C., Weng, X., Wu, R., and Gu, H. 2011 (hereafter "Kresse 2011"). *Numerical Modeling of Hydraulic Fracturing in Naturally Fractured Formations. 45th US Rock Mechanics/Geomechanics Symposium*, San Francisco, Calif., June 26-29, the entire contents of which are hereby incorporated herein).

Existing models may be used to simulate fracture propagation, rock deformation, and fluid flow in the complex fracture network created during a treatment. The model may also be used to solve the fully coupled problem of fluid flow in the fracture network and the elastic deformation of the fractures, which may have similar assumptions and governing equations as conventional pseudo-3D (P3D) fracture models. Transport equations may be solved for each component of the fluids and proppants pumped.

Conventional planar fracture models may model various aspects of the fracture network. The provided UFM may also involve the ability to simulate the interaction of hydraulic fractures with pre-existing natural fractures, i.e. determine whether a hydraulic fracture propagates through or is arrested by a natural fracture when they intersect and subsequently propagates along the natural fracture. The branching of the hydraulic fracture at the intersection with the natural fracture may give rise to the development of a complex fracture network.

A crossing model may be extended from Renshaw and Pollard (see, e.g., Renshaw, C. E. and Pollard, D. D. 1995, *An Experimentally Verified Criterion for Propagation across Unbounded Frictional Interfaces in Brittle, Linear Elastic Materials. Int. J. Rock Mech. Min. Sci. & Geomech. Abstr.,* 32: 237-249 (1995) the entire contents of which is hereby incorporated herein) interface crossing criterion may be developed to apply to any intersection angle (see, e.g., Gu, H. and Weng, X. *Criterion for Fractures Crossing Frictional Interfaces at Non-orthogonal Angles. 44th US Rock symposium*, Salt Lake City, Utah, Jun. 27-30, 2010 (hereafter "Gu and Weng 2010"), the entire contents of which are hereby incorporated by reference herein) and validated against experimental data (see, e.g., Gu, H., Weng, X., Lund, J., Mack, M., Ganguly, U. and Suarez-Rivera R. 2011. *Hydraulic Fracture Crossing Natural Fracture at Non-Orthogonal Angles, A Criterion, Its Validation and Applications. Paper SPE* 139984 *presented at the SPE Hydraulic Fracturing Conference and Exhibition*, Woodlands, Tex., Jan. 24-26 (2011) (hereafter "Gu et al. 2011"), the entire contents of which are hereby incorporated by reference herein), and integrated in the UFM.

To properly simulate the propagation of multiple or complex fractures, the fracture model may take into account an interaction among adjacent hydraulic fracture branches, referred to as the "stress shadow" effect. When a single planar hydraulic fracture is opened under a finite fluid net pressure, it may exert a stress field on the surrounding rock that is proportional to the net pressure.

In the limiting case of an infinitely long vertical fracture of a constant finite height, an analytical expression of the stress field exerted by the open fracture may be provided. See, e.g., Warpinski, N. F. and Teufel, L. W., *Influence of Geologic Discontinuities on Hydraulic Fracture Propagation, JPT*, February, 209-220 (1987) (hereafter "Warpinski and Teufel") and Warpinski, N. R., and Branagan, P. T., *Altered-Stress Fracturing. SPE JPT*, September, 1989, 990-997 (1989), the entire contents of which are hereby incorporated by reference herein. The net pressure (or more precisely, the pressure that produces the given fracture opening) may exert a compressive stress in the direction normal to the fracture on top of the minimum in-situ stress, which may equal the net pressure at the fracture face, and may quickly fall off with the distance from the fracture.

At a distance beyond one fracture height, the induced stress may be only a small fraction of the net pressure. Thus, the term "stress shadow" may be used to describe this increase of stress in the region surrounding the fracture. If a second hydraulic fracture is created parallel to an existing open fracture, and if it falls within the "stress shadow" (i.e. the distance to the existing fracture is less than the fracture height), the second fracture may, in effect, see a closure stress greater than the original in-situ stress. As a result, a higher pressure may be needed to propagate the fracture, and/or the fracture may have a narrower width, as compared to the corresponding single fracture.

One application of a stress shadow study may involve the design and optimization of the fracture spacing between multiple fractures propagating simultaneously from a horizontal wellbore. In ultra-low permeability shale formations, fractures may be closely spaced for effective reservoir drainage. However, the stress shadow effect may prevent a fracture propagating in close vicinity of other fractures (see, e.g., Fisher, M. K., J. R. Heinze, C. D. Harris, B. M. Davidson, C. A. Wright, and K. P. Dunn, *Optimizing horizontal completion techniques in the Barnett Shale using microseismic fracture mapping. SPE 90051 presented at the SPE Annual Technical Conference and Exhibition*, Houston, 26-29 Sep. 2004, the entire contents of which are hereby incorporated by reference herein in its entirety).

The interference between parallel fractures has been studied in the past (see, e.g., Warpinski and Teufel; Britt, L. K. and Smith, M. B., *Horizontal Well Completion, Stimulation Optimization, and Risk Mitigation. Paper SPE 125526 presented at the 2009 SPE Eastern Regional Meeting*, Charleston, Sep. 23-25, 2009; Cheng, Y. 2009. *Boundary Element Analysis of the Stress Distribution around Multiple Fractures: Implications for the Spacing of Perforation Clusters of Hydraulically Fractured Horizontal Wells. Paper SPE 125769 presented at the 2009 SPE Eastern Regional Meeting*, Charleston, Sep. 23-25, 2009; Meyer, B. R. and Bazan, L. W., *A Discrete Fracture Network Model for Hydraulically Induced Fractures: Theory, Parametric and Case Studies. Paper SPE 140514 presented at the SPE Hydraulic Fracturing Conference and Exhibition*, Woodlands, Tex., USA, Jan. 24-26, 2011; Roussel, N. P. and Sharma, M. M., *Optimizing Fracture Spacing and Sequencing in Horizontal-Well Fracturing, SPEPE*, May, 2011, pp. 173-184, the entire contents of which are hereby incorporated by reference herein). The studies may involve parallel fractures under static conditions.

An effect of stress shadow may be that the fractures in the middle region of multiple parallel fractures may have smaller width because of the increased compressive stresses from neighboring fractures (see, e.g., Germanovich, L. N., and Astakhov D., *Fracture Closure in Extension and Mechanical Interaction of Parallel Joints. J. Geophys. Res.*, 109, B02208, doi: 10.1029/2002 JB002131 (2004); Olson, J. E., *Multi-Fracture Propagation Modeling: Applications to Hydraulic Fracturing in Shales and Tight Sands. 42nd US Rock Mechanics Symposium and 2nd US-Canada Rock Mechanics Symposium*, San Francisco, Calif., Jun. 29-Jul. 2, 2008, the entire contents of which are hereby incorporated by reference herein). When multiple fractures are propagating simultaneously, the flow rate distribution into the fractures may be a dynamic process and may be affected by the net pressure of the fractures. The net pressure may be dependent on fracture width, and hence, the stress shadow effect on flow rate distribution and fracture dimensions warrants further study.

The dynamics of simultaneously propagating multiple fractures may also depend on the relative positions of the initial fractures. If the fractures are parallel, e.g. in the case of multiple fractures that are orthogonal to a horizontal wellbore, the fractures may repel each other, resulting in the fractures curving outward. However, if the multiple fractures are arranged in an en echelon pattern, e.g. for fractures initiated from a horizontal wellbore that is not orthogonal to the fracture plane, the interaction between the adjacent fractures may be such that their tips attract each other and even connect (see, e.g., Olson, J E. *Fracture Mechanics Analysis of Joints and Veins. PhD dissertation, Stanford University*, San Francisco, Calif. (1990); Yew, C. H., Mear, M. E., Chang, C. C., and Zhang, X. C. *On Perforating and Fracturing of Deviated Cased Wellbores. Paper SPE 26514 presented at SPE 68th Annual Technical Conference and Exhibition*, Houston, Tex. Oct. 3-6 (1993); Weng, X., *Fracture Initiation and Propagation from Deviated Wellbores. Paper SPE 26597 presented at SPE 68th Annual Technical Conference and Exhibition*, Houston, Tex. Oct. 3-6 (1993), the entire contents of which are hereby incorporated by reference herein).

When a hydraulic fracture intersects a secondary fracture oriented in a different direction, it may exert an additional closure stress on the secondary fracture that is proportional to the net pressure. This stress may be derived and taken into account in the fissure opening pressure calculation in the analysis of pressure-dependent leakoff in fissured formation (see, e.g., Nolte, K., *Fracturing Pressure Analysis for non-ideal behavior. JPT*, February 1991, 210-218 (SPE 20704) (1991) (hereafter "Nolte 1991"), the entire contents of which are hereby incorporated by reference herein).

For more complex fractures, a combination of various fracture interactions as discussed above may be present. To properly account for these interactions and remain computationally efficient so it can be incorporated in the complex fracture network model, a proper modeling framework may be constructed. A method based on an enhanced 2D Displacement Discontinuity Method (2D DDM) may be used for computing the induced stresses on a given fracture and in the rock from the rest of the complex fracture network (see, e.g., Olson, J. E., *Predicting Fracture Swarms—The Influence of Sub critical Crack Growth and the Crack-Tip Process Zone on Joints Spacing in Rock. In The Initiation, Propagation and Arrest of Joints and Other Fractures*, ed. J. W. Cosgrove and T. Engelder, *Geological Soc. Special Publications*, London, 231, 73-87 (2004)(hereafter "Olson 2004"), the entire contents of which are hereby incorporated by reference herein). Fracture turning may also be modeled based on the altered local stress direction ahead of the propagating fracture tip due to the stress shadow effect. The simulation results from the UFM model that incorporates the fracture interaction modeling are presented.

To simulate the propagation of a complex fracture network that consists of many intersecting fractures, equations governing the underlying physics of the fracturing process may be used. The basic governing equations may include, for example, equations governing fluid flow in the fracture network, the equation governing the fracture deformation, and the fracture propagation/interaction criterion.

The following continuity equation assumes that fluid flow propagates along a fracture network with the following mass conservation:

$$\frac{\partial q}{\partial s} + \frac{\partial (H_{fl}\overline{w})}{\partial t} + q_L = 0 \qquad (1)$$

where q is the local flow rate inside the hydraulic fracture along the length, $\overline{w}$ is an average width or opening at the cross-section of the fracture at position s=s(x,y), $H_{fl}$ is the height of the fluid in the fracture, and $q_L$ is the leak-off volume rate through the wall of the hydraulic fracture into the matrix per unit height (velocity at which fracturing fluid infiltrates into surrounding permeable medium) which is expressed through Carter's leak-off model. The fracture tips propagate as a sharp front, and the length of the hydraulic fracture at any given time t is defined as l(t).

The properties of driving fluid may be defined by power-law exponent n' (fluid behavior index) and consistency index K'. The fluid flow could be laminar, turbulent or Darcy flow through a proppant pack, and may be described correspondingly by different laws. For the general case of 1D laminar flow of power-law fluid in any given fracture branch, the Poiseuille law (see, e.g., Nolte, 1991) may be used:

$$\frac{\partial p}{\partial s} = -\alpha_0 \frac{1}{\overline{w}^{2n'+1}} \frac{q}{H_{fl}} \left| \frac{q}{H_{fl}} \right|^{n'-1} \quad (2)$$

where $$\alpha_0 = \frac{2K'}{\phi(n')^{n'}} \cdot \left(\frac{4n'+2}{n'}\right)^{n'}; \phi(n') = \frac{1}{H_{fl}} \int_{H_{fl}} \left(\frac{w(z)}{\overline{w}}\right)^{\frac{2n'+1}{n'}} dz \quad (3)$$

Here w(z) represents fracture width as a function of depth at current position s, α is a coefficient, n' is a power law exponent (fluid consistency index), φ is a shape function, and dz is the integration increment along the height of the fracture in the formula.

Fracture width may be related to fluid pressure through the elasticity equation. The elastic properties of the rock (which may be considered as mostly homogeneous, isotropic, linear elastic material) may be defined by Young's modulus E and Poisson's ratio v. For a vertical fracture in a layered medium with variable minimum horizontal stress $\sigma_h(x, y, z)$ and fluid pressure p, the width profile (w) can be determined from an analytical solution given as:

$$w(x,y,z)=w(p(x,y),H,z) \quad (4)$$

where W is the fracture width at a point with spatial coordinates x, y, z (coordinates of the center of fracture element); p(x,y) is the fluid pressure, H is the fracture element height, and z is the vertical coordinate along fracture element at point (x,y).

Because the height of the fractures may vary, the set of governing equations may also include the height growth calculation as described, for example, in Kresse 2011.

In addition to equations described above, the global volume balance condition may be satisfied:

$$\int_0^t Q(t)dt = \int_0^{L(t)} H(s,t)\overline{w}(s,t)ds + \int_{H_L} \int_0^t \int_0^{L(t)} 2g_L ds dt dh_l \quad (5)$$

where $g_L$ is fluid leakoff velocity, Q(t) is time dependent injection rate, H(s,t) height of the fracture at spacial point s(x,y) and at the time t, ds is length increment for integration along fracture length, $d_t$ is time increment, $dh_l$ is increment of leakoff height, $H_L$ is leakoff height, an so is a spurt loss coefficient. Equation (5) provides that the total volume of fluid pumped during time t is equal to the volume of fluid in the fracture network and the volume leaked from the fracture up to time t. Here L(t) represents the total length of the HFN at the time t and $S_0$ is the spurt loss coefficient. The boundary conditions may require the flow rate, net pressure and fracture width to be zero at all fracture tips.

The system of Eqns. 1-5, together with initial and boundary conditions, may be used to represent a set of governing equations. Combining these equations and discretizing the fracture network into small elements may lead to a nonlinear system of equations in terms of fluid pressure p in each element, simplified as f(p)=0, which may be solved by using a damped Newton-Raphson method.

Fracture interaction may be taken into account to model hydraulic fracture propagation in naturally fractured reservoirs. This includes, for example, the interaction between hydraulic fractures and natural fractures, as well as interaction between hydraulic fractures. For the interaction between hydraulic and natural fractures a semi-analytical crossing criterion may be implemented in the UFM using, for example, the approach described in Gu and Weng 2010, and Gu et al. 2011.

Modeling of Stress Shadow

For parallel fractures, the stress shadow can be represented by the superposition of stresses from neighboring fractures. FIG. 2 is a schematic depiction of a 2D fracture 200 about a coordinate system having an x-axis and a y-axis. Various points along the 2D fractures, such as a first end at h/2, a second end at -h/2 and a midpoint are extended to an observation point (x,y). Each line L, L1, L2 extends at angles θ, θ1, θ2, respectively, from the points along the 2D fracture to the observation point.

The stress field around a 2D fracture with internal pressure p can be calculated using, for example, the techniques as described in Warpinski and Teufel. The stress that affects fracture width is $\sigma_x$, and can be calculated from:

$$\sigma_x = p\left[1 - \frac{\overline{L}}{\sqrt{\overline{L}_1 \overline{L}_2}} \cos\left(\theta - \frac{\theta_1+\theta_2}{2}\right) - \frac{\overline{L}}{(\overline{L}_1\overline{L}_2)^{\frac{3}{2}}} \sin\theta \sin\left(\frac{3}{2}(\theta_1+\theta_2)\right)\right] \quad (6)$$

where $$\theta = \arctan\left(-\frac{\overline{x}}{\overline{y}}\right) \quad (7)$$

$$\theta_1 = \arctan\left(-\frac{\overline{x}}{1+\overline{y}}\right)$$

$$\theta_2 = \arctan\left(\frac{\overline{x}}{1-\overline{y}}\right)$$

and where $\sigma_x$ is stress in the x direction, p is internal pressure, and $\overline{x}, \overline{y}, \overline{L}, \overline{L}_1, \overline{L}_2$ are the coordinates and distances in FIG. 2 normalized by the fracture half-height h/2. Since $\sigma_x$ varies in the y-direction as well as in the x-direction, an averaged stress over the fracture height may be used in the stress shadow calculation.

The analytical equation given above can be used to compute the average effective stress of one fracture on an adjacent parallel fracture and can be included in the effective closure stress on that fracture.

For more complex fracture networks, the fractures may orient in different directions and intersect each other. FIGS. 3.1 and 3.2 show a complex fracture network 300 depicting stress shadow effects. The fracture network 300 includes hydraulic fractures 303 extending from a wellbore 304 and interacting with other fractures 305 in the fracture network 300.

A more general approach may be used to compute the effective stress on any given fracture branch from the rest of the fracture network. In UFM, the mechanical interactions between fractures may be modeled based on an enhanced 2D Displacement Discontinuity Method (DDM) (Olson 2004) for computing the induced stresses (see, e.g., FIG. 3.1, 3.2).

In a 2D, plane-strain, displacement discontinuity solution, (see, e.g., Crouch, S. L. and Starfield, A. M., *Boundary Element Methods in Solid Mechanics*, George Allen & Unwin Ltd, London. Fisher, M. K. (1983)(hereafter Crouch and Starfield 1983), the entire contents of which are hereby incorporated by reference) may be used to describe the normal and shear stresses ($\sigma_n$ and $\sigma_s$) acting on one fracture element induced by the opening and shearing displacement discontinuities ($D_n$ and $D_s$) from all fracture elements. To account for the 3D effect due to finite fracture height, Olson 2004 may be used to provide a 3D correction factor to the influence coefficients $C^{ij}$ in combination with the modified elasticity equations of 2D DDM as follows:

$$\sigma_n^i = \sum_{j=1}^{N} A^{ij} C_{ns}^{ij} D_s^j + \sum_{j=1}^{N} A^{ij} C_{nn}^{ij} D_n^j \quad (8)$$

$$\sigma_s^i = \sum_{j=1}^{N} A^{ij} C_{ss}^{ij} D_s^j + \sum_{j=1}^{N} A^{ij} C_{sn}^{ij} D_n^j$$

where A is a matrix of influence coefficients described in eq. (9), N is a total number of elements in the network whose interaction is considered, i is the element considered, and j=1, N are other elements in the network whose influence on the stresses on element i are calculated; and where $C^{ij}$ are the 2D, plane-strain elastic influence coefficients. These expressions can be found in Crouch and Starfield 1983.

Elem i and j of FIG. 3.1 schematically depict the variables i and j in equation (8). Discontinuities $D_s$ and Dn applied to Elem j are also depicted in FIG. 3. Dn may be the same as the fracture width, and the shear stress s may be 0 as depicted. Displacement discontinuity from Elem j creates a stress on Elem i as depicted by $\sigma_s$ and $\sigma_n$.

The 3D correction factor suggested by Olson 2004 may be presented as follows:

$$A^{ij} = 1 - \frac{d_{ij}^\beta}{[d_{ij}^2 + (h/\alpha)^2]^{\beta/2}} \quad (9)$$

where h is the fracture height, $d_{ij}$ is the distance between elements i and j, $\alpha$ and $\beta$ are fitting parameters. Eq. 9 shows that the 3D correction factor may lead to decaying of interaction between any two fracture elements when the distance increases.

In the UFM model, at each time step the additional induced stresses due to the stress shadow effects may be computed. It may be assumed that, at any time, fracture width equals the normal displacement discontinuities (Do) and shear stress at the fracture surface is zero, i.e., $D_n^j = w_1$, $\sigma_s^i = 0$. Substituting these two conditions into Eq. 8, the shear displacement discontinuities ($D_s$) and normal stress induced on each fracture element (an) may be found.

The effects of the stress shadow induced stresses on the fracture network propagation pattern may be described in two folds. First, during pressure and width iteration, the original in-situ stresses at each fracture element may be modified by adding the additional normal stress due to the stress shadow effect. This may directly affect the fracture pressure and width distribution which may result in a change on the fracture growth. Second, by including the stress shadow induced stresses (normal and shear stresses), the local stress fields ahead of the propagating tips may also be altered which may cause the local principal stress direction to deviate from the original in-situ stress direction. This altered local principal stress direction may result in the fracture turning from its original propagation plane and may further affect the fracture network propagation pattern.

Validation of Stress Shadow Model

Validation of the UFM model for the cases of bi-wing fractures may be performed using, for example, Weng 2011 or Kresse 2011. Validation may also be performed using the stress shadow modeling approach. By way of example, the results may be compared using 2D DDM to Flac 3D as provided in Itasca Consulting Group Inc., 2002, FLAC3D (*Fast Lagrangian Analysis of Continua in* 3 *Dimensions*), Version 2.1, Minneapolis: ICG (2002) (hereafter "Itasca, 2002").

Comparison of Enchansed 2D DDM to Flac3D

The 3D correction factors suggested by Olson 2004 contain two empirical constants, a and β. The values of α and β may be calibrated by comparing stresses obtained from numerical solutions (enhanced 2D DDM) to the analytical solution for a plane-strain fracture with infinite length and finite height. The model may further be validated by comparing the 2D DDM results to a full three dimensional numerical solutions, utilizing, for example, FLAC3D, for two parallel straight fractures with finite lengths and heights.

The validation problem is shown in FIG. 4. FIG. 4 a schematic diagram 400 comparing enhanced 2D DDM to Flac3D for two parallel straight fractures. As shown in diagram 400, two parallel fractures 407.1, 407.2 are subject to stresses $\sigma_x$, $\sigma_y$ along an x, y coordinate axis. The fractures have length $2L_{xf}$, and pressure of the fracture $p_1$, $p_2$, respectively. The fractures are a distance s apart.

The fracture in Flac3D may be simulated as two surfaces at the same location but with un-attached grid points. Constant internal fluid pressure may be applied as the normal stress on the grids. Fractures may also be subject to remote stresses, $\sigma_x$ and $\sigma_y$. Two fractures may have the same length and height with the ratio of height/half-length=0.3.

Stresses along x-axis (y=0) and y-axis (x=0) may be compared. Two closely spaced fractures (s/h=0.5) may be simulated as shown in the comparison of FIGS. 5.1-5.3. These figures provide a comparison of extended 2D DDM to Flac3D: Stresses along x-axis (y=0) and y-axis (x=0).

These figures include graphs 500.1, 500.2, 500.3, respectively, illustrating 2D DDM and Flac3D of extended fractures for σy along the y-axis, σx along the y-axis, and σy along the x-axis, respectively. FIG. 5.1 plots σy/p (y-axis) versus normalized distance from fracture (x-axis) using 2D DDM and Flac3D. FIG. 5.2 plots σx/p (y-axis) versus normalized distance from fracture (x-axis) using 2D DDM and Flac3D. FIG. 5.3 plots σy/p (y-axis) versus normalized distance from fracture (x-axis) using 2D DDM and Flac3D. The location $L_f$ of the fracture tip is depicted along line x/h.

As shown in FIGS. 5.1-5.3, the stresses simulated from enhanced 2D DDM approach with 3D correction factor match pretty well to those from the full 3D simulator results, which indicates that the correction factor allows capture the 3D effect from the fracture height on the stress field.

Comparison to CSIRO Model

The UFM model that incorporates the enchanced 2DDM approach may be validated against full 2D DDM simulator by CSIRO (see, e.g., Zhang, X., Jeffrey, R. G., and Thiercelin, M. 2007. *Deflection and Propagation of Fluid-Driven Fractures at Frictional Bedding Interfaces: A Numerical*

Investigation. *Journal of Structural Geology,* 29: 396-410, (hereafter "Zhang 2007") the entire contents of which is hereby incorporated by reference in its entirety). This approach may be used, for example, in the limiting case of very large fracture height where 2D DDM approaches do not consider 3D effects of the fractures height.

The comparison of influence of two closely propagating fractures on each other's propagation paths may be employed. The propagation of two hydraulic fractures initiated parallel to each other (propagating along local max stress direction) may be simulated for configurations, such as: 1) initiation points on top of each other and offset from each other for isotropic, and 2) anisotropic far field stresses. The fracture propagation path and pressure inside of each fracture may be compared for UFM and CSIRO code for the input data given in Table 1.

TABLE 1

Input data for validation against CSIRO model

| | | | |
|---|---|---|---|
| Injection rate | 0.106 m$^3$/s | 40 | bbl/min |
| Stress anisotropy | 0.9 MPa | 130 | psi |
| Young's modulus | 3 × 10$^{10}$ Pa | 4.35e+6 | psi |
| Poisson's ratio | 0.35 | 0.35 | |
| Fluid viscosity | 0.001 pa-s | 1 | cp |
| Fluid Specific Gravity | 1.0 | 1.0 | |
| Min horizontal stress | 46.7 MPa | 6773 | psi |
| Max horizontal stress | 47.6 MPa | 6903 | psi |
| Fracture toughness | 1 MPa-m$^{0.5}$ | 1000 | psi/in$^{0.5}$ |
| Fracture height | 120 m | 394 | ft |

When two fractures are initiated parallel to each other with initiation points separated by dxc=0, dy=33 ft (10.1 m) (max horizontal stress field is oriented in x-direction), they may turn away from each other due to the stress shadow effect.

The propagation paths for isotropic and anisotropic stress fields are shown in FIGS. 6.1 and 6.2. These figures are graphs 600.1, 600.2 depicting propagation paths for two initially parallel fractures 609.1, 609.2 in isotropic and anisotropic stress fields, respectively. The fractures 609.1 and 609.2 are initially parallel near the injection points 615.1, 615.2, but diverge as they extend away therefrom.

Comparing with isotropic case, the curvatures of the fractures in the case of stress anisotropy are depicted as being smaller. This may be due to the competition between the stress shadow effect which tends to turn fractures away from each other, and far-field stresses which pushes fractures to propagate in the direction of maximum horizontal stress (x-direction). The influence of far-field stress becomes dominant as the distance between the fractures increases, in which case the fractures may tend to propagate parallel to maximum horizontal stress direction.

FIGS. 7.1 and 7.2 depict graphs 700.1, 700.2 showing a pair of fractures initiated from two different injection points 711.1, 711.2, respectively. These figures show a comparison for the case when fractures are initiated from points separated by a distance dx=dy=33 ft. (10.1 m) for an isotropic and anisotropic stress field, respectively. In these figures, the fractures 709.1, 709.2 tend to propagate towards each other. Examples of similar type of behavior have been observed in lab experiments (see, e.g., Zhang 2007).

As indicated above, the enchanced 2D DDM approach implemented in UFM model may be able to capture the 3D effects of finite fracture height on fracture interaction and propagation pattern, while being computationally efficient.

A good estimation of the stress field for a network of vertical hydraulic fractures and fracture propagation direction (pattern) may be provided.

Example Cases

Case #1 Parallel Fractures in Horizontal Wells

Figure 8:
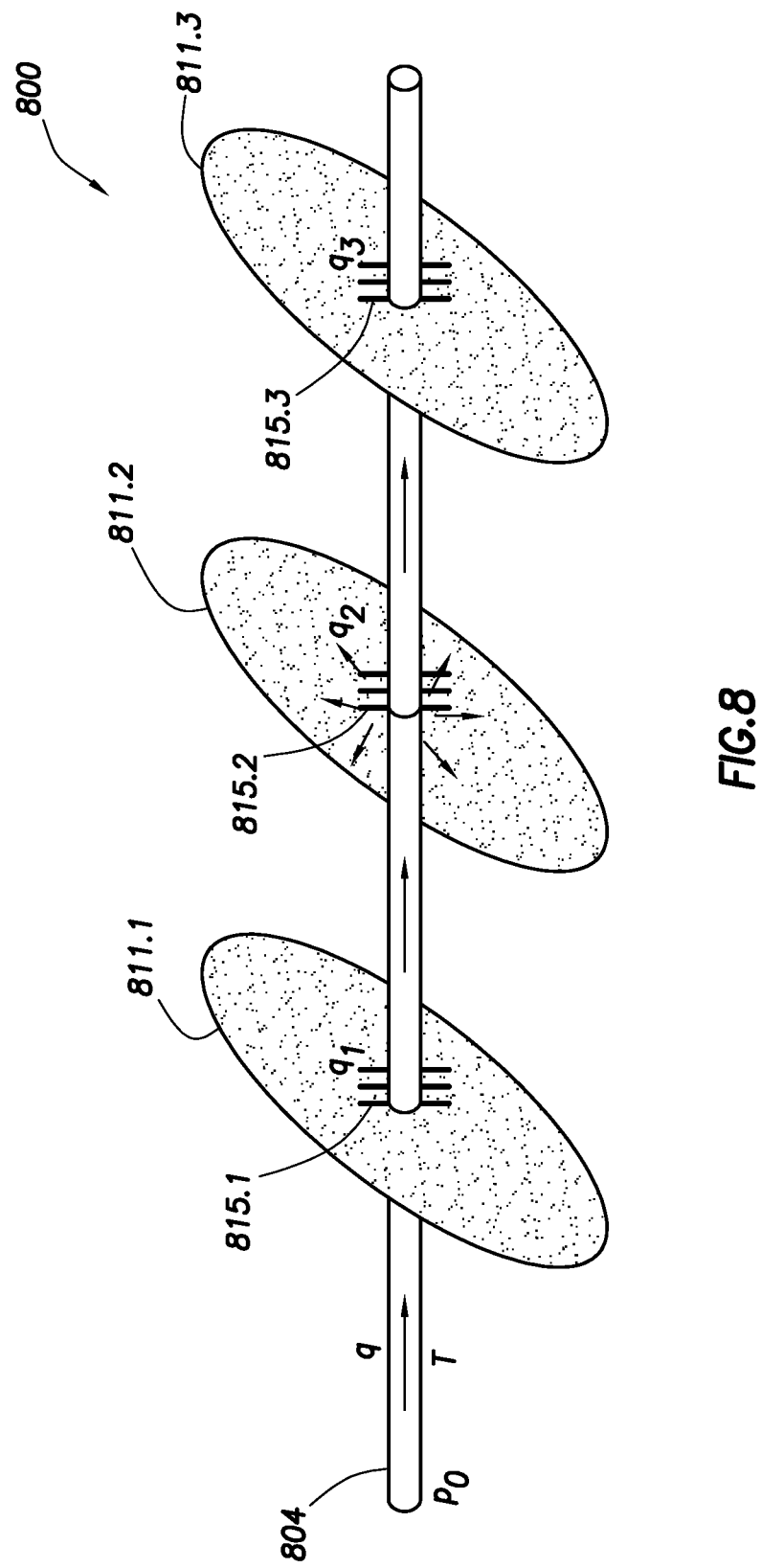
FIG. 8 is a schematic illustration of transverse parallel fractures along a horizontal well.

FIG. 8 is a schematic plot 800 of parallel transverse fractures 811.1, 811.2, 811.3 propagating simultaneously from multiple perforation clusters 815.1, 815.2, 815.3, respectively, about a horizontal wellbore 804. Each of the fractures 811.1, 811.2, 811.3 provides a different flow rate $q_1$, $q_2$, $q_3$ that is part of the total flow $q_t$ at a pressure $p_0$.

When the formation condition and the perforations are the same for all the fractures, the fractures may have about the same dimensions if the friction pressure in the wellbore between the perforation clusters is proportionally small. This may be assumed where the fractures are separated far enough and the stress shadow effects are negligible. When the spacing between the fractures is within the region of stress shadow influence, the fractures may be affected not only in width, but also in other fracture dimension. To illustrate this, a simple example of five parallel fractures may be considered.

In this example, the fractures are assumed to have a constant height of 100 ft (30.5 m). The spacing between the fractures is 65 ft (19.8 m). Other input parameters are given in Table 2.

TABLE 2

Input parameters for Case #1

| | |
|---|---|
| Young's modulus | 6.6 × 10$^6$ psi = 4.55e+10 Pa |
| Poisson's ratio | 0.35 |
| Rate | 12.2 bbl/min = 0.032 m$^3$/s |
| Viscosity | 300 cp = 0.3 Pa-s |
| Height | 100 ft = 30.5 m |
| Leakoff coefficient | 3.9 × 10$^{-2}$ m/s$^{1/2}$ |
| Stress anisotropy | 200 psi = 1.4 Mpa |
| Fracture spacing | 65 ft = 19.8 m |
| No. of perfs per frac | 100 |

For this simple case, a conventional Perkins-Kern-Nordgren (PKN) model (see, e.g., Mack, M. G. and Warpinski, N. R., *Mechanics of Hydraulic Fracturing. Chapter 6, Reservoir Stimulation,* 3rd Ed., eds. Economides, M. J. and Nolte, K. G. John Wiley & Sons (2000)) for multiple fractures may be modified by incorporating the stress shadow calculation as given from Eq. 6. The increase in closure stress may be approximated by averaging the computed stress from Eq. 6 over the entire fracture. Note that this simplistic PKN model may not simulate the fracture turning due to the stress shadow effect. The results from this simple model may be compared to the results from the UFM model that incorporates point-by-point stress shadow calculation along the entire fracture paths as well as fracture turning.

Figure 9:
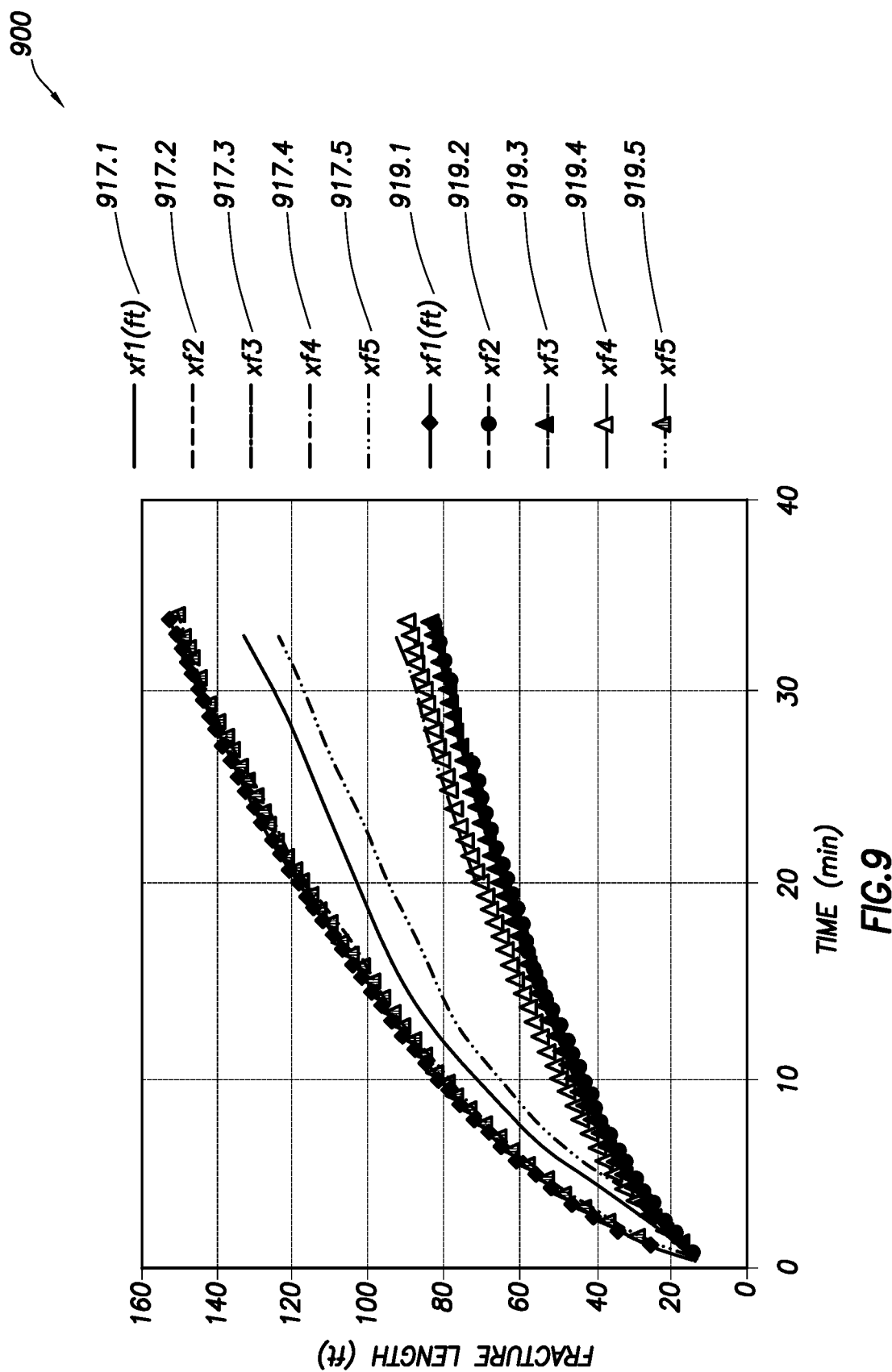
FIG. 9 is a graph depicting lengths over time for five parallel fractures.

FIG. 9 shows the simulation results of fracture lengths of the five fractures, computed from both models. FIG. 9 is a graph 900 depicting length (y-axis) versus time (t) of five parallel fractures during injection. Lines 917.1-917.5 are generated from the UFM model. Lines 919.1-919.5 are generated from the simplistic PKN model.

Figure 10:
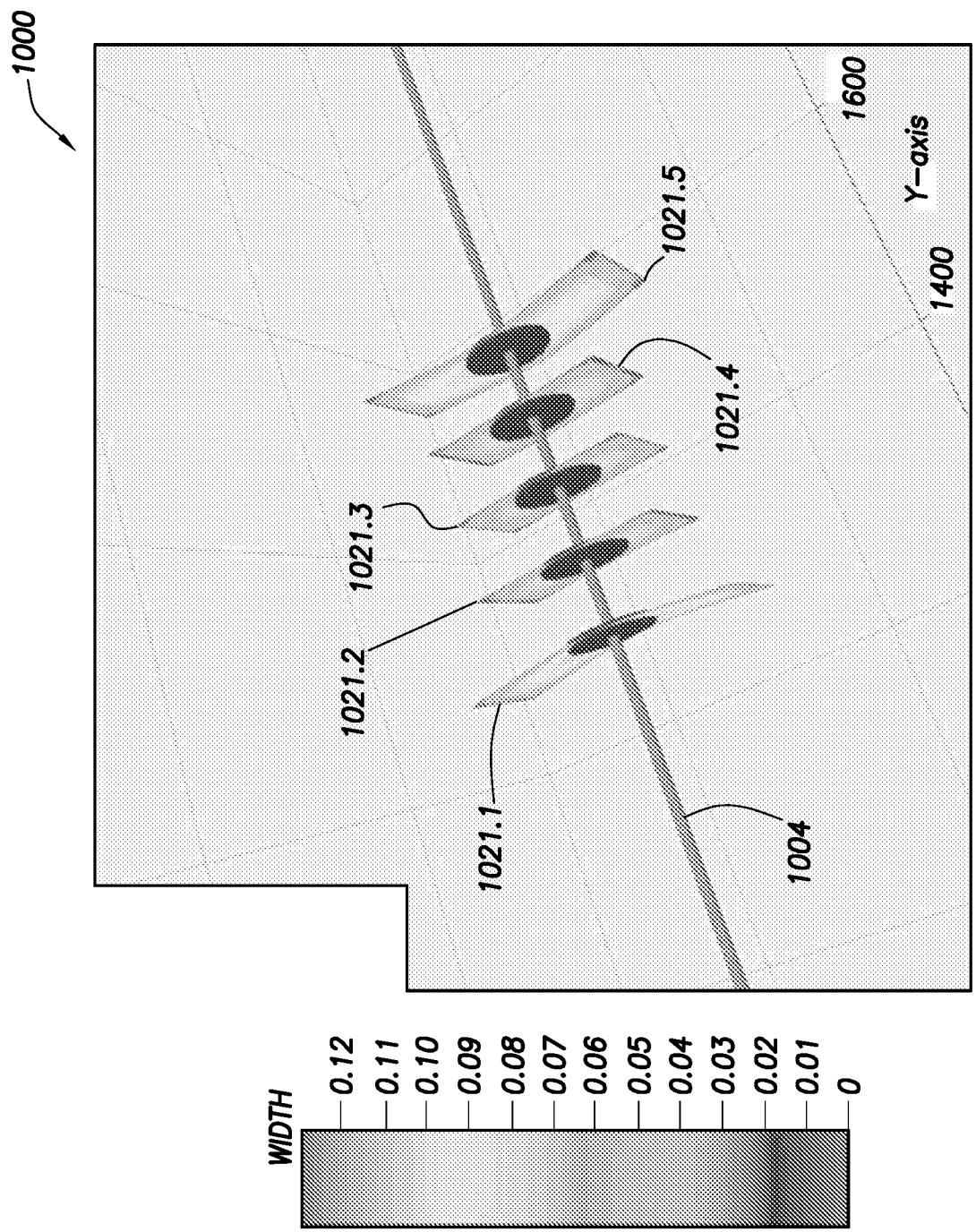
FIG. 10 is a schematic diagram depicting UFM fracture geometry and width for the parallel fractures of FIG. 9.

The fracture geometry and width contour from the UFM model for the five fractures of FIG. 9 are shown in FIG. 10. FIG. 10 is a schematic diagram 1000 depicting fractures 1021.1-1021.5 about a wellbore 1004.

Fracture 1021.3 is the middle one of the five fractures, and fractures 1021.1 and 1021.5 are the outmost ones. Since fractures 1021.2, 1021.3, and 1021.4 have smaller width than that of the outer ones due to the stress shadow effect, they may have larger flow resistance, receive less flow rate, and have shorter length. Therefore, the stress shadow effects may not only be fracture width but also fracture length under dynamic conditions.

The effect of stress shadow on fracture geometry may be influenced by many parameters. To illustrate the effect of some of these parameters, the computed fracture lengths for the cases with varying fracture spacing, perforation friction, and stress anisotropy are shown in Table 3.

TABLE 3

Influence of various parameters on fracture geometry

| Frac | Base case | 120 ft spacing (36.6 m) | No. of perfs = 2 | Anisotropy = 50 psi (345000 Pa) |
|---|---|---|---|---|
| 1 | 133 | 113 | 105 | 111 |
| 2 | 93 | 104 | 104 | 95 |
| 3 | 83 | 96 | 104 | 99 |
| 4 | 93 | 104 | 100 | 95 |
| 5 | 123 | 113 | 109 | 102 |

FIGS. 11.1 and 11.2 show the fracture geometry predicted by the UFM for the case of large perforation friction and the case of large fracture spacing (e.g., about 120 ft (36.6 m)). FIGS. 11.1 and 11.2 are schematic diagrams 1100.1 and 1100.2 depicting five fractures 1123.1-1123.5 about a wellbore 1104. When the perforation friction is large, a large diversion force that uniformly distributes the flow rate into all perforation clusters may be provided. Consequently, the stress shadow may be overcome and the resulting fracture lengths may become approximately equal as shown in FIG. 11.1. When fracture spacing is large, the effect of the stress shadow may dissipate, and fractures may have approximately the same dimensions as shown in FIG. 11.2.

Case #2 Complex Fractures

Figure 12:
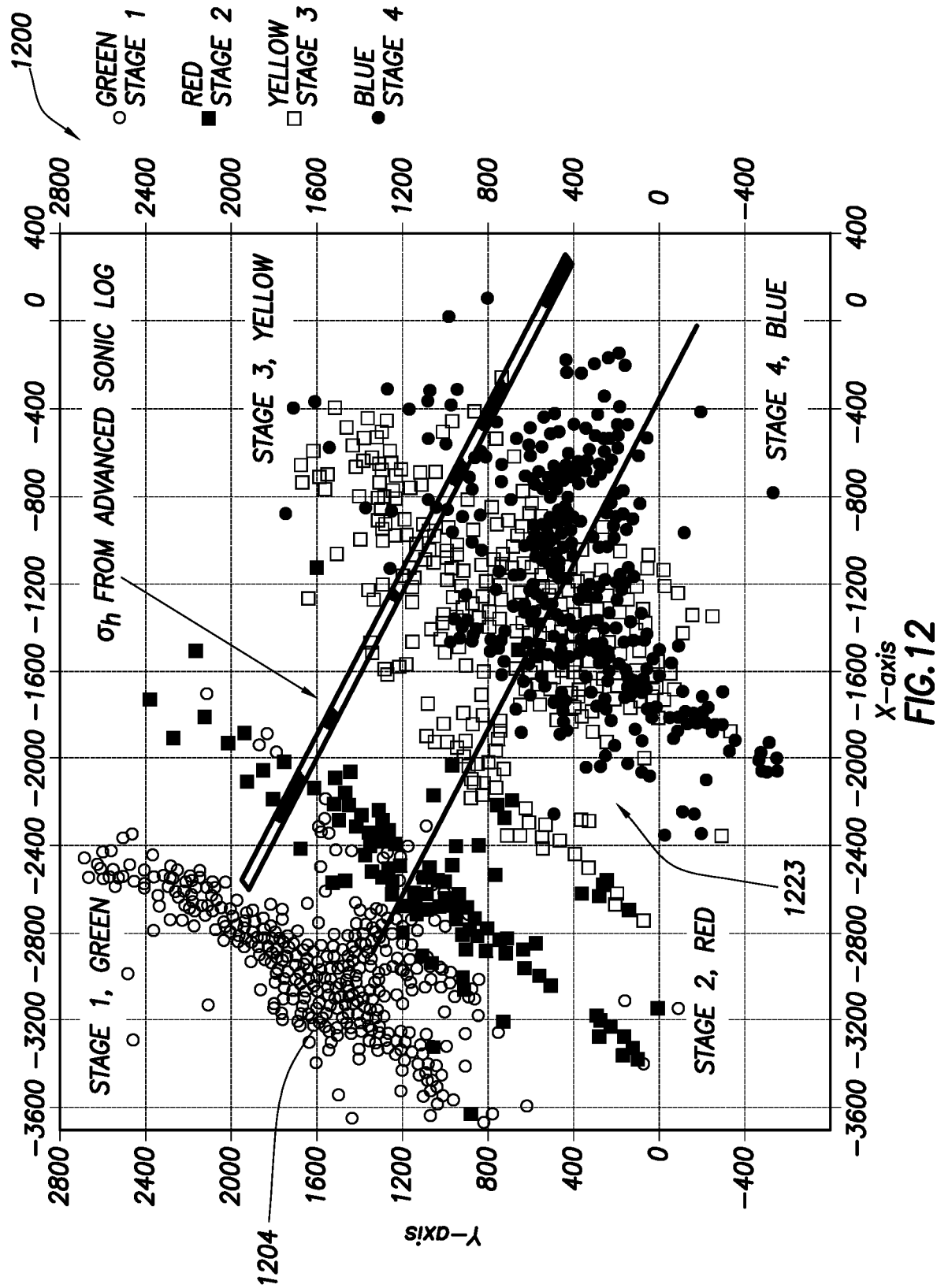
FIG. 12 is a graph depicting microseismic mapping.

In an example of FIG. 12, the UFM model may be used to simulate a 4-stage hydraulic fracture treatment in a horizontal well in a shale formation. See, e.g., Cipolla, C., Weng, X., Mack, M., Ganguly, U., Kresse, O., Gu, H., Cohen, C. and Wu, R., *Integrating Microseismic Mapping and Complex Fracture Modeling to Characterize Fracture Complexity.* Paper SPE 140185 *presented at the SPE Hydraulic Fracturing Conference and Exhibition*, Woodlands, Tex., USA, Jan. 24-26, 2011, (hereinafter "Cipolla 2011") the entire contents of which are hereby incorporated by reference in their entirety. The well may be cased and cemented, and each stage pumped through three or four perforation clusters. Each of the four stages may consist of approximately 25,000 bbls (4000 m³) of fluid and 440,000 lbs (2e+6 kg) of proppant. Extensive data may be available on the well, including advanced sonic logs that provide an estimate of minimum and maximum horizontal stress. Microseismic mapping data may be available for all stages. See, e.g., Daniels, J., Waters, G., LeCalvez, J., Lassek, J., and Bentley, D., *Contacting More of the Barnett Shale Through an Integration of Real-Time Microseismic Monitoring, Petrophysics, and Hydraulic Fracture Design.* Paper SPE 110562 *presented at the* 2007 *SPE Annual Technical Conference and Exhibition*, Anaheim, Calif., USA, Oct. 12-14, 2007. This example is shown in FIG. 12. FIG. 12 is a graph 1200 depicting microseismic mapping of microseismic events 1223 at various stages about a wellbore 1204.

The stress anisotropy from the advanced sonic log, indicates a higher stress anisotropy in the toe section of the well compared to the heel. An advanced 3D seismic interpretation may indicate that the dominant natural fracture trend changes from NE-SW in the toe section to NW-SE in heel portion of the lateral. See, e.g., Rich, J. P. and Ammerman, M., *Unconventional Geophysics for Unconventional Plays.* Paper SPE 131779 *presented at the Unconventional Gas Conference*, Pittsburgh, Pa., USA, Feb. 23-25, 2010, the entire contents of which is hereby incorporated by reference herein in its entirety.

Simulation results may be based on the UFM model without incorporating the full stress shadow calculation (see, e.g., Cipolla 2011), including shear stress and fracture turning (see, e.g., Weng 2011). The simulation may be updated with the full stress model as provided herein. FIGS. 13.1-13.4 show a plan view of a simulated fracture network 1306 about a wellbore 1304 for all four stages 1300.1-1300.4, respectively, and their comparison to the microseismic measurements 1323.1-1323.4, respectively.

From simulation results in FIGS. 13.1-13.4, it can be seen that for Stages 1 and 2, the closely spaced fractures did not diverge significantly. This may be because of the high stress anisotropy in the toe section of the wellbore. For Stage 3 and 4, where stress anisotropy is lower, more fracture divergence can be seen as a result of the stress shadow effect.

Case #3 Multi-Stage Example

Case #3 is an example showing how stress shadow from previous stages can influence the propagation pattern of hydraulic fracture networks for next treatment stages, resulting in changing of total picture of generated hydraulic fracture network for the four stage treatment case.

This case includes four hydraulic fracture treatment stages. The well is cased and cemented. Stages 1 and 2 are pumped through three perforated clusters, and Stages 3 and 4 are pumped through four perforated clusters. The rock fabric is isotropic. The input parameters are listed in Table 4 below. The top view of total hydraulic fracture network without and with accounting for stress shadow from previous stages is shown in FIGS. 13.1-13.4.

TABLE 4

Input parameters for Case #3

| | |
|---|---|
| Young's modulus | 4.5 × 10⁶ psi = 3.1e+10 Pa |
| Poisson's ratio | 0.35 |
| Rate | 30.9 bpm = 0.082 m³/s |
| Viscosity | 0.5 cp = 0.0005 pa-s |
| Height | 330 ft = 101 m |
| Pumping time | 70 min |

FIGS. 14.1-14.4 are schematic diagrams 1400.1-1400-4 depicting a fracture network 1429 at various stages during a fracture operation. FIG. 14.1 shows a discrete fracture network (DFN) 1429 before treatment. FIG. 14.2 depicts a simulated DFN 1429 after a first treatment stage. The DFN 1429 has propagated hydraulic fractures (HFN) 1431 extending therefrom due to the first treatment stage. FIG. 14.3 shows the DFN depicting a simulated HFN 1431.1-1431.4 propagated during four stages, respectively, but without accounting for previous stage effects. FIG. 14.4 shows the DFN depicting HFN 1431.1, 1431.2'-1431.4' propagated during four stages, but with accounting for the fractures, stress shadows and HFN from previous stages.

When stages are generated separately, they may not see each other as indicated in FIG. 14.3. When stress shadow and HFN from previous stages are taken into account as in FIG. 14.4 the propagation pattern may change. The hydraulic fractures 1431.1 generated for the first stage is the same for both case scenarios as shown in FIGS. 14.3 and 14.4. The second stage 1431.2 propagation pattern may be influenced by the first stage through stress shadow, as well as through new DFN (including HFN 1431.1 from Stage 1), resulting in the changing of propagation patterns to HFN 1431.2'. The HFN 1431.1 may start to follow HFN 1431.1 created at stage 1 while encountering it. The third stage 1431.3 may follow a hydraulic fracture created during second stage treatment 1431.2, 1431.2', and may not propagate too far due to stress shadow effect from Stage 2 as indicated by 1431.3 versus 1431.3'. Stage 4 (1431.4) may tend to turn away from stage three when it could, but may follow HFN 1431.3' from previous stages when encounters it and be depicted as HFN 1431.4' in FIG. 14.4.

A method for computing the stress shadow in a complex hydraulic fracture network is presented. The method may involve an enhanced 2D or 3D Displacement Discontinuity Method with correction for finite fracture height. The method may be used to approximate the interaction between different fracture branches in a complex fracture network for the fundamentally 3D fracture problem. This stress shadow calculation may be incorporated in the UFM, a complex fracture network model. The results for simple cases of two fractures show the fractures can either attract or repel each other depending on their initial relative positions, and compare favorably with an independent 2D non-planar hydraulic fracture model.

Simulations of multiple parallel fractures from a horizontal well may be used to confirm the behavior of the two outmost fractures that may be more dominant, while the inner fractures have reduced fracture length and width due to the stress shadow effect. This behavior may also depend on other parameters, such as perforation friction and fracture spacing. When fracture spacing is greater than fracture height, the stress shadow effect may diminish and there may be insignificant differences among the multiple fractures. When perforation friction is large, sufficient diversion to distribute the flow equally among the perforation clusters may be provided, and the fracture dimensions may become approximately equal despite the stress shadow effect.

When complex fractures are created, if the formation has a small stress anisotropy, fracture interaction can lead to dramatic divergence of the fractures where they tend to repel each other. On the other hand, for large stress anisotropy, there may be limited fracture divergence where the stress anisotropy offsets the effect of fracture turning due to the stress shadow, and the fracture may be forced to go in the direction of maximum stress. Regardless of the amount of fracture divergence, the stress shadowing may have an effect on fracture width, which may affect the injection rate distribution into multiple perforation clusters, and overall fracture network footprint and proppant placement.

Performing Fracturing Operations

Figure 15:
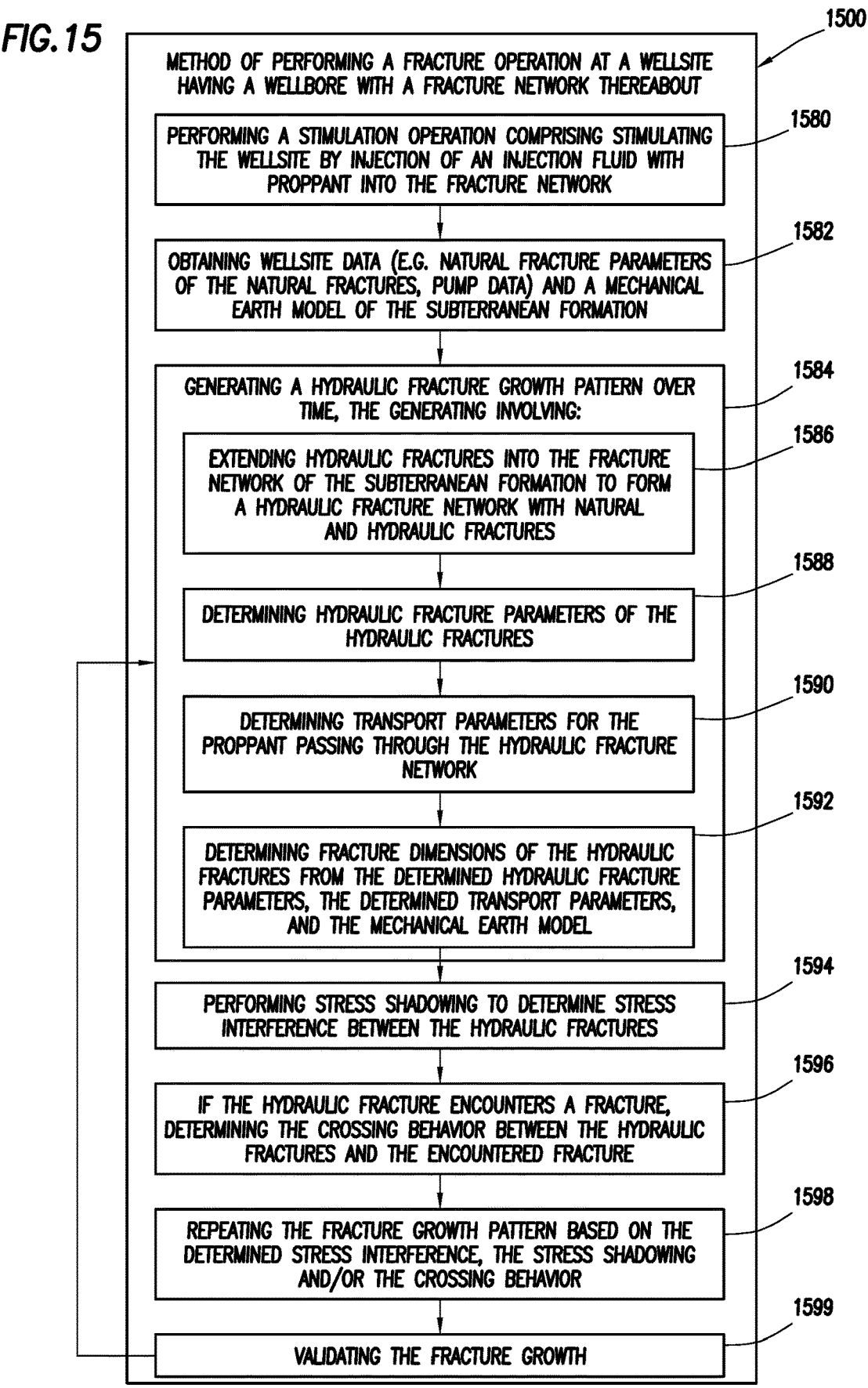
FIG. 15 is a flow chart depicting a method of performing a fracture operation.

FIG. 15 is a flow chart depicting a method 1500 of performing a fracture operation at a wellsite, such as the wellsite 100 of FIG. 1.1. The wellsite is positioned about a subterranean formation having a wellbore therethrough and a fracture network therein. The fracture network has natural fractures as shown in FIGS. 1.1 and 1.2. The method (1500) may involve (1580) performing a stimulation operation by stimulating the wellsite by injection of an injection fluid with proppant into the fracture network to form a hydraulic fracture network. In some cases, the stimulation may be performed at the wellsite or by simulation.

The method involves (1582) obtaining wellsite data and a mechanical earth model of the subterranean formation. Data may be collected, for example, using techniques as shown in FIGS. 1.1-1.2, and/or 17.1-19. The wellsite data may include any data about the wellsite that may be useful to the simulation, such as natural fracture parameters of the natural fractures, images of the fracture network, etc. The natural fracture parameters may include, for example, density orientation, distribution, and mechanical properties (e.g., coefficients of friction, cohesion, fracture toughness, etc.) The fracture parameters may be obtained from direct observations of borehole imaging logs, estimated from 3D seismic, ant tracking, sonic wave anisotropy, geological layer curvature, microseismic events or images, etc. Examples of techniques for obtaining fracture parameters are provided in PCT/US2012/48871 and US2008/0183451, the entire contents of which are hereby incorporated by reference herein in their entirety.

Images may be obtained by, for example, observing borehole imaging logs, estimating fracture dimensions from wellbore measurements, obtaining microseismic images, and/or the like. The fracture dimensions may be estimated by evaluating seismic measurements, ant tracking, sonic measurements, geological measurements, and/or the like. Other wellsite data may also be generated from various sources, such as wellsite measurements, historical data, assumptions, etc. Such data may involve, for example, completion, geological structure, petrophysical, geomechanical, log measurement and other forms of data. The mechanical earth model may be obtained using conventional techniques.

The method (1500) also involves (1584) generating a hydraulic fracture growth pattern over time, such as during the stimulation operation. FIGS. 16.1-16.4 depict graphs 1600.1-1600.4 showing an example of (1584) generating a hydraulic fracture growth pattern. As shown in FIG. 16.1, in its initial state, a fracture network 1606.1 with natural fractures 1623 is positioned about a subterranean formation 1602 with a wellbore 1604 therethrough. As proppant is injected into the subterranean formation 1602 from the wellbore 1604, pressure from the proppant creates hydraulic fractures 1691 about the wellbore 1604. The hydraulic fractures 1691 extend into the subterranean formation along $L_1$ and $L_2$ (FIG. 16.2), and encounter other fractures in the fracture network 1606.1 over time as indicated in FIGS. 16.2-16.3. The points of contact with the other fractures are intersections 1625.

The generating (1584) may involve (1586) extending hydraulic fractures from the wellbore and into the fracture network of the subterranean formation to form a hydraulic fracture network including the natural fractures and the hydraulic fractures as shown in FIG. 16.2. The fracture growth pattern is based on the natural fracture parameters and a minimum stress and a maximum stress on the subterranean formation. The generating may also involve (1588) determining hydraulic fracture parameters (e.g., pressure p, width w, flow rate q, etc.) of the hydraulic fractures, (1590) determining transport parameters for the proppant passing through the hydraulic fracture network, and (1592) determining fracture dimensions (e.g., height) of the hydraulic fractures from, for example, the determined hydraulic fracture parameters, the determined transport parameters and the mechanical earth model. The hydraulic fracture parameters may be determined after the extending. The determining (1592) may also be performed by from the proppant transport parameters, wellsite parameters and other items.

The generating (1584) may involve modeling rock properties based on a mechanical earth model as described, for example, in Koutsabeloulis and Zhang, 3*D Reservoir Geomechanics Modeling in Oil/Gas Field Production*, SPE Paper 126095, 2009 *SPE Saudi Arabia Section Technical Symposium and Exhibition* held in Al Khobar, Saudi Arabia, 9-11 May. 2009. The generating may also involve modeling the fracture operation by using the wellsite data, fracture parameters and/or images as inputs modeling software, such as UFM, to generate successive images of induced hydraulic fractures in the fracture network.

The method (1500) also involves (1594) performing stress shadowing on the hydraulic fractures to determine stress interference between the hydraulic fractures (or with other fractures), and (1598) repeating the generating (1584) based on the stress shadowing and/or the determined stress interference between the hydraulic fractures. The repeating may be performed to account for fracture interference that may affect fracture growth. Stress shadowing may involve performing, for example, a 2D or 3D DDM for each of the hydraulic fractures and updating the fracture growth pattern over time. The fracture growth pattern may propagate normal to a local principal stress direction according to stress shadowing. The fracture growth pattern may involve influences of the natural and hydraulic fractures over the fracture network (see FIG. 16.3).

Stress shadowing may be performed for multiple wellbores of the wellsite. The stress shadowing from the various wellbores may be combined to determine the interaction of fractures as determined from each of the wellbores. The generating may be repeated for each of the stress shadowings performed for one or more of the multiple wellbores. The generating may also be repeated for stress shadowing performed where stimulation is provided from multiple wellbores. Multiple simulations may also be performed on the same wellbore with various combinations of data, and compared as desired. Historical or other data may also be input into the generating to provide multiple sources of information for consideration in the ultimate results.

The method also involves (1596) determining crossing behavior between the hydraulic fractures and an encountered fracture if the hydraulic fracture encounters another fracture, and (1598) repeating the generating (1584) based on the crossing behavior if the hydraulic fracture encounters a fracture (see, e.g., FIG. 16.3). Crossing behavior may be determined using, for example, the techniques of PCT/US2012/059774, the entire contents of which is hereby incorporated herein in its entirety.

The determining crossing behavior may involve performing stress shadowing. Depending on downhole conditions, the fracture growth pattern may be unaltered or altered when the hydraulic fracture encounters the fracture. When a fracture pressure is greater than a stress acting on the encountered fracture, the fracture growth pattern may propagate along the encountered fracture. The fracture growth pattern may continue propagation along the encountered fracture until the end of the natural fracture is reached. The fracture growth pattern may change direction at the end of the natural fracture, with the fracture growth pattern extending in a direction normal to a minimum stress at the end of the natural fracture as shown in FIG. 16.4. As shown in FIG. 16.4, the hydraulic fracture extends on a new path 1627 according to the local stresses $\sigma_1$ and $\sigma_2$.

Optionally, the method (1500) may also involve (1599) validating the fracture growth pattern. The validation may be performed by comparing the resulting growth pattern with other data, such as microseismic images as shown, for example, in FIGS. 7.1 and 7.2.

The method may be performed in any order and repeated as desired. For example, the steps of generating (1584)-(1599) may be repeated over time, for example, by iteration as the fracture network changes. The generating (1584) may be performed to update the iterated simulation performed during the generating to account for the interaction and effects of multiple fractures as the fracture network is stimulated over time.

II. Fracture Optimization Using Uncertainty

Hydraulic fracturing is performed to facilitate the production of valuable subsurface hydrocarbons. To properly perform hydraulic fracturing, an understanding of subsurface formations and the natural fractures in such formations is desired. Techniques, such as stress-shadowing, are provided to gain an understanding of the natural fractures and to design hydraulic fracturing to enhance production. To further understand the characteristics (e.g., fracture interaction, distribution, and dimension), multi-realizations may be used to address uncertainty of such characteristics.

An element that may influence the hydraulic fracture geometry is the pre-existing natural fractures in the formation. Since there is no precise determination of the exact locations, geometry, and attributes of the natural fractures in the formation, the outcome of a hydraulic fracture treatment may bear a degree of uncertainty. Because of this, the natural fractures generated for the above mentioned simulation are statistical in nature and the predicted hydraulic fracture geometry and the corresponding well production also may have a degree of uncertainty. This can pose challenges for the operators when making decisions on whether, where, and how to drill and complete a well.

Measurements of natural fractures from multiple sources may be compared to define a statistical distribution for generating natural fractures that are used in generating hydraulic fracturing in response thereto. Such techniques may be designed to understand properties of preexisting natural fractures and their effect on the hydraulic fracture network footprint. Such techniques may be used, for example, when pumping into a formation with preexisting natural fractures, and consequently the propped fracture surface area and production. Using a statistical distribution, the fracture data generated statistically may be selected as part of the obtaining wellsite data 1582 of the method 1500 of FIG. 15.

In at least one aspect, the present disclosure provides a method for performing a statistics-based uncertainty analysis on the impact of natural fractures, or other highly uncertain reservoir parameters, to quantify the uncertainty in the stimulation outcome to aid the operators in the decision making process.

At least one embodiment of the present disclosure provides a method for quantifying the uncertainty analysis on the impact of distribution (i.e., heterogeneity) and dimension of the natural fractures on the production of the stimulated well. For a given set of statistical parameters that define a natural fracture system, multiple realizations of the natural fracture system may be generated. The complex hydraulic fracture network generated from a fixed treatment design for any given realization is simulated using the UFM and the corresponding production performance and production may be predicted using an Unconventional Production Model (UPM).

At least a portion of the cumulative production predicted for a number of simulations may provide a statistical distribution that gives an assessment of how heterogeneity in natural fracture distribution and fracture dimensions can impact well production. This type of assessment can be used by operators to make decisions when evaluating an asset or determining the values of additional measurements that can help reduce a variety of uncertainties.

Hydraulic and Natural Fracture Interaction

Production from unconventional reservoirs, such as shale gas reservoirs, and/or conventional reservoirs may depend on the efficiency of hydraulic fracturing treatment. The economics of producing unconventional reservoirs may be challenging because of high completion cost and uncertainty of production rate. Some of the sources of uncertainties may be lack of understanding of reservoir quality attributes, such as organic contents of the rock, permeability and porosity, heterogeneous distribution of these quantities, and the dimensions and conductivity of the created complex hydraulic fracture system which may depend upon the pre-existing natural fractures and in-situ stresses in the formation.

Improvements in completion and treatment design and practices in unconventional reservoirs may be achieved through a trial and error approach, which may incur costs or loss of opportunities to the operators. A more efficient approach to reservoir evaluation and completion optimization may depend on a deeper understanding of the complex hydraulic fracturing and production processes and quantification of uncertainties to guide the economic decisions.

Conventional hydraulic fracture models may assume a bi-wing type induced fracture. These bi-wing fractures may fall short in representing the complex nature of induced fractures in some unconventional reservoirs with preexisting natural fractures and discontinuities. Published models may map the complex geometry of discrete hydraulic fractures based on monitoring microseismic event distribution.

Hydraulic fracture models have been developed to simulate complex fracture networks in a naturally fractured formation and the subsequent production from the system. For example, US Patent Publication No. US20080183451A1 teaches a method for simulating complex hydraulic fracture geometry and proppant distribution in the fracture network in a formation containing pre-existing natural fractures. US Patent Publication No. US20120179444A1 teaches methods for integrating the fracture simulator described in US20080183451A1 with production simulators in the design workflow to predict the performance of the stimulated well and to select the best completion and treatment design parameters to optimize well production. Techniques for fracturing are described in U.S. Pat. No. 8,886,502, US20140305638, US20080183451A1, US20120179444A1, and US20080183451A1, the entire contents of which are hereby incorporated by reference herein.

Figure 21:
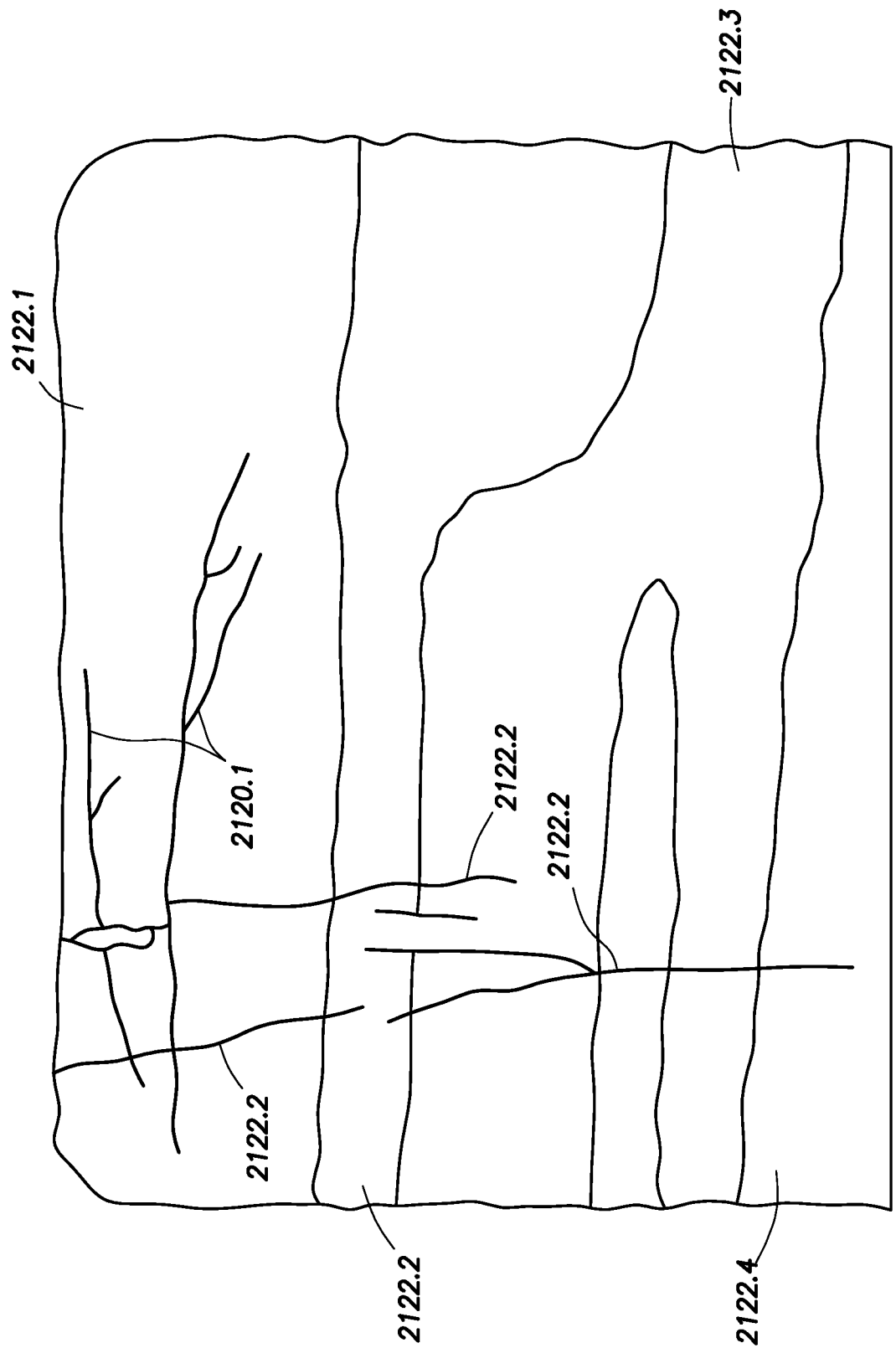
FIG. 21 is a schematic diagram illustrating hydraulic and natural fractures in zones of a formation.
Figure 22:
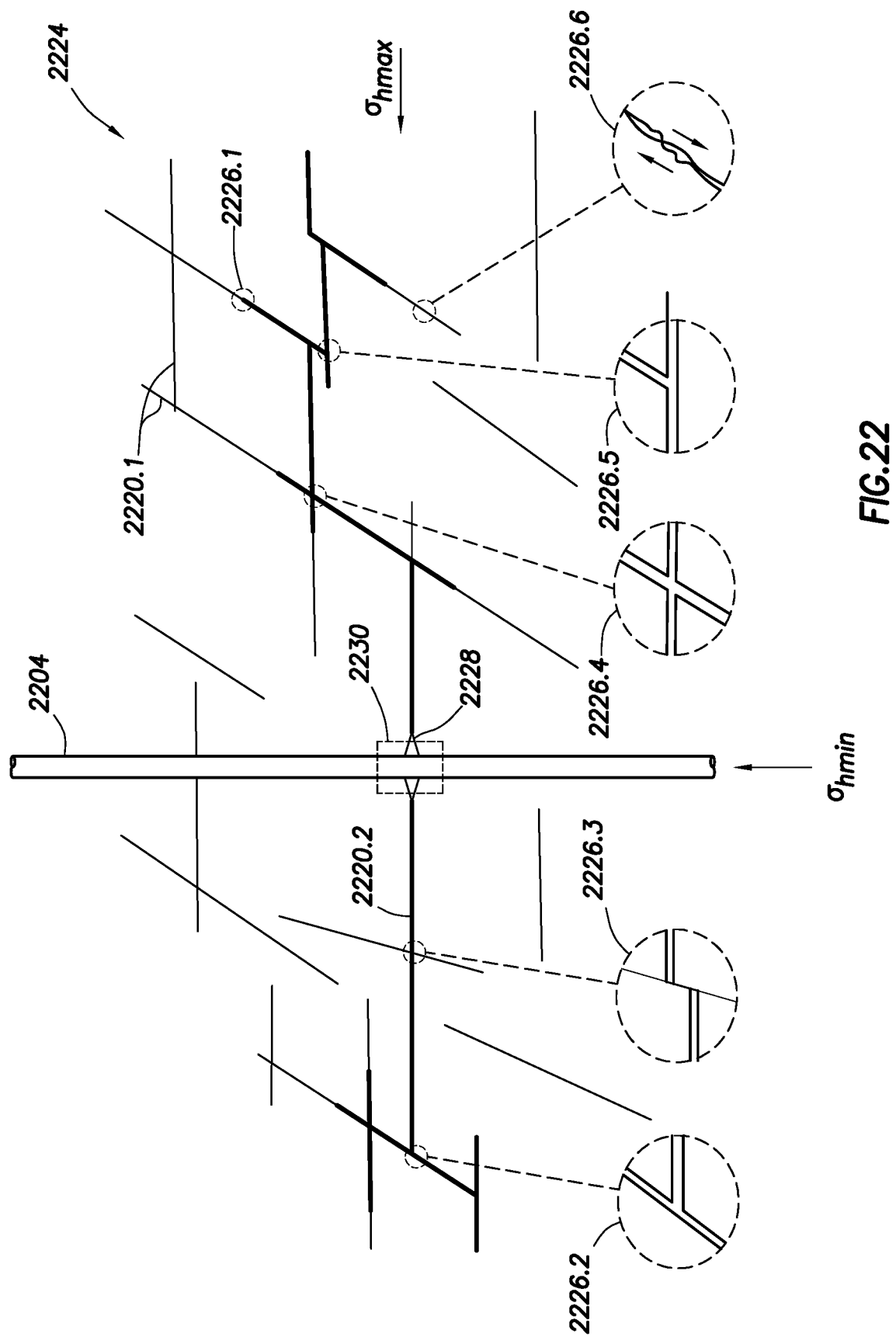
FIG. 22 is a schematic diagram illustrating a hydraulic fracture network with various scenarios of natural and hydraulic fracture interaction.

FIGS. 21-22 are schematic diagrams depicting hydraulic and natural fractures in a formation. FIG. 21 shows natural fractures 2120.1 and hydraulic fractures 2120.2 disposed about various zones 2122.1-.4 in the formation, including a densely welded zone, rubble zones, vitric zone, and basal zone, respectively. FIG. 22 shows a fracture network 2224 with hydraulic fractures 2220.2 forming branches with natural fractures 2220.1 about a wellbore 2204.

In some field-scale hydraulic fracturing experiments in which the fractured formations are mined back or cored through to directly observe the created fracture geometry, hydraulic fractures may interact with natural fractures which can result in branching and offset at the natural fractures, and consequently lead to complex fractures as shown in FIG. 21 (see, e.g., Warpinski and Teufel). FIG. 21 shows an example of complex parallel fractures and offsets created as a hydraulic fracture propagates through natural fractures and zone boundaries.

As described further herein, formations may have conditions which affect hydraulic fracturing. For example, coring through the hydraulically fractured intervals may reveal multiple closely spaced hydraulically induced fractures filled with the residue of the fracturing fluid. Hydraulic and/or multi-stage fracturing may be needed in various formations to facilitate production, such as in horizontal drilling in shale gas and shale oil reservoirs. Formations may have complex fracture networks created during fracturing treatments. To determine potential effects of various conditions, fracture simulation may be used to provide information about factors which may influence short and/or long term production, such as induced overall fracture length and height, propped versus unpropped fracture surface areas, and proppant distribution and its conductivity.

Complex fracture models may be used in applications involving conventional and/or unconventional reservoirs. Such models may consider the nature of fracture complexity created during fracture treatment. Microseismic monitoring may be used to provide some estimation of the hydraulic fracture planes. To achieve further clarity and to understand various conditions that may be present in the formation, models may be extended to consider additional features, such as low permeability shale, limited fluid penetration in the natural fracture network, natural fractures orientation, and a large volume of injected fluid. Properly constructed complex fracture models and/or geomechanics models may help answer questions and provide tools for optimizing the fracture design and completion strategy.

Hydraulic fracturing may be affected by the preexisting natural fractures in the formation. For example, for a hydraulic fracture propagating in a formation that contains preexisting natural fractures or mechanically weak planes relative to the rock matrix, the interaction between the hydraulic fracture and natural fractures may cause various effects, such as fluid loss into the natural fractures, dilation of the natural fractures either due to shear or in tension, or even branching or alteration of the hydraulic fractures path, leading to complex fractures.

FIG. 22 shows an example of a complex hydraulic fracture network 2224 including natural fractures 2220.1 and hydraulic fractures 2220.2. As shown in FIG. 22, the hydraulic fracture network 2224 is created when pumping into a perforation cluster 2228 in a horizontal well 2204 leading to various possible scenarios 2226.1-2226.6 of hydraulic fractures interaction with natural fractures that can lead to fracture branching and complexity. Examples of possible interactions are described in the following scenarios:

1. Direct Crossing 2226.1

When a natural fracture has strong mechanical bonding and/or is subjected to high normal stress, the tensile stress concentration at the tip of the approaching hydraulic fractures may be readily transmitted across the natural fractures interface to the rock on the opposite side of the hydraulic fracture, causing the rock to fail in tension and allowing the hydraulic fracture to directly propagate through the natural fractures without change of direction. Consequently, the hydraulic fractures may propagate through the formation as a planar fracture. However, if the fluid pressure can exceed the closure stress acting on the natural fractures, it may open in tension and become a part of a now nonplanar hydraulic fracture network.

2. Hydraulic Fractures Arrested by Natural Fractures 2226.2

This scenario occurs when the natural fractures interface is weaker than the rock matrix and the stress condition is such that the interface fails in shear and slips. Consequently, the tensile stress at the tip of the approaching hydraulic fractures may not be sufficiently transmitted to the opposite side of the natural fractures interface to cause the rock to fail in tension, and the hydraulic fractures growth is hence arrested by the natural fractures. If the fluid pressure in the hydraulic fractures continues to increase, it can exceed the closure stress acting on the natural fractures and cause the natural fractures to be opened in tension and become a part of the hydraulic fracture network.

3. Crossing with an Offset 2226.3

When a hydraulic fracture crosses a natural fracture, it can do so with a small offset at the interface, as shown in FIG. 22. The offset may be on the order of one to a few inches (see e.g. Jeffrey, R. G., Bunger, A., Lecampion, B., Zhang, X., Chen, Z., As, A., Allison, D. P., de Beer, W., Dudley, J. W., Siebrits, E., Thiercelin, M., Mainguy, M., 2009. *Measuring hydraulic fracture growth in naturally fractured rock. In: SPE 124919, SPE Annual Technical Conference and Exhibition*, New Orleans, La., USA, 4-7 October (hereafter "Jeffrey et al., 2009"), the entire contents of which are incorporated by reference herein). The offset may be created due to localized interface separation and shear slip at the point where the hydraulic fractures intersects the natural fractures This may shift the stress concentration away from the intersection point to the tip of opening/shear slip region (see, e.g. Thiercelin, M., Makkhyu, E., 2007. *Stress field in the vicinity of a natural fault activated by the propagation of an induced hydraulic fracture. In: Proceedings of the* 1st *Canada-US Rock Mechanics Symposium*, vol. 2, pp. 1617-1624 (hereafter "Thiercelin and Makkhyu, 2007"), the entire contents of which are incorporated by reference herein).

4. Intersecting Natural Fractures 2226.4

Once fluid pressure exceeds the closure stress on the natural fractures, the natural fracture may open up in tension and become a part of the hydraulic fractures network. If the natural fracture intersects another natural fracture, when the fluid front reaches the intersection, the hydraulic fractures may branch again at the intersection as long as fluid pressure exceeds the closure stress on the natural fractures.

5. Branching 2226.5 (or Turning of Fracture at End of the Natural Fractures)

For a hydraulic fracture following the path of the natural fracture to its end, there may no longer be a weak plane for fluid to preferentially open. Consequently, the hydraulic fracture may either turn itself to align with the preferred fracture direction or creates a T-shaped branch.

6. Shear Slip 2226.6 Along Natural Fractures

If the fluid pressure in the natural fractures stays below its closure stress, the fracture interface may not separate in tension. However, it can fail in shear. The shear-induced interfacial slip may cause dilation and enhance the permeability of the natural fractures, which can potentially enhance production. The occurrence of shear failure depends on the normal and shear stresses applied on the natural fractures, which, in turn, may depend on the in situ principal stresses, an angle of the natural fractures relative to the in situ stresses, the fluid pressure (which may depend on pressure diffusion in the natural fractures), and interfacial frictional properties.

The various scenarios may affect the fracturing, as well as any models and/or simulations of fracturing.

Impact of Natural Fracture Friction Coefficient and Fluid Viscosity

FIGS. 23.1-25.3 and FIGS. 42.1-44.3 are fracture contour plots depicting the relation between the HFN's geometry, the fracturing fluid viscosity and the natural fracture's friction coefficient. FIGS. 23.1-23.3 depict a hydraulic fracture network footprint for natural fractures with friction coefficient of 0.1 for pumped slickwater (SW), liner gel (LG), and cross-linked gel (XL), respectively. FIGS. 24.1-24.3 depict a hydraulic fracture network footprint for natural fractures with friction coefficient of 0.5 for pumped SW, LG, and XL, respectively. FIGS. 25.1-25.3 depict a hydraulic fracture network footprint for natural fractures with friction coefficient of 0.9 for pumped SW, LG, and XL, respectively.

These FIGS. 23.1-25.3 show the HFN generated from the treatments using SW, LG, and XL for a natural fracture friction coefficient of 0.1, 0.5, and 0.9. These contour plots show the predicted proppant distribution in the fracture network with lighter shading corresponding to the induced fracture area with zero proppant concentration, and darker shades corresponding to greater proppant concentration.

As indicated by these figures, fluid viscosity may impact the hydraulic fracture footprint in unconventional formations (see, e.g. Kresse, O., Weng, X., Chuprakov, D., Prioul, R., Cohen, C., 2013. *Effect of flow rate and viscosity on complex fracture development in UFM model. In: International Conference for Effective and Sustainable Hydraulic Fracturing*, Brisbane, Australia, 20-22 May, (hereafter "Kresse et al., 2013"); and Cohen, C. E., Abad, C., Weng, X., England, K., Phatak, A., Kresse, O., Nevvonen, O., Lafitte, V., Abivin, P., 2013. *Analysis on the impact of fracturing treatment design and reservoir properties on production from shale gas reservoirs. In: IPTC 16400, International Petroleum Technology Conference*, Beijing, China, 26-28 March (hereafter "Cohen et al., 2013") the entire contents of which are herein incorporated by reference). For higher-viscosity fluids, the hydraulic fractures may have a tendency to cross the orthogonal natural fractures and develop a less complex fracture network. Contrarily, the hydraulic fractures generated by low-viscosity fluid, such as slick water, may be more easily arrested by the natural fractures, leading to greater fracture complexity. A higher-viscosity fluid may also create more fracture width. Consequently, it may generate a smaller fracture surface area as compared to a lower viscosity fluid, for the same amount of fluid pumped. FIGS. 23.1-25.3 also shows the proppant distribution in the fractures. For cross-linked gel, the proppant may be suspended vertically in the fracture, whereas for the slick water, most of the proppant may settle to the bottom of the fractures.

The friction coefficient may also influence the propagation pattern. More variations of the HFN may be observed when comparing cases with a friction coefficient of 0.1 of FIGS. 23.1-23.3 and 0.5 of FIGS. 24.1-24.3; whereas, the HFNs for friction coefficients of 0.5 of FIGS. 24.1-24.3 and 0.9 of FIGS. 25.1-25.3 are similar. Hydraulic fractures mostly cross natural fractures at friction coefficient of 0.5 and 0.9, and mostly get arrested by the natural fractures for friction coefficient of 0.1. For friction coefficients of 0.5 and 0.9, even though the hydraulic fractures cross the natural fractures, some fracture complexity may still develop due to the opening of the natural fractures after the crossing as a result of fluid pressure exceeding the closure stress acting on the natural fractures. With slick water, the hydraulic fractures may be mostly arrested by the natural fractures. There may be some variations in the predicted geometry at different friction coefficients due to greater sensitivity of fracture geometry in the case of low-viscosity fluid.

Impact of DFN Orientation

FIGS. 26.1-26.6 are contour plots of a hydraulic fracture network at angles 10, 30, 45, 60, 75, and 90 degrees, respectively. These HFNs use slick water and have a natural fracture friction coefficient of 0.5. As shown by these figures, the orientation of natural fractures may impact the induced HFN footprints.

When natural fractures are almost parallel to the direction of the maximum horizontal stress (direction of hydraulic fractures propagation) as shown by FIG. 26.1, hydraulic fractures may not be affected by the natural fractures, resulting in longer planar fractures. The larger the intersection angle between hydraulic and natural fractures as shown by 26.2-26.6, respectively, the more complicated the network may be due to the greater deviation of the hydraulic fractures from their original path and greater chance of their intersecting more natural fractures as a result of the fracture arrest by the natural fractures and penetration of fracturing fluid into the natural fractures.

FIGS. 27.1 and 27.2 are graphs plotting natural fracture angle to sigma h direction (x-axis) for a fracture area and propped fracture area versus total fracture surface area (y-axis) and average final extension of HFN, respectively. These figures show that orientation of the natural fractures has a drastic impact on fracture extension and the total and propped surface areas of the induced hydraulic network. FIG. 27.1 shows the total fracture surface area may decrease as the natural fractures orientation increases toward 90 degrees, and the propped surface area may remain almost unchanged by the variation of the natural fractures angle. This may be due to the low viscosity of the carrying fluid for which the proppant placement is dominated by the relatively high settling velocity in SW.

The fracture surface area may be affected more than the area of propped surface due to the low viscosity fluid pumped for this case. Even though the fracture network may become more complex, qualitatively characterized by a greater number of branch points and secondary fractures, as the natural fractures angle increases, the total surface area may decrease due to rapid decrease of the extension of the network along the primary fracture direction, as shown in FIG. 27.2.

As shown, the total surface area may be relatively constant between 30 and 60 degrees, as the increase of surface area created from greater number of secondary fractures is offset by the reduction in the overall extension of the network. However, the surface area per unit reservoir volume may increase with the natural fractures angle. This means more surface area can be created in a given reservoir volume when natural fractures is at a larger angle with HF, though it would require drilling more wells (i.e., at smaller well spacing) to cover the same reservoir volume compared with more planar fractures.

FIG. 27.2 shows the averaged final extension of the HFN in both the $\sigma_n$ and $\sigma_H$ directions as a function of the natural fractures orientation. In this study, the HFN extension may be calculated for each perforation cluster, so the averaged HFN extension may be defined as the average from all four clusters. In the rest of the section, the HFN extension may be considered the averaged value. The results in FIG. 27.2 show that the extension of the HFN in the $\sigma_H$ direction may be reduced as the angle increases; whereas, the extension in the $\sigma_n$ direction increases slightly. This may be because of the combined effect of more intersections of the hydraulic fractures with natural fractures as the angle increases on the one hand, and the more elevated net pressure on the other. Since the fluid pressure may need to exceed the closure stress on the natural fractures in order to open them, the net pressure increases as the natural fractures angle increases, resulting in wider width in the primary fractures and, consequently, shorter fracture network length.

FIG. 27.3 is another graph depicting SRV (y-axis) versus natural fracture angle (x-axis). The SRV here is given in surface area (square feet) to neglect the height component, contain the fracture height, and focus on the extension of the HFN in the horizontal plane. The SRV may be estimated by multiplying the average HFN extensions in the $\sigma_n$ direction by the average HFN extensions in the $\sigma_H$ direction. The results of FIG. 27.3 indicate that the optimum SRV occurs at natural fractures angle of 30 degrees. The SRV may be used as a proxy for production. The actual well production may also influenced by the density of the fractures, i.e., the fracture surface area, within the SRV, and the fracture conductivity.

Impact of DFN Length

The impact of the length of natural fractures on the HFN footprint is demonstrated by FIGS. 28.1-29. FIGS. 28.1-28.4 are contour plots of a hydraulic fracture network with the length of the natural fractures at 50 ft, 100 ft, 200 ft, and 400 ft, respectively. FIGS. 29.1-29.2 are graphs plotting final extension of HFN (y-axis) versus natural fracture length (x-axis) for different sigma h directions.

In these examples, the length of natural fractures is increased from 50 to 400 ft to assess the sensitivity of the HFN footprint to the natural fractures length. As indicated by FIGS. 28.1-28.4, for small natural fractures length, the HFN extends primarily along the maximum horizontal stress direction. This may be due to the lower probability of hydraulic fractures intersecting a natural fracture and the shorter secondary fractures that propagate along the natural fractures. For long natural fractures, the network may extend toward the orientation of the natural fractures, due to the growth of fractures along the natural fractures.

FIG. 29.1 compares the HFN extension in the maximum and minimum horizontal stress directions as a function of the natural fractures length. The natural fractures may play a dominant role in controlling the orientation of the HFN when the natural fractures length exceeds the average fracture spacing. In that case, a hydraulic fracture tip may not be able to travel in the rock matrix a distance much larger than the fracture spacing before intersecting a natural fracture. When arrested by the natural fractures, the hydraulic fracture may be forced to propagate along the long natural fractures. FIG. 29.1 indicates that the length of natural fractures, together with orientation of natural fractures, can change the hydraulic fracture propagation path.

FIG. 29.2 indicates that SRV increases almost linearly as the natural fracture length increases, suggesting that greater natural fracture length may help increase the production. However, FIG. 29.1 indicates that as the ratio of natural fracture length to natural fracture spacing increases, the SRV reaches a volume for which HFN extension in both horizontal directions are approximately equal, optimizing its surface area. This may indicate that further increasing the length of natural fracture may reduce the SRV by giving a preferential extension in the minimum stress direction, and therefore potentially reduce production.

Impact of DFN Spacing

The impact of DFN spacing on the HFN is depicted in FIGS. 30.1-31.3. The natural fractures spacing may affect the induced HFN by controlling the natural fractures density. FIGS. 30.1-30.4 are contour plots showing a HFN with spacing at 25, 50, 100, and 200 feet, respectively. FIG. 31.1 is a graph showing average final extension of HFN (y-axis)

versus natural fracture average spacing (x-axis) for different sigma directions. FIG. 31.2 is a graph showing HFN extension in sigma directions (y-axis) versus length/spacing (x-axis) for natural fractures spacing and natural fractures length. FIG. 31.3 is a graph showing SRF (y-axis) versus natural fracture average spacing (x-axis).

The simulations of FIGS. 30.1-31.3 indicate that by increasing the fracture spacing, the extension of the hydraulic fracture network in the direction of maximum horizontal stress may also increase; whereas, the extension in the direction of minimum horizontal stress may decrease due to less intersection between hydraulic fractures and natural fractures. For low natural fractures spacing, the HFN propagates in the direction of the natural fractures orientation. The fracture propagation path may be altered by the closely located natural fractures, resulting in smaller SRV with more complex network geometry. Because the natural fractures spacing may be related to the natural fractures density, the trends in FIGS. 30.1-31.3 suggest that the natural fractures gain control of the HFN orientation as the natural fractures density increases.

This result is consistent with the observation in FIG. 29.1. To clarify the relation between the natural fracture's density and the shape of the HFN, FIG. 31.2 plots the ratio of the average natural fracture's length by the average natural fracture's spacing, versus the ratio of the HFN extension in the ax direction by the HFN extension in the an direction, based on results from both FIGS. 29.1 and 31.2. It shows that whether the length of natural fractures or their spacing is fixed, the proportions of the HFN evolve similarly as a function of the natural fracture's length to spacing ratio. FIG. 31.3 indicates that the SRV increases with the natural fractures spacing, with the rapid increase occurring in the range of small fracture spacing that is less than the fracture length, where the high natural fractures density inhibits the HFN propagation in the ax direction.

Impact of Multiple Sets of Natural Fractures

The impact of multiple sets of natural fractures with different properties and orientations is depicted by FIGS. 32.1-34. FIGS. 32.1-32.4 and 33.1-33.4 are sets of contour plots of hydraulic fracture networks with each set shown at 50, 100, 200, and 400 feet, respectively. FIG. 34 is a graph plotting final extension of HFN (y-axis) versus fracture length of the first set of natural fractures (x-axis) for fracture sets at various angles.

As demonstrated by these figures, under different conditions, the impact of a set of natural fractures on the HFN footprint may reduce from significant to negligible. FIGS. 32.1-33.4 compare HFNs for a case with two sets of natural fractures that are orthogonal to each other. The two sets have a spacing of 100 ft. Both sets have a natural fracture length varying between 50 and 400 ft. FIGS. 32.1-32.4 shows the resulting HFN in the case of an angle to the maximum horizontal stress orientation of 0 for the first set and 90 degrees for the second set.

The results may not show any particular correlation between the HFN footprint and the length of fractures of the first set. This indicates that the HFN geometry may be dominated by the fracture set with the orientation orthogonal to the maximum horizontal stress. FIGS. 33.1-33.4 shows similar simulations, except that the first set of natural fractures has an orientation of 45 and the second set has an orientation of 135 degrees. This means that both sets have an angle of 45 degrees to the maximum horizontal stress orientation.

The geometry of the HFN may become dominated by the natural fractures orientation, if the length of the natural fractures and the angle of the natural fractures to the maximum horizontal stress are sufficient. FIG. 34 compares the extension of the HFN in the maximum horizontal stress direction as a function of the natural fractures length of the first set, for the cases with natural fractures orientations of 0-90 and 45-135 degrees. FIG. 34 indicates that, if the natural fractures orientation is aligned with the maximum horizontal principal stress, there may be little influence of the natural fracture length on the HFN; whereas, at an angle of 45 degrees, final extension of the HFN in the maximum stress direction may decrease as the length of the first set increases. A final observation is that the set with a 45 degree angle offers a greater SRV and complexity than the set orthogonal to the horizontal principal stresses, independent of the length of the natural fractures.

These figures indicate that the simulated HFN footprint, which is generally associated with a microseismic events cloud, may be affected by the properties of natural fractures. Natural fracture orientation may alter the preferred hydraulic fracture propagation direction, and the length of natural fractures may affect the extension of HFN in the direction of minimum horizontal stress. When multiple fracture sets are present, the fracture set that is at a greater angle to the hydraulic fracture orientation may have a greater influence in generating fracture complexity.

Impact of Uncertainty of DFN on HFN Simulation

Figure 35:
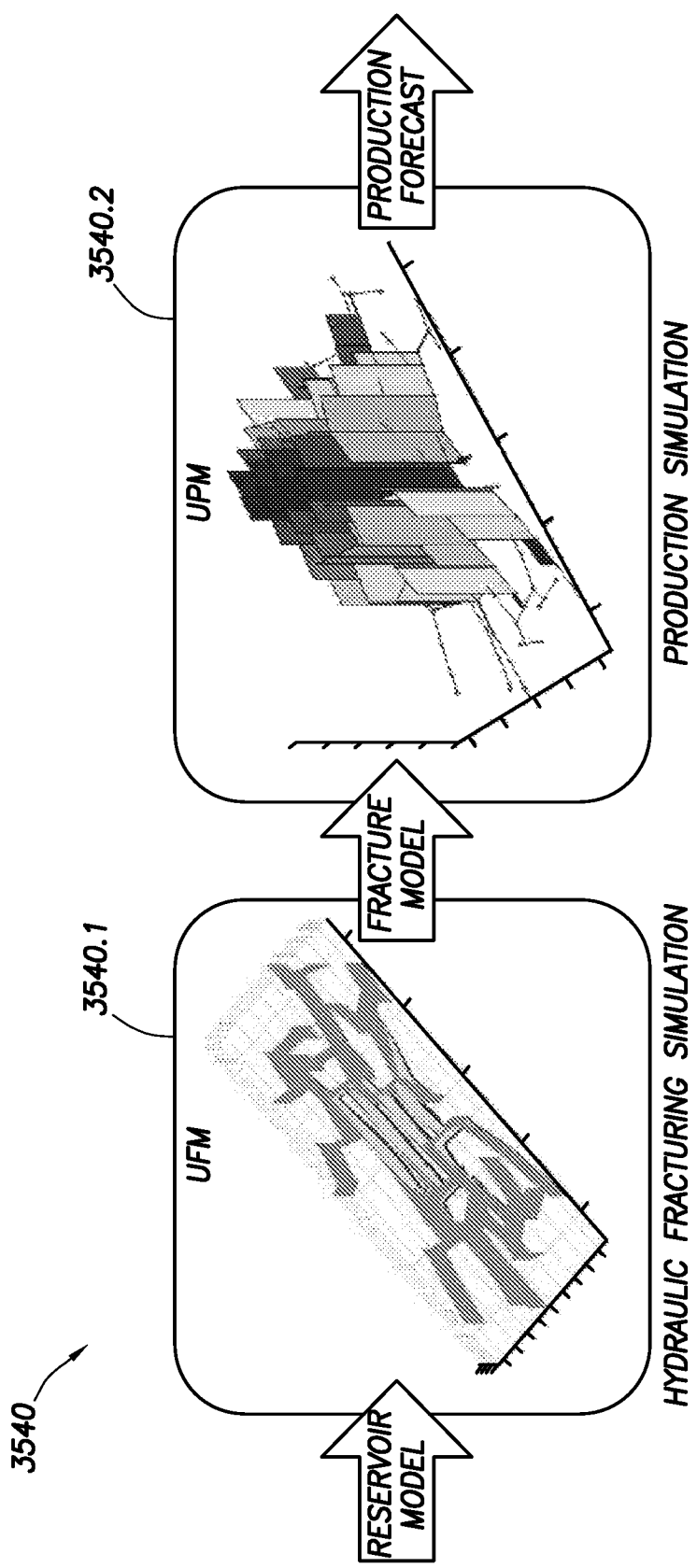
FIG. 35 is a schematic diagram depicting simulation of a hydraulic fracture.
Figure 36:
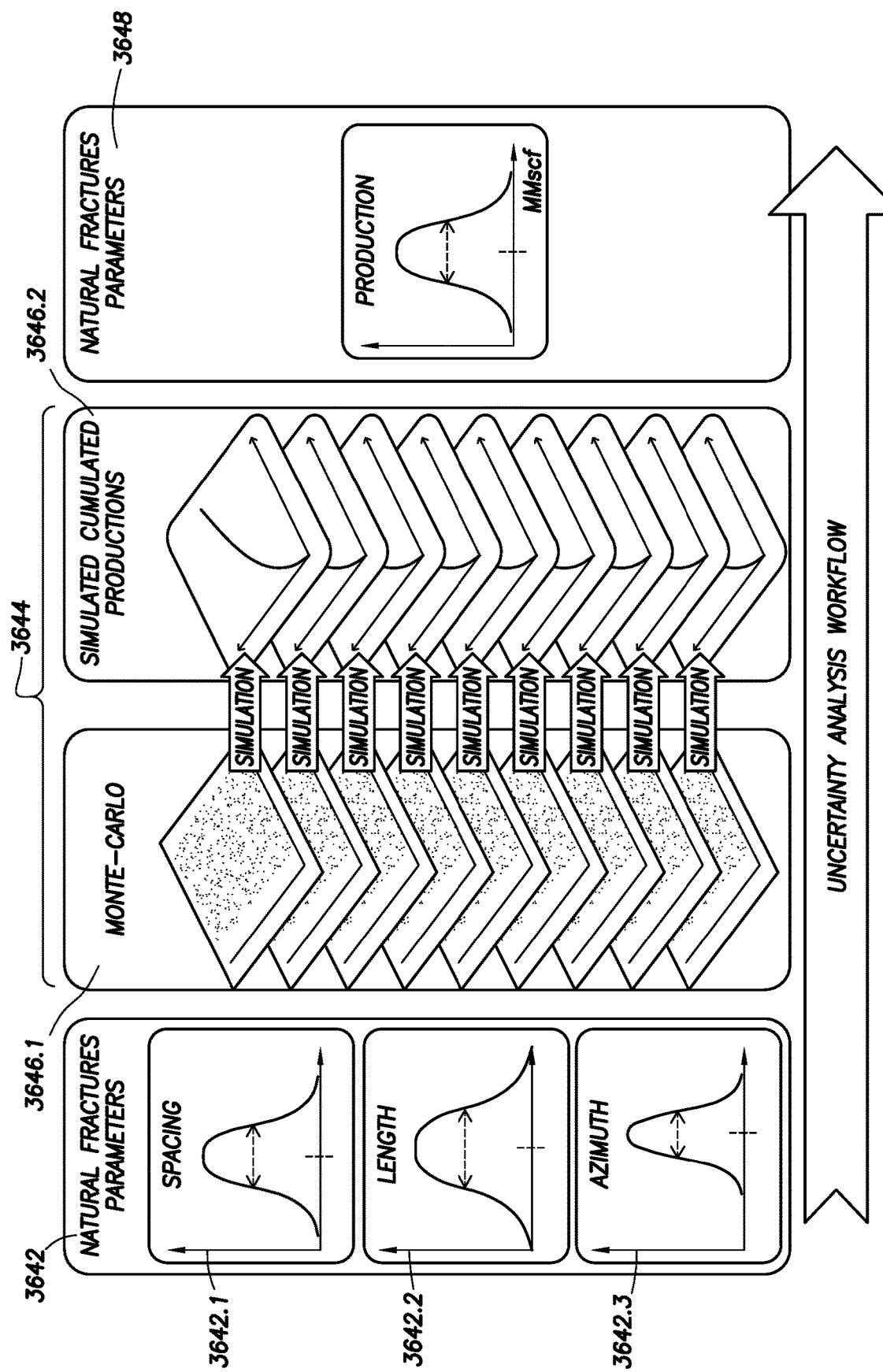
FIG. 36 is a schematic diagram depicting uncertainties of simulations.

FIGS. 35-36 are schematic diagrams depicting the statistical influence of the natural fracture parameters on the geometry of the induced hydraulic fracture network. FIG. 35 schematically shows a hydraulic fracture simulation 3540 formed using UFM 3540.1 based on a reservoir model, and a production simulation generated by UPM 3540.2 from the hydraulic fracture generated by the UFM. The production simulations may then be used to generate the production forecasts.

FIG. 36 schematically shows the statistical nature of the various natural fracture parameters. As shown by this diagram, nature fracture parameters 3642 relating to spacing 3642.1, length 3642.2, and azimuth 3642.3 may vary, thereby generating different simulations 3644 (e.g., Monte Carlo 3646.1 and cumulated productions 3646.2). The simulations 3644 may lead to a variety of potential production outputs which may be plotted to define a production probability distribution 3648.

Since the average parameters and the distribution of fractures are obtained through statistical means, for example inferred from the population of fractures observed in the borehole image logs, there may not be precise determination of the exact location and geometry of the natural fractures in the formation. For a given set of statistical parameters that describe a natural fracture system, there may be many possible realizations of the fractures according to a probability distribution.

Each realization of the discrete fractures may result in a slightly different induced hydraulic fracture system. Therefore, the outcome of a hydraulic fracture treatment bears a degree of uncertainty. These uncertainties may present additional challenges in fracture and completion design optimization, for example, through parametric analysis due to the inherent "noise" in the simulation results. The inherent uncertainty and quantification of the uncertainty may be used in carrying out parametric study and interpretation of the simulation results.

A statistics-based uncertainty analysis may be used to analyze the impact of natural fractures and quantify the uncertainty in the stimulation outcome. Statistical tools may be used to analyze the uncertainty in various aspects of the production outputs, such as in shale gas reservoirs, from parameters such as permeability, hydraulic fracture half-length, and skin effect. Examples of uncertainty analysis are provided by Hatzignatiou, D. G., McKoy, M. L., 2000. *Probabilistic evaluation of horizontal wells in stochastic naturally fractured gas reservoirs. In: CIM 65459, SPE/Petroleum Society of CIM International Conference on Horizontal Well Technology*, Calgary, Alberta, Canada, 6-8 November. (hereafter "Hatzignatiou and McKoy (2000)") the entire contents of which are hereby incorporated by reference herein.

A parametric study of the relationship between parameters, such as natural fracture length, density, and orientation, on both the production and the uncertainty in production may be performed. The methodology begins with the generation of multiple realizations of the natural fracture system for a given set of statistical parameters that define the system. The complex hydraulic fracture network generated from a fixed treatment design for any given realization may be simulated using the UFM model, and the corresponding production performance is predicted using the UPM (see, e.g. Cohen, C. E., Xu, W., Weng, X., Tardy, P., 2012. *Production forecast after hydraulic fracturing in naturally fractured reservoir: coupling a complex fracturing simulator and a semi-analytical production model. In: SPE 152541, SPE Hydraulic Fracturing Technology Conference and Exhibition*, The Woodlands, Tex., USA, 6-8 February. (hereafter "Cohen et al., 2012"), the entire contents of which are hereby incorporated by reference herein), as illustrated in FIG. 35.

To generate an extensive number of simulations, an automated workflow may run the simulation cases, archive the results, and generate visualization outputs and reports. The cumulative production predicted for a large number of simulations provides a statistical distribution described by a mean and a standard deviation as illustrated in FIG. 36. The parametric study uncovers the relation between these two statistical parameters with the natural fracture parameters. Multiple DFN realizations may be generated and considered by the parametric study to optimize the selected realization be used in further oilfield operations.

Stochastic Generation of the Natural Fracture Network

The UFM model may be generated by various methods, such as using a predefined DFN as an input. The UFM may also use the specified statistical parameters, such as the fracture spacing, azimuth angle, and length. In this example, the method to generate the model involves pre-distributing "seed points" in a horizontal plane at the zone depth which correspond to the center points of all the natural fractures, according to the specified mean spacing along the directions parallel and normal to the mean fracture azimuth. The spacing along the fracture azimuth direction (defined as the distance between the centers of the adjacent fractures) is assumed to be mean spacing plus mean fracture length.

Once the seed points are defined, each seed point is displaced by dx and dy determined randomly based on the specified standard deviation of the fracture spacing. This displaced seed point becomes the center of a simulated natural fracture, whose actual azimuth and length are then generated randomly based on their respective mean values and standard deviations. This process may be repeated for all seed points as demonstrated by the following examples:

Example 1

A simulation is performed for a completed horizontal well, with a single stage of pumping through four perforation clusters that are 100 ft (30.5 m) from each other, at a true vertical depth (TVD) between 5794 ft and 5784 ft (1766 m and 1763 m). The treatment is made up of 224,576 gal (850,000 L) of fracturing fluid and 183,700 lbm (83,300 kg) of proppant pumped at 80 bbl/min (12,700 L/min), as described in Table 4 below:

| Zone | Top depth TVF (ft) | Height (ft) | Reservoir Pressure (psi) | σh (psi) | σH (psi) | Young's Modulus (Mpsi) | Poisson's Ratio | Permeability (mD) | Porosity (%) |
|---|---|---|---|---|---|---|---|---|---|
| 1 | 5653 | 60 | 2832 | 4137 | 4178 | 2 | .25 | .0002 | 8 |
| 2 | 5713 | 114 | 2863 | 4117 | 4158 | 2 | .23 | .0002 | 8 |
| 3 | 5827 | 40 | 2930 | 4124 | 4165 | 2 | .23 | .0002 | 8 |

The permeability is 200 nD and the horizontal stress anisotropy is 1%. The conductivity of unpropped fractures is fixed at 0.001 mD ft.

The schedule begins with 18% of pad followed by slurry with a proppant concentration of 1 ppg. For simplicity of the parametric study, the fracturing fluid is assumed to have Newtonian rheological behavior. The proppant type considered in this study is 40/70-mesh sand with an average diameter of 0.01106 in (0.28 mm) and a specific gravity of 2.65. The production is simulated at a constant bottomhole flowing pressure of 1000 psi (6.9 MPa).

The natural fracture network is made of fractures of 200 ft (61 m) average length, 200 ft (61 m) average spacing, and 0 degrees from north (parallel to the wellbore and 90 degrees from the fracture orientation) on average. The standard deviation of the length is 200 ft (61 m) and the standard deviation of the fracture angle is 10 degrees. The natural fractures are considered vertical and as extending through all three zones.

To investigate the distribution of the cumulative production, 98 realizations of the natural fracture network with the same value for the mean and the standard deviation for the length. The fracturing treatment and subsequent production simulations are run for each realization. FIGS. 37.1-37.3 are graphs depicting the production generated by the realizations.

FIG. 37.1 is a graph illustrating the distribution of the cumulative production for three different times of production (6 months, 1 year, and 3 years). The y-axis of the figure is the "frequency" of cases, which is the number of cases that have cumulative production falling into a certain range of about 7.5 MMscf. FIG. 37.2 is a graph illustrating mean cumulative production (y-axis) versus number of cases (x-axis). FIG. 37.3 is a graph illustrating standard deviation of cumulative production (y-axis) versus number of cases considered (x-axis).

These figures indicate that the cumulative production follows a normal distribution, and that the mean and the standard deviation increase with time. One explanation for that result is that at early times the production comes mostly from the reservoir volume around the wellbore where a limited number of natural fractures could have interfered with the hydraulic fracture propagation. At longer time, a larger part of the production comes from deeper into the hydraulic fracture network, increasing the number of interactions with natural fractures in the producing area of the network. Because each interaction with a natural fracture modifies the production behavior of the reservoir, the possibilities of a different behavior increases with time.

FIGS. 37.1 and 37.2 show the evolution of the mean and relative standard deviation of the production as a function of the number of cases considered. The relative standard deviation is calculated as the standard deviation divided by the mean. FIGS. 37.2 and 37.3 show that a smaller number of cases may be required for the mean to converge than for the relative standard deviation. In the results presented in the following discussion, the relative standard deviation and the mean are calculated based on 30 natural fracture network realizations and simulations.

FIGS. 38.1 and 38.2 are graphs illustrating the impact of natural fracture length for this example. FIG. 38.1 is a graph plotting average cumulative production (y-axis) versus natural fracture length (x-axis) for intervals of 6 months, 1 year, and 3 years. FIG. 38.2 is a graph illustrating relative standard deviation of cumulative production (y-axis) versus natural fracture length (x-axis) for intervals of 6 months, 1 year, and 3 years.

FIG. 38.1 indicates that the mean production increases with the length of natural fractures. This can be explained by the impact of length as shown in FIGS. 29.1 and 29.2, which show that when increasing the natural fractures length, the HFN may become more extended in the natural fractures orientation, which is along the direction of an, leading to a greater SRV.

FIG. 38.2 shows that the relative standard deviation seems insensitive to the length of natural fractures, and that relative standard deviation stays almost constant (around 8%) independent of the natural fracture length.

FIGS. 39 and 40.1-40.2 illustrate the impact of natural fracture spacing on this example. FIG. 39.1 is a graph plotting average cumulative production (y-axis) versus natural fracture spacing (x-axis) for 6 months, 1 year, and 3 years. This figure indicates that after 6 months, the production seems to decline with the spacing; whereas, for 3 years of production, there is a peak of production for spacing of 200 ft. This suggests that there is an optimum natural fracture spacing that is increasing with the time of production.

Small natural fracture spacing may translate into a dense hydraulic fracture network within a limited SRV. In that case, at early times, the area from which the gas is produced may still be within the network boundary of the SRV and, locally, the high fracture density may increase the fracture surface to be produced from and maximizes the production. At longer time, the SRV may be depleted because of its limited size, and production may come from the boundary of the SRV thereby limiting the production rate.

FIGS. 40.1 and 40.2 are contour plots illustrating the difference of SRV and the density of hydraulic fracture networks between fracture spacing of 50 and 400 ft, respectively. This description is consistent with the results in FIG. 31.3. The long-term production should be related to the SRV, and the comparison of FIG. 39 with FIG. 31.3 which indicates a similar trend between the cumulative production after 3 years and the SRV for the same range of natural fractures spacing (25-200 ft).

FIG. 41.1 is a graph illustrating statistical features of the fractures. FIG. 41.1 plots relative standard deviation of cumulative production (y-axis) versus natural fracture spacing (x-axis) at 6 months, 1 year, and 3 years. This figure depicts the evolution of the standard deviation of the cumulative production over time as a function of the natural fracture spacing. This figure also indicate that that the standard deviation rapidly declines as the spacing increases, from 18% for 50 ft (15 m) to about 4% and less at 800 ft (244 m). This figure may be comparable to the influence of natural fracture length as shown in FIG. 38.2, and may indicate that the relative standard deviation may not depend on the time of production.

FIGS. 41.1-41.3 are graphs illustrating the relation between the natural fracture angle and both the mean cumulative production and the relative standard deviation for this example. FIG. 41.2 plots average cumulative production (y-axis) versus natural fracture angle (x-axis) at 6 months, 1 year, and 3 years. FIG. 41.3 plots relative standard deviation of cumulative production (y-axis) versus natural fracture angle (x-axis) at 6 months, 1 year, and 3 years.

FIG. 41.2 indicates that the angle may have little effect on the mean production. This result may partly be explained by the low fracture density of the base case (200-ft spacing (61 m)). Another explanation comes from the previous study in FIG. 27.3, in which the total fracture area varies with the natural fractures orientation, and the actual propped surface area may be almost unchanged due to the high settling rate. FIG. 41.2 also indicates that the long-term cumulative production (3 years) may be related to the SRV. FIG. 41.2 indicates an optimum production for a natural fracture angle of 40 degrees; whereas, FIG. 27.3 indicates a maximum SRV for a natural fracture angle of 30 degrees.

FIG. 41.3 indicates that the relative standard deviation varies between 6% and 13% as a function of the natural fracture angle, without a clearly identifiable trend.

Example 2

FIGS. 42.1-45.2 depict an example simulation of a hydraulic fracture network using the statistical approach. FIGS. 42.1-42.3 are contour plots depicting various simulations of a natural fracture system. These figures depict an example plan view of a series of simulated hydraulic fracture networks using UFM for three different pre-existing natural fracture systems generated statistically with the same average length and orientation. These figures have different fracture spacing: average spacing of 50 feet (15 m) for FIG. 42.1; average spacing of 100 feet (30 m) for FIG. 42.2; and, average spacing of 300 feet (91 m) for FIG. 42.3.

As shown in FIG. 42.1, for a formation with dense natural fractures, the generated hydraulic fracture network is more compact since the fractures intersect the natural fractures easily and can generate more branching. As shown in FIG. 42.3, for a formation with sparse natural fractures, fewer fracture branches are generated since the hydraulic fracture has less chance of intersecting natural fractures, and the overall hydraulic fracture network is more elongated along the direction of preferred fracture propagation direction, i.e. the direction perpendicular to the minimum in-situ stress.

FIGS. 43.1-43.3 are contour plots depicting various simulations of a natural fracture system. These figures show an example plan view of a series of simulated fracture networks with a fixed average fracture spacing of 100 feet (30 m). Each of these figures has a varying average fracture length: average length of 100 feet (30 m) for FIG. 43.1; average length of 300 feet (91 m) for FIG. 43.2; and, average length of 500 feet (152 m) for FIG. 43.3.

As shown in FIG. 43.1, for a formation with shorter natural fractures the generated hydraulic fracture network is more elongated along the direction of preferred fracture propagation direction. In contrast, as shown in FIG. 43.3, for longer natural fractures the hydraulic fractures, which preferably propagate along the natural fractures, become more elongated along the natural fracture direction. The above example shows that different natural fracture patterns can strongly affect the hydraulic fracture stimulation outcome.

Dealing with Uncertainty

The precise locations and distribution of the fractures may not be known, with the exception of fractures right at or near the wellbore, where borehole imaging tools can pin-point the locations of the fractures. Beyond the wellbore, the natural fractures may be generated statistically utilizing the combined information from 3D seismic survey that defines the geological structural model and curvature and "ant tracking" techniques to determine fracture corridors, and direct measurements, such as borehole imaging logs or core data.

Borehole imaging logs and cores provide direct observation of the fractures from which the statistical distribution of fracture orientations and density along the wellbore may be determined. Not all attributes of natural fractures may be determined with equal certainty. With borehole images and cores, varying degrees of reliability of statistical parameters can be obtained for fracture orientation, fracture density, and the dimension of the fractures. In addition to the geometrical attributes of the fractures, their mechanical properties, such as coefficient of friction and cohesion, may also influence the stimulation outcome. These properties may be measured from the cores containing the natural fractures. Similarly, they may vary in a range and have their own statistical distributions.

Given the potentially large degree of uncertainties associated with the characterization of the natural fracture system, numerical models used to attempt to simulate the fracturing operation may have an inherent uncertainty in the prediction of the resulting fracture geometry and production performance. Even for a known set of statistical parameters for the natural fractures, fracture and production simulators may be based on a limited specific "realization" of the natural fracture system generated using the statistical parameters. Many realizations may be generated and may be equally representative of the formation being treated from the statistical point of view.

However, for different realizations of the same formation, the precise locations and sizes of the fractures may be different due to the statistical variation, which may lead to different hydraulic fracture geometry and ultimately the production.

FIGS. 44.1-44.3 are contour plots depicting various simulations of a natural fracture system. These figures depict three different realizations of a formation having pre-existing natural fractures with the same, or substantially the same, statistical parameters, and the corresponding predicted hydraulic fracture networks.

Even though the general shape and dimensions of the generated fracture networks may be similar for three different realizations, there may be differences in the detailed network geometry and the corresponding proppant distribution in the networks. Consequently, the predicted well production may vary among the different realizations, as illustrated in FIG. 45.1.

FIG. 45.1 is a graph plotting cumulative production (y-axis) versus time (x-axis) for various realizations. FIG. 45.1 indicates that a variety of well production performance curves are possible for a given statistically determinable reservoir properties. Therefore, there exists a given uncertainty or risk associated with the economics of drilling and completing a well. To better quantify this uncertainty, a large number of statistical realizations of the given formation can be generated. For each realization, the fracture simulator can be used to generate the hydraulic fracture geometry, followed by production simulation using a production simulator. Then choosing a reference production time at which the cumulative production may be used for economic evaluation.

FIG. 45.2 is a graph plotting number of realizations (y-axis) versus cumulative production (x-axis). FIG. 45.2 illustrates a distribution of the computed cumulative production versus the number of realizations that correspond to that production. From this data, statistical average value and standard deviation, which quantify the average expected performance and the uncertainty associated with the fracture treatment, can be determined. These statistical measures can be further used in other economic analysis and decision making process. As such, a statistical distribution of simulations may be used for a large number of realizations of the formation to assess a particular uncertainty or risk associated with the economics of drilling and completing a well.

Such effects may be considered in the method 1500, for example, when considering the wellsite data 1582. For example, additional measurements, such as microseismic monitoring and treating pressure data, may be used to calibrate the model and uncertain parameters to further reduce the uncertainty. Even so, the uncertainties in the predicted results need to be considered in well performance forecasts and engineering decision making.

Outlined herein in at least one embodiment, a method is provided for performing uncertainty analysis for evaluation, design and/or optimization of a hydraulic fracturing stimulation. The method may include identifying uncertain formation and well parameters that have an impact on hydraulic fracture geometry, proppant placement, and/or well production. The method may also include quantifying statistical distribution of these parameters through measurements or model estimates, particularly, but not limited to, unconventional reservoirs with pre-existing natural fractures. The method may also include creating multiple statistically representative realizations of the formation being stimulated. The method may further include, running, or performing, a hydraulic fracture simulation for each realization of the formation, and running, or performing, a production simulation using the predicted fracture geometry and proppant distribution. The method may also include determining a statistical distribution of the production using a predicted production for each created realization. The method may additionally include, using the statistic parameters from the statistical distribution for additional economic analysis or decisions, or for modifying the fracture treatment design. Part or all of the method may be repeated any multiple of times to achieve an optimal design, which may entail maximizing production and/or minimizing uncertainty. Various combinations of part or all of the methods provided herein may be performed in various orders.

While the characteristics of the natural fractures are native to the formation and may not be controllable, recognizing their potential impact on the induced hydraulic fracture network may allow the engineer better plan the well spacing and completion to optimize the reservoir coverage and production. Different types of treatment designs can be used in formations with different natural fracture characteristics to achieve the best deliverability of the induced hydraulic fracture system. For a formation with abundance of large natural fractures at an angle to the maximum stress direction, treatment design with slick water and small size proppant may help connecting natural fractures and generating a large surface area of a complex fracture network favorable for an ultralow permeability formation. Contrarily, if the formation has limited natural fractures, or the natural fractures are aligned with the maximum horizontal stress direction, the fractures may be mostly planar, and the treatment design can be focused on achieving the optimal propped length and conductivity.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. For example, while the system and method presented herein were described with specific reference to a fracturing operation, it will be appreciated that the system and method may likewise apply to other reservoir stimulation operations, such as acidizing. Moreover, while a limited number of realizations were used as examples, it should be understood that any number of realizations may be performed and assessed. Accordingly, the foregoing description should not be read as pertaining to the precise structures and workflows described and shown in the accompanying drawings, but rather should be read as consistent with and as support for the following claims, which are to have their fullest and fairest scope. Various combinations of part or all of the techniques provided herein may be performed.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

It should be noted that in the development of any such actual embodiment, or numerous implementation, specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the embodiments used/disclosed herein can also include some components other than those cited.

In the description, each numerical value should be read once as modified by the term "about" (unless already expressly so modified), and then read again as not so modified unless otherwise indicated in context. Also, in the description, it should be understood that any range listed or described as being useful, suitable, or the like, is intended that values within the range, including the end points, is to be considered as having been stated. For example, "a range of from 1 to 10" is to be read as indicating possible numbers along the continuum between about 1 and about 10. Thus, even if specific data points within the range, or even no data points within the range, are explicitly identified or refer to a few specific ones, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention. All references cited herein are incorporated by reference into the current application in their entirety.

Although a few example embodiments have been described in detail above, those skilled in the art will readily appreciate that many modifications are possible in the example embodiments without materially departing from the system and method for performing wellbore stimulation operations. Accordingly, all such modifications are intended to be included within the scope of this disclosure as defined in the following claims. In the claims, means-plus-function clauses are intended to cover the structures described herein as performing the recited function and structural equivalents and equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of performing a fracture operation at a wellsite, the wellsite positioned about a subterranean formation having a wellbore therethrough and a fracture network therein, the fracture network comprising natural fractures, the method comprising:
    stimulating the wellsite by injecting of an injection fluid with proppant into the fracture network;
    obtaining wellsite data comprising natural fracture parameters of the natural fractures and obtaining a mechanical earth model of the subterranean formation;
    defining the natural fractures based on the wellsite data by generating one or more realizations of the natural fracture data based on a statistical distribution of the natural fracture parameters;
    generating a statistical distribution of predicted fluid production by generating a hydraulic fracture growth pattern comprising hydraulic fractures for the fracture network over time based on each defined realization and predicting fluid production from the formation based on the defined realizations;
    performing stress shadowing on the hydraulic fractures to determine stress interference between the hydraulic fractures and the natural fractures;
    selecting a reference production from the generated statistical distribution and the stress interference; and
    optimizing production and uncertainty by adjusting the stimulating based on the selecting.

2. The method of claim 1, wherein the hydraulic fracture growth pattern propagates normal to a local principal stress according to the stress shadowing.

3. The method of claim 1, wherein performing the stress shadowing comprises performing displacement discontinuity for each of the hydraulic fractures.

4. The method of claim 3, wherein performing the displacement discontinuity comprises implementing a two-dimensional (2D) Displacement Discontinuity Method (DDM) or a three-dimensional (3D) DDM for each of the hydraulic fractures.

5. The method of claim 1, wherein performing the stress shadowing comprises performing the stress shadowing about multiple wellbores of the wellsite and repeating the generating using the stress shadowing performed on the multiple wellbores.

6. The method of claim 1, wherein performing the stress shadowing comprises performing the stress shadowing at multiple stimulation stages in the wellbore.

7. The method of claim 1, wherein the generating the hydraulic fracture growth pattern comprises:
  extending the hydraulic fractures from the wellbore and into the fracture network of the subterranean formation to form a hydraulic fracture network comprising the natural fractures and the hydraulic fractures;
  determining hydraulic fracture parameters of the hydraulic fractures after the extending;
  determining transport parameters for the proppant passing through the hydraulic fracture network; and
  determining fracture dimensions of the hydraulic fractures from the determined hydraulic fracture parameters, the determined transport parameters and the mechanical earth model.

8. The method of claim 7, further comprising if the hydraulic fractures encounter another fracture, determining crossing behavior at the encountered another fracture, and repeating the generating based on the determined stress interference and the crossing behavior.

9. The method of claim 8, wherein the hydraulic fracture growth pattern is unaltered by the crossing behavior.

10. The method of claim 8, wherein the hydraulic fracture growth pattern is altered by the crossing behavior.

11. The method of claim 8, wherein a fracture pressure of the hydraulic fracture network is greater than a stress acting on the encountered fracture and wherein the hydraulic fracture growth pattern propagates along the encountered fracture.

12. The method of claim 8, wherein the hydraulic fracture growth pattern continues to propagate along the encountered fracture until an end of the encountered fracture is reached.

13. The method of claim 8, wherein the hydraulic fracture growth pattern changes direction at an end of the encountered fracture, the hydraulic fracture growth pattern extending in a direction normal to a minimum stress at the end of the encountered fracture.

14. The method of claim 7, wherein performing the stress shadowing comprises analyzing an effect on the determined hydraulic fracture parameters caused by stresses that the natural fractures exert on the subterranean formation.

15. The method of claim 7, wherein the extending comprises extending the hydraulic fractures along the hydraulic fracture growth pattern based on the natural fracture parameters and a minimum stress and a maximum stress on the subterranean formation.

16. The method of claim 7, wherein the determining fracture dimensions comprises one of evaluating seismic measurements, ant tracking, sonic measurements, geological measurements and combinations thereof.

17. The method of claim 1, further comprising validating the hydraulic fracture growth pattern.

18. The method of claim 17, wherein the validating comprises comparing the hydraulic fracture growth pattern with at least one simulation of stimulation of the fracture network.

19. The method of claim 1, wherein the wellsite data further comprises at least one of geological, petrophysical, geomechanical, log measurements, completion, historical and combinations thereof.

20. The method of claim 1, wherein the natural fracture parameters are generated by one of observing borehole imaging logs, estimating fracture dimensions from wellbore measurements, obtaining microseismic images, and combinations thereof.

21. A method of performing a fracture operation at a wellsite, the wellsite positioned about a subterranean formation having a wellbore therethrough and a fracture network therein, the fracture network comprising natural fractures, the method comprising:
  stimulating the wellsite by injecting of an injection fluid with proppant into the fracture network;
  obtaining wellsite data comprising natural fracture parameters of the natural fractures and obtaining a mechanical earth model of the subterranean formation;
  defining the natural fractures based on the wellsite data by generating one or more realizations of the natural fracture data based on a statistical distribution of the natural fracture parameters;
  generating a statistical distribution of predicted fluid production by generating a hydraulic fracture growth pattern for the fracture network over time based on each defined realization and predicting fluid production from the formation based on the defined realizations, the generating the hydraulic fracture growth pattern comprising:
    extending hydraulic fractures from the wellbore and into the fracture network of the subterranean formation to form a hydraulic fracture network comprising the natural fractures and the hydraulic fractures;
    determining hydraulic fracture parameters of the hydraulic fractures after the extending;
    determining transport parameters for the proppant passing through the hydraulic fracture network; and
    determining fracture dimensions of the hydraulic fractures from the determined hydraulic fracture parameters, the determined transport parameters, and the mechanical earth model;
  performing stress shadowing on the hydraulic fractures to determine stress interference between the hydraulic fractures and the natural fractures;
  selecting a reference production from the generated statistical distribution and the stress interference; and
  optimizing production and uncertainty by adjusting the stimulating based on the selecting.

22. The method of claim 21, wherein, if the hydraulic fracture encounters another fracture:
  determining crossing behavior between the hydraulic fractures and the encountered fracture based on the determined stress interference; and
  repeating the generating based on the determined stress interference and the crossing behavior.

23. A method of performing a fracture operation at a wellsite, the wellsite positioned about a subterranean formation having a wellbore therethrough and a fracture network therein, the fracture network comprising natural fractures, the method comprising:
  stimulating the wellsite by injecting of an injection fluid with proppant into the fracture network;
  obtaining wellsite data comprising natural fracture parameters of the natural fractures and obtaining a mechanical earth model of the subterranean formation;

defining the natural fractures based on the wellsite data by generating one or more realizations of the natural fracture data based on a statistical distribution of natural fracture parameters;

generating a statistical distribution of predicted fluid production by generating a hydraulic fracture growth pattern comprising hydraulic fractures for the fracture network over time based on each defined realization and predicting fluid production from the formation based on the defined realizations;

performing stress shadowing on the hydraulic fractures to determine stress interference between the hydraulic fractures and the natural fractures, wherein performing the stress shadowing comprises increasing the stress interference for a particular fracture in response to determining that the particular fracture is within a threshold distance of another fracture;

selecting a reference production from the generated statistical distribution and the stress interference; and optimizing production and uncertainty by adjusting the stimulating based on the selecting.

* * * * *